United States Patent
Li et al.

(10) Patent No.: US 11,818,497 B2
(45) Date of Patent: Nov. 14, 2023

(54) RECORDING FRAME RATE CONTROL METHOD AND RELATED APPARATUS

(71) Applicant: Huawei Technologies Co., Ltd., Shenzhen (CN)

(72) Inventors: Yuanyou Li, Zürich (CH); Wei Luo, Shanghai (CN); Jieguang Huo, Shanghai (CN); Rongyue Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 17/434,663

(22) PCT Filed: Feb. 21, 2020

(86) PCT No.: PCT/CN2020/076130
§ 371 (c)(1),
(2) Date: Aug. 27, 2021

(87) PCT Pub. No.: WO2020/173394
PCT Pub. Date: Sep. 3, 2020

(65) Prior Publication Data
US 2022/0174238 A1   Jun. 2, 2022

(30) Foreign Application Priority Data

Feb. 28, 2019   (CN) .................. 201910153286.X

(51) Int. Cl.
| H04N 5/91 | (2006.01) |
| H04N 23/71 | (2023.01) |
| H04N 23/73 | (2023.01) |

(52) U.S. Cl.
CPC ............... *H04N 5/91* (2013.01); *H04N 23/71* (2023.01); *H04N 23/73* (2023.01)

(58) Field of Classification Search
CPC ...... H04N 5/91; H04N 5/2351; H04N 5/2353; H04N 5/23229; H04N 5/23245;
(Continued)

(56) References Cited

U.S. PATENT DOCUMENTS

| 9,325,876 B1 | 4/2016 | Terrill et al. |
| 2006/0072031 A1 | 4/2006 | Min |

(Continued)

FOREIGN PATENT DOCUMENTS

| CN | 101341737 A | 1/2009 |
| CN | 102096924 A | 6/2011 |

(Continued)

OTHER PUBLICATIONS

ITU-T H.264 "Series H: Audiovisual and Multimedia Systems, Infrastructure of audiovisual services-Coding of moving video, Advanced video coding for generic audiovisual services," Apr. 2017, 812 pages.

*Primary Examiner* — Ahmed A Berhan
(74) *Attorney, Agent, or Firm* — Conley Rose, P.C.

(57) ABSTRACT

A recording frame rate control method includes a mobile terminal starts video recording and collects N video frames of a photographing scenario at a first frame rate. The mobile terminal determines light intensity in the photographing scenario based on the N video frames, and adjusts a recording frame rate of the mobile terminal based on the light intensity in the photographing scenario.

20 Claims, 34 Drawing Sheets

(58) Field of Classification Search
CPC ........ H04N 5/772; H04N 7/0127; H04N 5/76; H04N 5/144; H04N 5/915; H04N 5/77; H04N 21/2351; H04N 21/2353
See application file for complete search history.

(56) References Cited

U.S. PATENT DOCUMENTS

| | | | |
|---|---|---|---|
| 2009/0015707 | A1 | 1/2009 | Hibino et al. |
| 2009/0147122 | A1 | 6/2009 | Kato |
| 2009/0231464 | A1 | 9/2009 | Nakamura |
| 2010/0295986 | A1 | 11/2010 | Hori |
| 2012/0189263 | A1 | 7/2012 | Kato et al. |
| 2015/0172622 | A1 | 6/2015 | Yoon et al. |
| 2015/0373293 | A1 | 12/2015 | Vance et al. |
| 2016/0182853 | A1 | 6/2016 | Iang et al. |
| 2016/0234424 | A1* | 8/2016 | Ito .................. H04N 5/2353 |
| 2016/0249012 | A1 | 8/2016 | Wang et al. |
| 2019/0037125 | A1 | 1/2019 | Jiang et al. |

FOREIGN PATENT DOCUMENTS

| | | | |
|---|---|---|---|
| CN | 102196183 | A | 9/2011 |
| CN | 102611845 | A | 7/2012 |
| CN | 102790862 | A | 11/2012 |
| CN | 103024279 | A | 4/2013 |
| CN | 103905708 | A | 7/2014 |
| CN | 203840441 | U | 9/2014 |
| CN | 104580969 | A | 4/2015 |
| CN | 104683691 | A | 6/2015 |
| CN | 104715728 | A | 6/2015 |
| CN | 104754200 | A * | 7/2015 |
| CN | 104754200 | A | 7/2015 |
| CN | 104967803 | A | 10/2015 |
| CN | 105323466 | A | 2/2016 |
| CN | 105872356 | A | 8/2016 |
| CN | 105991955 | A | 10/2016 |
| CN | 106023346 | A | 10/2016 |
| CN | 107277388 | A | 10/2017 |
| CN | 107396019 | A | 11/2017 |
| CN | 107690804 | B | 8/2020 |
| CN | 108377335 | B | 2/2021 |
| EP | 2538660 | A2 | 12/2012 |
| EP | 2993888 | A1 | 3/2016 |
| EP | 3062511 | A1 | 8/2016 |
| JP | 2001358984 | A | 12/2001 |
| JP | 2004180151 | A | 6/2004 |
| JP | 2011019062 | A | 1/2011 |
| JP | 2015019243 | A | 1/2015 |
| JP | 2016197231 | A | 11/2016 |
| RU | 2517042 | C2 | 5/2014 |

* cited by examiner

RECORDING FRAME RATE CONTROL METHOD AND RELATED APPARATUS

CROSS-REFERENCE TO RELATED APPLICATIONS

This is a U.S. National Stage of International Patent Application No. PCT/CN2020/076130 filed on Feb. 21, 2020, which claims priority to Chinese Patent Application No. 201910153286.X filed on Feb. 28, 2019. Both of the aforementioned applications are hereby incorporated by reference in their entireties.

TECHNICAL FIELD

This application relates to the field of mobile terminals, and in particular, to a recording frame rate control method and a related apparatus.

BACKGROUND

Currently, cameras have become one of standard configuration components of mobile terminals, and shooting pictures and videos by using the cameras has become a lifestyle of users. Due to the special physiological structure of human eyes, if a frame rate of a video image watched by people is higher than 24 fps, a video is considered smooth. This phenomenon is referred to as visual persistence. Currently, when a recording function of a mobile terminal is used, a frame rate of a video is usually fixed. In other words, the recording frame rate cannot be adjusted in a photographing process. In this way, if the recording frame rate is excessively low, a motion blur may occur in the video because an exposure time period of each image frame is relatively long. If the recording frame rate is relatively high and a photographing scenario is relatively dark, due to an inadequate exposure time period of a shot video image, the entire video image is dark and details are unclear.

SUMMARY

This application provides a recording frame rate control method and a related apparatus, to automatically adjust a frame rate that is used during video recording, thereby improving quality of a video image.

According to a first aspect, this application provides a recording frame rate control method, including the following steps: First, a mobile terminal receives first input of a user, and in response to the first input, the mobile terminal starts video recording. Then, the mobile terminal collects N video frames of a photographing scenario at a first frame rate. Next, the mobile terminal determines light intensity in the photographing scenario based on the collected N video frames, and automatically adjusts a recording frame rate of the mobile terminal based on the light intensity in the photographing scenario, w % here a recording frame rate obtained after the adjustment is different from the first frame rate, and N is a positive integer greater than 2. Further, the mobile terminal continues collecting a video frame of the photographing scenario based on the recording frame rate obtained after the adjustment. Finally, the mobile terminal generates a video file based on the video frames that are collected at the first frame rate and the video frame that is collected based on the recording frame rate obtained after the adjustment.

In this way, the mobile terminal can automatically control the recording frame rate based on the light intensity in the photographing scenario. When starting to record a video, the mobile terminal collects a video frame at the first frame rate (for example, 30 fps) by default. Then, when the light intensity in the photographing scenario is strong, the mobile terminal may collect a video frame at a second frame rate (for example, 60 fps). When the mobile terminal determines that the light intensity in the photographing scenario is weak, the mobile terminal may collect a video frame at a third frame rate (for example, 24 fps). When the mobile terminal determines that the light intensity in the photographing scenario is medium, the mobile terminal may continue collecting a video frame at the first frame rate (for example, 30 fps). Dynamically adjusting the frame rate based on the light intensity in the photographing scenario can improve image brightness of a video shot by the mobile terminal in a relatively dark photographing scenario and improve image smoothness of a video shot by the mobile terminal in a relatively bright photographing scenario, to improve quality of a video image.

In a possible implementation, the determining, by the mobile terminal, light intensity in the photographing scenario based on the collected N video frames includes: determining, by the mobile terminal, whether exposure parameters of the N video frames are less than a first exposure parameter threshold; and if yes, determining, by the mobile terminal, that the light intensity in the photographing scenario is greater than a first light intensity threshold.

In a possible implementation, the determining, by the mobile terminal, light intensity in the photographing scenario based on the collected N video frames includes: determining, by the mobile terminal, whether the exposure parameters of the N video frames are greater than a second exposure parameter threshold; and if yes, determining, by the mobile terminal, that the light intensity in the photographing scenario is less than a second light intensity threshold.

In a possible implementation, the automatically adjusting a recording frame rate of the mobile terminal based on the light intensity in the photographing scenario includes: adjusting, by the mobile terminal, the recording frame rate of the mobile terminal to a second frame rate when the light intensity in the photographing scenario is greater than the first light intensity threshold, where the second frame rate is greater than the first frame rate. In this way, when the light intensity in the photographing scenario is relatively strong, exposure of a video shot by the mobile terminal is adequate, and the mobile terminal can increase a frame rate of the shot video. Because of the increase in the frame rate, a quantity of frames of images shot by the mobile terminal per second increases, and the video is smoother.

In a possible implementation, the automatically adjusting a recording frame rate of the mobile terminal based on the light intensity in the photographing scenario includes: adjusting, by the mobile terminal, the recording frame rate of the mobile terminal to a third frame rate when the light intensity in the photographing scenario is less than the second light intensity threshold, where the third frame rate is less than the first frame rate, and the second light intensity threshold is less than the first light intensity threshold. In this way, when the light intensity in the photographing scenario is relatively weak, exposure of a video shot by the mobile terminal is inadequate, and the mobile terminal may decrease a frame rate of the shot video. Because of the decrease in the frame rate, an exposure time period of each video frame on the mobile terminal is prolonged, and brightness of a video image may be improved.

In a possible implementation, when the mobile terminal collects a video frame of the photographing scenario at the second frame rate, the method further includes: determining, by the mobile terminal, whether an exposure parameter of a currently collected video frame is greater than a third exposure parameter threshold and less than the second exposure parameter threshold; and if yes, adjusting, by the mobile terminal, the recording frame rate of the mobile terminal to the first frame rate, where the first exposure parameter threshold is less than the third exposure parameter threshold and the third exposure parameter threshold is less than the second exposure parameter threshold. In this way, frequent switching of the recording frame rate between the first frame rate and the second frame rate can be avoided when the exposure parameter of the video frame changes around the first exposure parameter threshold.

In a possible implementation, when the mobile terminal collects a video frame of the photographing scenario at the second frame rate, the method further includes: determining, by the mobile terminal, whether an exposure parameter of a currently collected video frame is less than a fourth exposure parameter threshold and greater than a first exposure parameter threshold; and if yes, adjusting, by the mobile terminal, the recording frame rate of the mobile terminal to the first frame rate, where the first exposure parameter threshold is less than the fourth exposure parameter threshold and the fourth exposure parameter threshold is less than the second exposure parameter threshold. In this way, frequent switching of the recording frame rate between the first frame rate and the third frame rate can be avoided when the exposure parameter of the video frame changes around the second exposure parameter threshold.

In a possible implementation, the automatically adjusting a recording frame rate of the mobile terminal based on the light intensity in the photographing scenario includes: determining, by the mobile terminal, whether the light intensity in the photographing scenario is greater than the first light intensity threshold and motion displacement of the mobile terminal is greater than a first distance threshold; or determining, by the mobile terminal, whether the light intensity in the photographing scenario is greater than the first light intensity threshold and a motion speed of the mobile terminal is greater than a first speed threshold; and if yes, adjusting, by the mobile terminal, the recording frame rate of the mobile terminal to a second frame rate, where the second frame rate is greater than the first frame rate.

In a possible implementation, the automatically adjusting a recording frame rate of the mobile terminal based on the light intensity in the photographing scenario includes: determining, by the mobile terminal, whether the light intensity in the photographing scenario is less than the second light intensity threshold, and whether the motion displacement of the mobile terminal is less than a second distance threshold and the motion speed of the mobile terminal is less than a second speed threshold; and if yes, adjusting, by the mobile terminal, the recording frame rate of the mobile terminal to a third frame rate, where the third frame rate is less than the first frame rate.

In this way, when the mobile terminal moves vigorously, the recording frame rate is increased, an exposure time period of each frame of image shot by the mobile terminal is reduced, and a blur of a video image caused by motion of the mobile terminal is reduced. In this way, a motion blur of a video shot by the mobile terminal in a vigorous motion state can be reduced, to improve video smoothness and quality of a video image.

In a possible implementation, the automatically adjusting a recording frame rate of the mobile terminal based on the light intensity in the photographing scenario includes: determining, by the mobile terminal, whether the light intensity in the photographing scenario is greater than the first light intensity threshold and displacement of a same photographed object in any two of the N video frames is greater than a third distance threshold; and if yes, adjusting, by the mobile terminal, the recording frame rate of the mobile terminal to a second frame rate, where the second frame rate is greater than the first frame rate.

In a possible implementation, the automatically adjusting a recording frame rate of the mobile terminal based on the light intensity in the photographing scenario includes: determining, by the mobile terminal, whether the light intensity in the photographing scenario is less than the second light intensity threshold, and the displacement of the same photographed object in any two of the N video frames is less than a fourth distance threshold; and if yes, adjusting, by the mobile terminal, the recording frame rate of the mobile terminal to a third frame rate, where the third frame rate is less than the first frame rate.

In this way, because a recording frame rate is increased when the photographed object moves vigorously, an exposure time period of each frame of image photographed by the mobile terminal is shortened, and a blur of a video image caused by motion of the photographed object is reduced. Because the recording frame rate is decreased when the photographed object moves slightly, a quantity of frames of images shot per second is reduced, and an exposure time period of each frame of image is prolonged. Therefore, image brightness of the shot video can be ensured, and power consumption caused when the mobile terminal processes the shot images is reduced. In this way, a motion blur of a video shot when the photographed object is in a vigorous motion state can be reduced, to improve video smoothness and quality of a video image.

In a possible implementation, the automatically adjusting a recording frame rate of the mobile terminal based on the light intensity in the photographing scenario includes: determining, by the mobile terminal, whether the following condition is met: the light intensity in the photographing scenario is greater than the first light intensity threshold, and motion displacement of the mobile terminal is greater than a first distance threshold or a motion speed of the mobile terminal is greater than a first speed threshold; or the light intensity in the photographing scenario is greater than the first light intensity threshold, and displacement of a same photographed object in any two of the N video frames is greater than a third distance threshold; and if yes, adjusting, by the mobile terminal, the recording frame rate of the mobile terminal to a second frame rate, where the second frame rate is greater than the first frame rate.

In a possible implementation, the automatically adjusting a recording frame rate of the mobile terminal based on the light intensity in the photographing scenario includes: determining, by the mobile terminal, whether the following condition is met: the light intensity in the photographing scenario is less than the second light intensity threshold, the motion displacement of the mobile terminal is less than a second distance threshold, and the displacement of the same photographed object in any two of the N video frames is less than a fourth distance threshold; or the light intensity in the photographing scenario is less than the second light intensity threshold, the motion speed of the mobile terminal is less than a second speed threshold, and the displacement of the same photographed object in any two of the N video frames is less than the fourth distance threshold; and if yes, adjusting, by the mobile terminal, the recording frame rate of the mobile terminal to a third frame rate, where the third frame rate is less than the first frame rate, the first light intensity threshold is greater than the second light intensity threshold, the first distance threshold is less than the second distance threshold, the first speed threshold is greater than the second speed threshold, and the fourth distance threshold is less than the third distance threshold.

In this way, because the recording frame rate is high when the light intensity in the photographing scenario is strong and the mobile terminal is in a vigorous motion state, a quantity of frames of images shot by the mobile terminal per second increases, and an exposure time period of each frame of image is shortened. In this way, a motion blur of a video image caused by the vigorous motion of the mobile terminal can be reduced, to improve video smoothness. In addition, because the light intensity in the photographing scenario is strong, even if the recording frame rate is high, each frame of image is relatively bright. Because the recording frame rate is low when the light intensity in the photographing scenario is weak and the mobile terminal is in a slight motion state, a quantity of frames of images shot by the mobile terminal per second decreases, and an exposure time period of each frame of image is prolonged. In this way, image brightness of the video in a low brightness environment is improved. In this way, with reference to the ambient light intensity and a motion status of the mobile terminal, image brightness of a video and smoothness of the video in a high brightness scenario are improved through control on several levels of frame rates.

According to a second aspect, this application provides a mobile terminal, including: a touchscreen, a camera, one or more processors, and one or more memories, where the one or more memories are coupled to the one or more processors, the one or more memories are configured to store computer program code, and the computer program code includes a computer instruction. When the one or more processors execute the computer instruction, the mobile terminal performs the recording frame rate control method according to any one of the possible implementations of the foregoing aspect.

According to a third aspect, an embodiment of this application provides a computer storage medium, including a computer instruction. When the computer instruction is run on a mobile terminal, a communications apparatus is enabled to perform the recording frame rate control method according to any one of the possible implementations of the foregoing aspect.

According to a fourth aspect, an embodiment of this application provides a computer program product. When the computer program product runs on a computer, the computer is enabled to perform the recording frame rate control method according to any one of the possible implementations of the foregoing aspect.

DESCRIPTION OF EMBODIMENTS

The following clearly describes technical solutions of embodiments in this application in detail with reference to accompanying drawings. In descriptions of the embodiments of this application, unless otherwise stated, "/" indicates "or". For example, A/B may indicate A or B. The term "and/or" in this specification merely describes an association relationship for describing associated objects, and indicates that three relationships may exist. For example. A and/or B may indicate the following three cases: Only A exists, both A and B exist, and only B exists. In addition, in the descriptions of the embodiments of this application, "a plurality of" means two or more than two.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1:
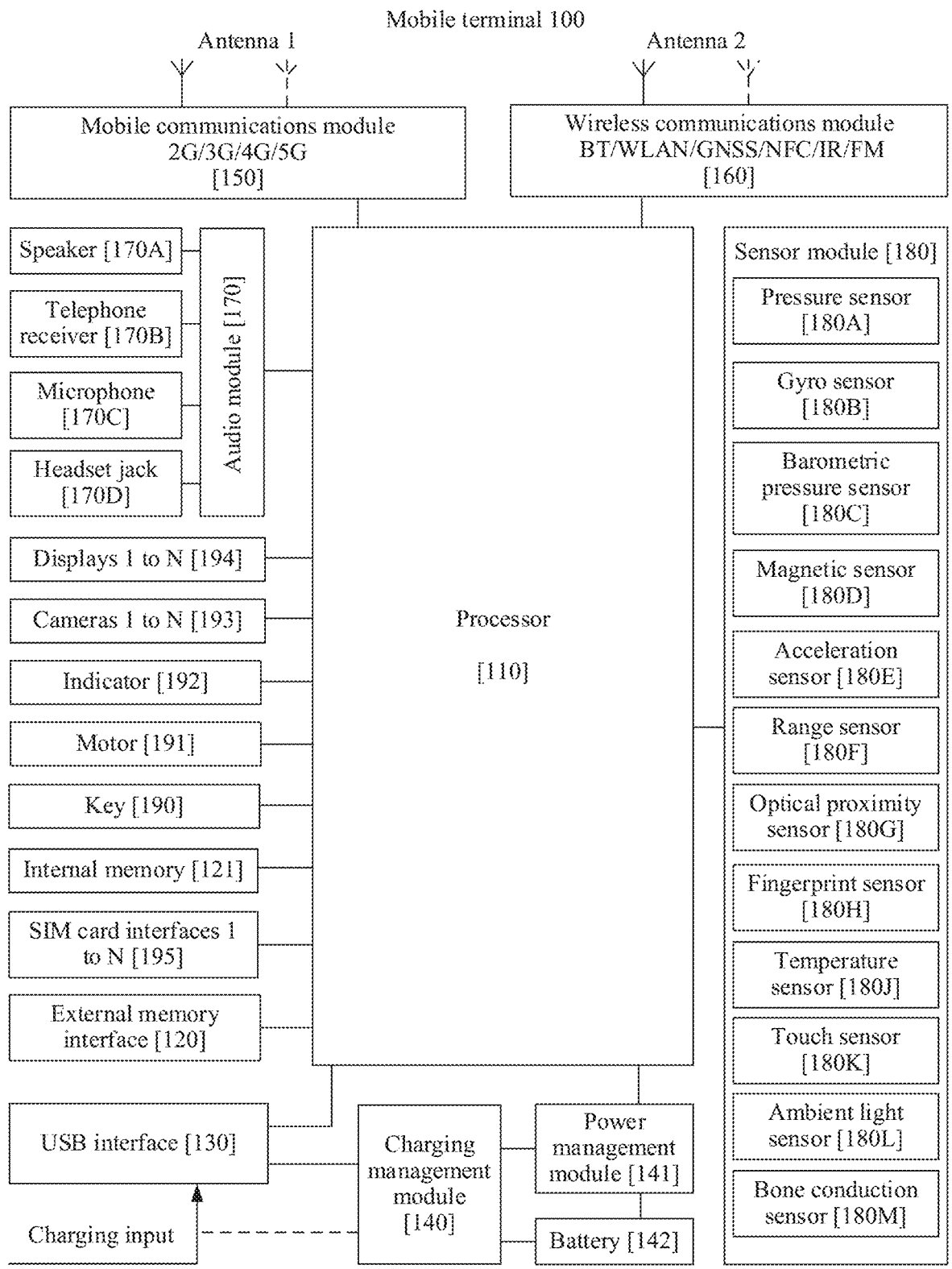
FIG. 1 is a schematic structural diagram of a mobile terminal according to an embodiment of this application.

FIG. 1 is a schematic structural diagram of a mobile terminal 100.

The mobile terminal 100 is used as an example below to describe the embodiments in detail. It should be understood that the mobile terminal 100 shown in FIG. 1 is merely an example, and the mobile terminal 100 may have more or fewer components than those shown in FIG. 1, may combine two or more components, or may have different component configurations. Various components shown in the figure may be implemented on hardware that includes one or more signal processing and/or application-specific integrated circuits, software, or a combination of hardware and software.

The mobile terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the mobile terminal 100. In some other embodiments of this application, the mobile terminal 100 may include more or fewer components than those shown in the figure, or some components may be combined, or some components may be split, or different component arrangements may be used. The components in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent components, or may be integrated into one or more processors.

The controller may be a nerve center and a command center of the mobile terminal 100. The controller may generate an operation control signal based on an instruction operation code and a time sequence signal, to complete control of instruction reading and instruction execution.

A memory may further be disposed in the processor 110, to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the mobile terminal 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communications module 160 by using the I2S interface, to implement a function of answering a call via a Bluetooth headset.

The PCM interface may also be used for audio communication, and samples, quantizes, and codes an analog signal. In some embodiments, the audio module 170 may be coupled to the wireless communications module 160 by using the PCM bus interface. In some embodiments, the audio module 170 may also transfer an audio signal to the wireless communications module 160 by using the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus performs a conversion between serial communication and parallel communication on to-be-transmitted data. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 by using the UART interface, to implement a function of playing music via a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the mobile terminal 100. The processor 110 communicates with the display 194 by using the DSI interface, to implement a display function of the mobile terminal 100.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the mobile terminal 100, or may be configured to transmit data between the mobile terminal 100 and a peripheral device. The USB interface 130 may alternatively be configured to connect to a headset, to play audio via the headset. The USB interface 130 may alternatively be configured to connect to another mobile terminal such as an AR device.

It may be understood that an interface connection relationship between the modules illustrated in the embodiments of the present invention is merely an example for description, and does not constitute a limitation on a structure of the mobile terminal 100. In some other embodiments of this application, the mobile terminal 100 may alternatively use an interface connection mode different from that in the foregoing embodiments, or use a combination of a plurality of interface connection modes.

The charging management module 140 is configured to receive charging input from the charger. The charger may be a wireless charger or a wired charger. In some embodiments of wired charging, the charging management module 140 may receive charging input of the wired charger by using the USB interface 130. In some embodiments of wireless charging, the charging management module 140 may receive wireless charging input by using a wireless charging coil of the mobile terminal 100. The charging management module 140 may further supply power to the mobile terminal by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the mobile terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile terminal 100 may be configured to cover one or more communication bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution for wireless communication including 2G/3G/4G/5G and the like applied to the mobile terminal 100. The mobile communications module 150 may include at least one filter, switch, power amplifier, low noise amplifier (low noise amplifier, LNA), and the like. The mobile communications module 150 may receive an electromagnetic wave by using the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 and at least some modules in the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal by using an audio device (which is not limited to the speaker 170A, the telephone receiver 170B, or the like), or displays an image or a video by using the display 194. In some embodiments, the modem processor may be an independent component. In some other embodiments, the modem processor may be independent of the processor 110, and is disposed in a same component with the mobile communications module 150 or another function module.

The wireless communications module 160 may provide a solution for wireless communication such as a wireless local area network (wireless local area networks, WLAN) (for example, a wireless fidelity (wireless fidelity, Wi-Fi) network), Bluetooth (bluetooth, BT), a global navigation satellite system (global navigation satellite system. GNSS), frequency modulation (frequency modulation, FM), a near field communication (near field communication, NFC) technology, or an infrared (infrared, IR) technology applied to the mobile terminal 100. The wireless communications module 160 may be one or more components integrating at least one communications processor module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation on and amplify the signal, and convert the signal into an electromagnetic wave for radiation by using the antenna 2.

In some embodiments, the antenna 1 and the mobile communications module 150 of the mobile terminal 100 are coupled, and the antenna 2 and the wireless communications module 160 of the mobile terminal 100 are coupled, so that the mobile terminal 100 can communicate with a network and another device by using a wireless communications technology. The wireless communications technology may include a technology such as global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS)), and/or a satellite based augmentation system (satellite based augmentation systems, SBAS).

The mobile terminal 100 implements a display function by using the GPU, the display 194, the application processor, and the like. The GPU is a microprocessor for image processing, and is connected to the display 194 and the application processor. The GPU is configured to perform mathematical and geometric calculation, and is configured to render an image. The processor 110 may include one or more GPUs that execute a program instruction to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the mobile terminal 100 may include one or N displays 194, where N is a positive integer greater than 1.

The mobile terminal 100 can implement a photographing function by using the ISP, the camera 193, the video codec, the GPU, the display 194, the application processor, and the like.

The ISP is configured to process data fed back by the camera 193. For example, during photographing, a shutter is turned on, a ray of light is transmitted to a photosensitive element of the camera through a lens, an optical signal is converted into an electrical signal, the photosensitive element of the camera transmits the electrical signal to the ISP for processing, and the electrical signal is converted into an image that can be seen. The ISP may further perform algorithm optimization on noise, brightness, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated by using the lens, and is projected to the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the mobile terminal 100 may include one or N cameras 193, where N is a positive integer greater than 1.

The digital signal processor is configured to process a digital signal. In addition to a digital image signal, the digital signal processor may further process another digital signal. For example, when the mobile terminal 100 selects a frequency, the digital signal processor is configured to perform Fourier transform on frequency energy, and the like.

The video codec is configured to compress or decompress a digital video. The mobile terminal 100 may support one or more types of video codecs. In this way, the mobile terminal 100 can play or record videos in a plurality of coding formats, for example, moving picture experts group (moving picture experts group, MPEG) 1, MPEG 2, MPEG 3, and MPEG 4.

The NPU is a neural-network (neural-network, NN) computing processor that rapidly processes input information by referring to a structure of a biological neural network, for example, by referring to a transfer mode between human brain neurons, and can further perform self-learning continuously. The NPU may be used to implement intelligent cognition and other applications of the mobile terminal 100, such as image recognition, facial recognition, speech recognition, and text understanding.

The external memory interface 120 may be configured to connect to an external storage card such as a micro SD card, to extend a storage capability of the mobile terminal 100. The external storage card communicates with the processor 110 by using the external memory interface 120, to implement a data storage function. For example, files such as music and a video are stored on the external storage card.

The internal memory 121 may be configured to store computer-executable program code, and the executable program code includes an instruction. The processor 110 runs the instruction stored in the internal memory 121, to implement various function applications of the mobile terminal 100 and process data. The internal memory 121 may include a program storage area and a data storage area. The program storage area may store an operating system, an application program required by at least one function (for example, a voice play function or an image play function), and the like. The data storage area may store data (such as audio data and an address book) created during use of the mobile terminal 100, and the like. In addition, the internal memory 121 may include a high-speed random access memory, and may further include a nonvolatile memory, for example, at least one magnetic disk storage device, a flash storage device, or a universal flash storage (universal flash storage, UFS).

The mobile terminal 100 may implement an audio function, for example, music playing and recording, by using the audio module 170, the speaker 170A, the telephone receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may further be configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The mobile terminal 100 may be used to listen to music or answer a call in a hands-free mode over the speaker 170A.

The telephone receiver 170B, also referred to as an "earpiece", is configured to convert an audio electrical signal into a sound signal. When a call is answered or audio information is listened to by using the mobile terminal 100, the telephone receiver 170B may be put close to a human ear to listen to a voice.

The microphone 170C, also referred to as a "mike" or a "voice transmitter", is configured to convert a sound signal into an electrical signal. When making a call or sending voice information, a user may make a sound near the microphone 170C by using the mouth of the user, to input a sound signal to the microphone 170C. At least one microphone 170C may be disposed in the mobile terminal 100. In some other embodiments, two microphones 170C may be disposed in the mobile terminal 100, to collect a sound signal and implement a noise reduction function. In some other embodiments, three, four, or more microphones 170C may alternatively be disposed in the mobile terminal 100, to collect a sound signal, reduce noise, identify a sound source, implement a directional recording function, and the like.

The headset jack 170D is configured to connect to a wired headset. The headset jack 170D may be a USB interface 130, a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may be a parallel plate including at least two conductive materials. When a force is applied to the pressure sensor 180A, capacitance between electrodes changes. The mobile terminal 100 determines pressure strength based on a capacitance change. When a touch operation is performed on the display 194, the mobile terminal 100 detects strength of the touch operation by using the pressure sensor 180A. The mobile terminal 100 may further calculate a touch position based on a detection signal of the pressure sensor 180A. In some embodiments, touch operations that are applied to a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating an SMS message is executed.

The gyro sensor 180B may be configured to determine a motion posture of the mobile terminal 100. In some embodiments, angular velocities of the mobile terminal 100 around three axes (namely, x, y, and z axes) may be determined by using the gyro sensor 180B. The gyro sensor 180B may be used for image stabilization during photographing. For example, when the shutter is turned on, the gyro sensor 180B detects an angle at which the mobile terminal 100 jitters, calculates, based on the angle, a distance for which a lens module needs to compensate, and allows the lens to cancel the jitter of the mobile terminal 100 through reverse motion, to implement image stabilization. The gyro sensor 180B may also be used for navigation and a motion sensing game scene.

The barometric pressure sensor 180C is configured to measure barometric pressure. In some embodiments, the mobile terminal 100 calculates an altitude by using a barometric pressure value measured by the barometric pressure sensor 180C, to assist positioning and navigation.

The magnetic sensor 180D includes a Hall sensor. The mobile terminal 100 may detect opening and closing of a flip leather case by using the magnetic sensor 180D. In some embodiments, when the mobile terminal 100 is a flip phone, the mobile terminal 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect values of accelerations in various directions (usually on three axes) of the mobile terminal 100. When the mobile terminal 100 is still, a value and a direction of gravity can be detected. The acceleration sensor 180E may be further configured to identify a posture of the mobile terminal, and is applied to an application such as screen switching between a landscape mode and a portrait mode and a pedometer).

The range sensor 180F is configured to measure a distance. The mobile terminal 100 may measure a distance by using an infrared ray or a laser. In some embodiments, in a photographing scenario, the mobile terminal 100 may use the range sensor 180F to measure a distance, to implement fast focusing.

The optical proximity sensor 180G may include, for example, a light emitting diode (LED) and an optical detector such as a photodiode. The light-emitting diode may be an infrared light-emitting diode. The mobile terminal 100 emits infrared light to the outside by using the light emitting diode. The mobile terminal 100 uses a photodiode to detect infrared reflected light from an object nearby. When adequate reflected light is detected, it may be determined that there is an object near the mobile terminal 100. When inadequate reflected light is detected, the mobile terminal 100 may determine that there is no object near the mobile terminal 100. The mobile terminal 100 may detect, by using the optical proximity sensor 180G, that the user holds the mobile terminal 100 close to an ear to make a call, to automatically turn off the display for power saving. The optical proximity sensor 180G may also be used in a smart cover mode or a pocket mode to automatically unlock or lock the screen.

The ambient light sensor 180L is configured to sense ambient light brightness. The mobile terminal 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the mobile terminal 100 is in a pocket to prevent a false touch.

The fingerprint sensor 180H is configured to collect a fingerprint. The mobile terminal 100 may use a feature of the collected fingerprint to implement fingerprint unlocking, application access locking, fingerprint photographing, fingerprint call answering, and the like.

The temperature sensor 180J is configured to detect a temperature. In some embodiments, the mobile terminal 100 executes a temperature processing policy by using the temperature detected by the temperature sensor 180J. For example, when the temperature reported by the temperature sensor 180J exceeds a threshold, the mobile terminal 100 lowers performance of a processor located near the temperature sensor 180J, to reduce power consumption to implement thermal protection. In some other embodiments, when the temperature is below another threshold, the mobile terminal 100 heats the battery 142 to prevent abnormal shutdown of the mobile terminal 100 that is caused by the low temperature. In some other embodiments, when the temperature is below still another threshold, the mobile terminal 100 boosts an output voltage of the battery 142 to prevent abnormal shutdown caused by the low temperature.

The touch sensor 180K, also referred to as a "touch panel". The touch sensor 180K may be disposed in the display 194, and the touch sensor 180K and the display 194 constitute a touchscreen. The touch sensor 180K is configured to detect a touch operation on or near the touch sensor 180K. The touch sensor may transfer the detected touch operation to the application processor to determine a type of a touch event. Visual output related to the touch operation may be provided by using the display 194. In some other embodiments, the touch sensor 180K may also be disposed on a surface of the mobile terminal 100 at a position different from that of the display 194.

The bone conduction sensor 180M may collect a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in the headset, to obtain a bone conduction headset. The audio module 170 may obtain a voice signal through parsing based on the vibration signal, obtained by the bone conduction sensor 180M, of the vibration bone of the vocal-cord part, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The mobile terminal 100 may receive key input, and generate key signal input related to a user setting and function control of the mobile terminal 100.

The motor 191 may generate a vibration prompt. The motor 191 may be used for an incoming call vibration prompt and a touch vibration feedback. For example, touch operations performed on different applications (for example, photographing and audio playing) may correspond to different vibration feedback effects. The motor 191 may also correspond to different vibration feedback effects for touch operations applied to different areas of the display 194. Different application scenarios (for example, a time reminder, information receiving, an alarm clock, and a game) may also correspond to different vibration feedback effects. Customization of the touch vibration feedback effect may be further supported.

The indicator 192 may be an indicator light that may be configured to indicate a charging state and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile terminal 100. The mobile terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The mobile terminal 100 interacts with a network by using the SIM card, to implement functions such as calling and data communication. In some embodiments, the mobile terminal 100 uses an eSIM, namely, an embedded SIM card. The eSIM card may be embedded in the mobile terminal 100, and cannot be separated from the mobile terminal 100.

A software system of the mobile terminal 100 may use a layered architecture, an event-driven architecture, a microkernel architecture, a microservice architecture, or a cloud architecture. In the embodiments of the present invention, an Android system using a layered architecture is used as an example to illustrate a software structure of the mobile terminal 100.

Figure 2:
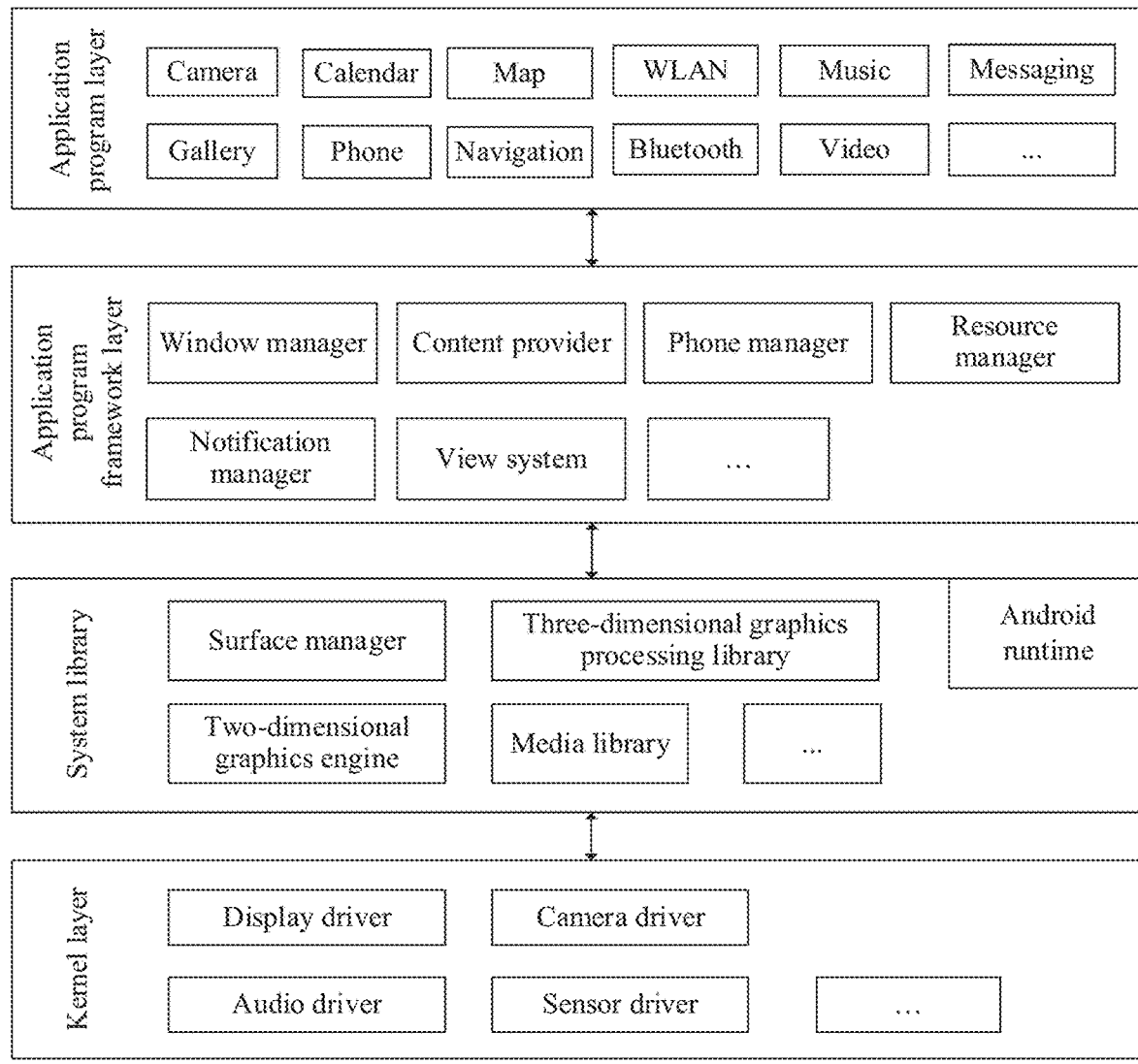
FIG. 2 is a schematic diagram of a software architecture according to an embodiment of this application.

FIG. 2 is a block diagram of the software structure of the mobile terminal 100 according to an embodiment of the present invention.

In the layered architecture, the software is divided into several layers, and each layer has a clear role and task. The layers communicate with each other by using a software interface. In some embodiments, the Android system is divided into four layers, namely, an application program layer, an application program framework layer, an Android runtime (Android runtime), a system library, and a kernel layer from top to bottom.

The application program layer may include a series of application program packages.

As shown in FIG. 2, the application program package may include application programs such as camera, gallery, calendar, phone, map, navigation, WLAN, Bluetooth, music, video, and messaging.

The application program framework layer provides an application programming interface (application programming interface, API) and a programming framework for an application program at the application program layer. The application program framework layer includes some pre-defined functions.

As shown in FIG. 2, the application program framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to: store and obtain data and make the data accessible to the application program. The data may include a video, an image, audio, calls that are made and answered, a browsing history and a bookmark, an address book, and the like.

The view system includes visual controls such as a control for displaying a text and a control for display a picture. The view system may be configured to construct an application program A display interface may include one or more views. For example, a display interface including an SMS message notification icon may include a view for displaying a text and a view for displaying a picture.

The phone manager is configured to provide a communication function of the mobile terminal 100, for example, management of a call status (including answering or declining).

The resource manager provides various resources such as a localized character string, an icon, a picture, a layout file, and a video file for an application program.

The notification manager enables an application program to display notification information in a status bar, and may be configured to convey a notification-type message. The notification-type message may automatically disappear after a short pause without user interaction. For example, the notification manager is configured to provide notifications of download completing, a message prompt, and the like. The notification manager may be a notification that appears on a top status bar of the system in a form of a graph or a scroll bar text, for example, a notification of an application program running on the background, or may be a notification that appears on the screen in a form of a dialog window. For example, text information is prompted in the status bar, an announcement is produced, the mobile terminal vibrates, or the indicator light blinks.

The Android runtime includes a kernel library and a virtual machine. The Android runtime is responsible for scheduling and management of the Android system.

The kernel library includes two parts: a function that needs to be called by a java language and a kernel library of Android.

The application program layer and the application program framework layer run on the virtual machine. The virtual machine executes java files of the application program layer and the application program framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of application programs.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the mobile terminal 100 by using an example with reference to a photographing capture scenario.

When the touch sensor 180K receives a touch operation, a corresponding hardware interruption is sent to the kernel layer. The kernel layer processes the touch operation into a raw input event (including information such as touch coordinates or a time stamp of the touch operation). The raw input event is stored at the kernel layer. The application program framework layer obtains the raw input event from the kernel layer, and identifies a control corresponding to the input event. For example, the touch operation is a touch tap operation, and a control corresponding to the tap operation is a control of an icon of a camera application. A camera application invokes an interface at the application framework layer to enable the camera application, then enables a camera driver by invoking the kernel layer, and captures a static image or a video by using the camera 193.

The following describes a frame rate at which a mobile terminal shoots a video in the embodiments of this application.

The frame rate (frame rate) is also referred to as a frame rate, and is in a unit of frame/second (fps). When the mobile terminal is used to record a video, the frame rate may refer to a quantity of static pictures captured by the mobile terminal per second. When a mobile terminal is playing a video at the same frame rate, the same quantity of static pictures are played per second. From a perspective of a user, these static pictures have a dynamic effect. Generally, when the frame rate is 8 fps or higher, the user feels that the video is played smoothly. The standard frame rate for movies is 24 fps or higher. When the frame rate of the video shot by the mobile terminal is lower, a quantity of static images captured by the mobile terminal per second is smaller, an exposure time period of each static image increases, and brightness of the static image increases.

A motion blur (a motion blur), also referred to as dynamic blur, is a moving effect in a scenery image, and definitely appears during long exposure or fast moving of an object in a scene. When the mobile terminal is shooting a video, if the mobile terminal is moving fast or an object in a shot image is moving fast, but a recording frame rate is relatively low, a motion blur occurs. The reason is that when the recording frame rate is relatively low, the mobile terminal captures a relatively small quantity of static images per second. In this case, an exposure time period of a static image increases. Because the mobile terminal is moving fast or an object in a shot image is moving fast, the object in the static image looks blurry or being dragged.

The embodiments of this application provide a recording frame rate control method, to control a recording frame rate of a mobile terminal based on one or more of three factors: light intensity in a photographing scenario during video recording performed by the mobile terminal, a motion status of the mobile terminal, and a motion status of a photographed object. The mobile terminal automatically adjusts the recording frame rate based on the light intensity in the photographing scenario, to improve brightness of a video image in a low brightness scenario and video smoothness in a high brightness scenario. The mobile terminal controls the frame rate based on the motion status of the mobile terminal, to improve smoothness of a video shot by the mobile terminal during motion. The mobile terminal controls the frame rate based on the motion status of the photographed object, to improve image smoothness when there is a moving object in a video image, and reduce a motion blur caused by motion of the photographed object in the shot image. In this way, the recording frame rate of the mobile terminal is automatically adjusted, and quality of a video image is improved.

The following specifically describes, with reference to application scenarios, the recording frame rate control method provided in the embodiments of this application.

Figure 3:
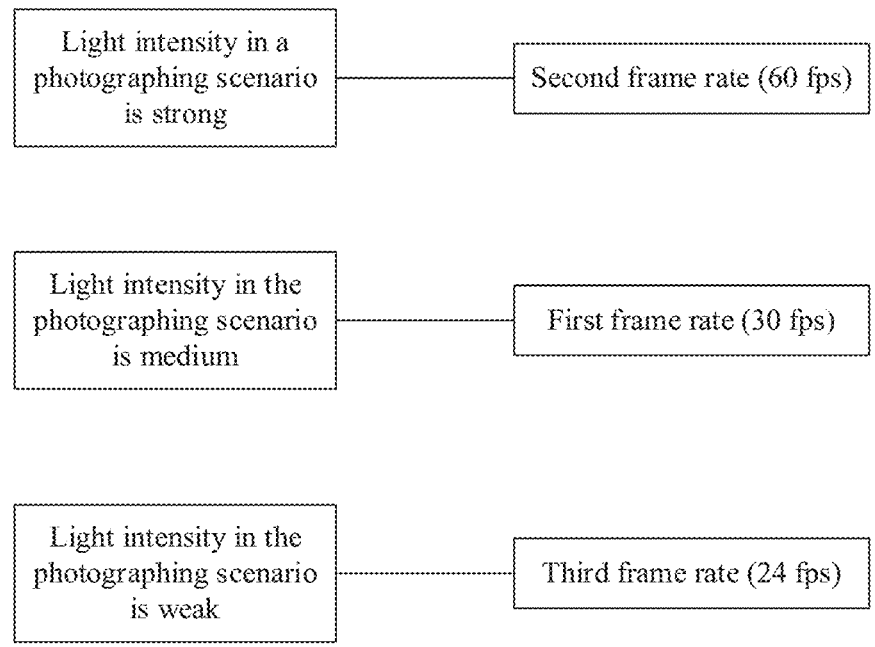
FIG. 3 is a schematic logical diagram of a recording frame rate control method according to an embodiment of this application.

In some application scenarios, when a mobile terminal is recording a video, light intensity in a photographed photographing scenario may change. For example, when the mobile terminal is recording a video, light intensity in a part of the photographing scenario may be relatively strong, and light intensity in another part of the photographing scenarios may be relatively weak. When the light intensity in the photographing scenario is relatively weak, image brightness of the video generated by the mobile terminal through video recording is also relatively weak, resulting in unclear details of the photographing scenario. For example, when a user uses the mobile terminal to record a video at night, the user first photographs a family member under room light, that is, a photographing scenario of the mobile terminal at first is in a building. Then, the lens is turned to an outdoor environment without light, and continues photographing an outdoor night scene. In this case, the photographing scenario of the mobile terminal is switched to an outdoor scenario. In this case, due to inadequate light in the outdoor night scene, image brightness of the video is also relatively low. Therefore, in an embodiment of this application, a recording frame rate control method shown in FIG. 3 is provided. A mobile terminal may automatically control a recording frame rate based on light intensity in a photographing scenario. When starting to record a video, the mobile terminal collects a video frame at a first frame rate (for example, 30 fps) by default. Then, when light intensity in a photographing scenario is strong, the mobile terminal may collect a video frame at a second frame rate (for example, 60 fps). When the mobile terminal determines that the light intensity in the photographing scenario is weak, the mobile terminal may collect a video frame at a third frame rate (for example, 24 fps). When the mobile terminal determines that the light intensity in the photographing scenario is medium, the mobile terminal may continue collecting a video frame at the first frame rate (for example, 30 fps). The second frame rate is greater than the first frame rate and the first frame rate is greater than the third frame rate. When the recording frame rate is decreased, an exposure time period of each frame of image shot by the mobile terminal is increased, to improve image brightness of the shot video. When the light intensity in the photographing scenario is relatively strong, exposure of a video shot by the mobile terminal is adequate, and the mobile terminal can increase a frame rate of the shot video. Because of the increase in the frame rate, a quantity of frames of images shot by the mobile terminal per second increases, and the video is smoother. Dynamically adjusting the frame rate based on the light intensity in the photographing scenario can improve image brightness of a video shot by the mobile terminal in a relatively dark photographing scenario and improve image smoothness of a video shot by the mobile terminal in a relatively bright photographing scenario, to improve quality of a video image.

Figure 4A:
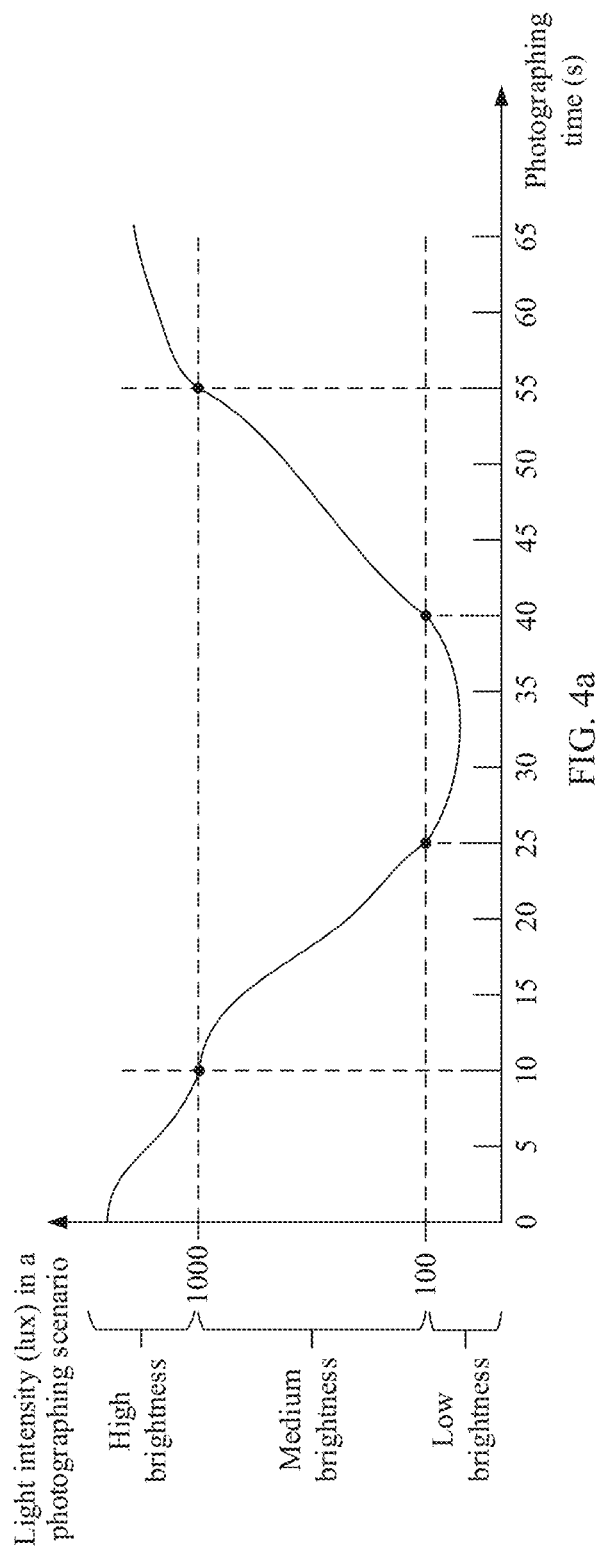
FIG. 4a and FIG. 4b show line graphs of a group of recording frame rates changing with light intensity in a photographing scenario according to an embodiment of this application.
Figure 4B:
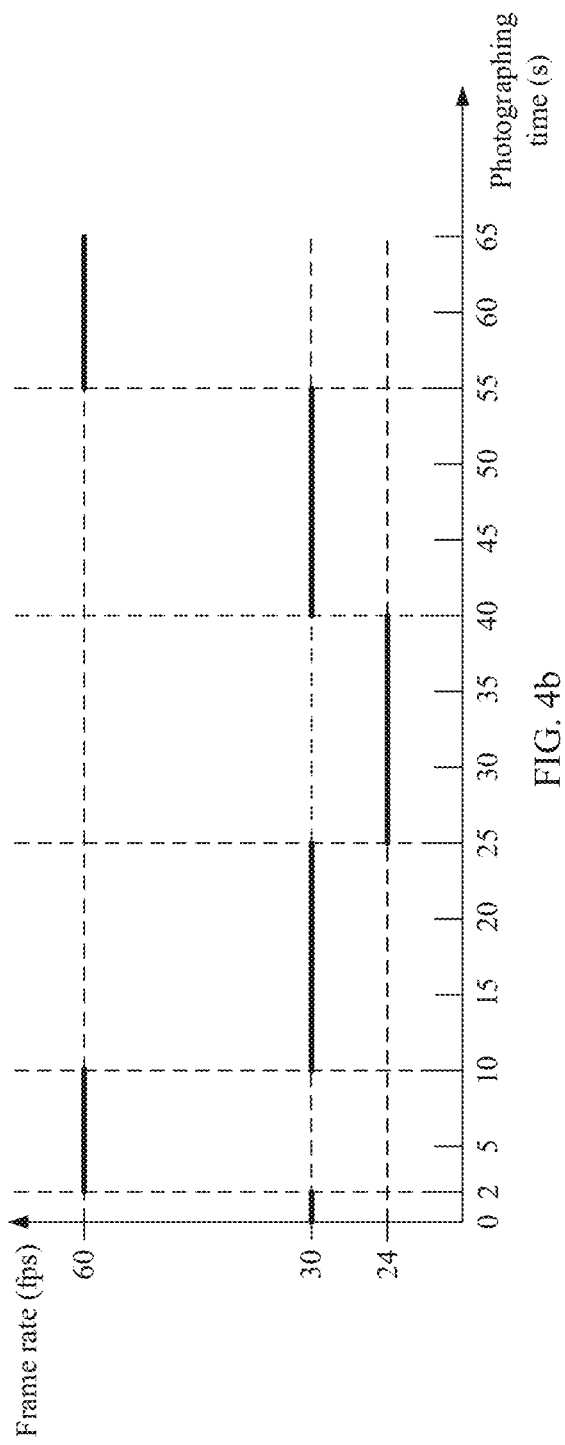

FIG. 4a is an example diagram showing a light intensity change of a photographing scenario during video recording performed by a mobile terminal according to an embodiment of this application, and FIG. 4b is a diagram showing a frame rate change during video shooting performed by a mobile terminal according to an embodiment of this application.

As shown in FIG. 4a, when a photographing time period of the mobile terminal is from the $0^{th}$ second to $10^{th}$ second, the light intensity in the photographing scenario during video recording performed by the mobile terminal is greater than a first light intensity threshold (for example, 1000 lux), and the photographing scenario is a high brightness scenario. When a photographing time period of the mobile terminal is from the $10^{th}$ second to the $25^{th}$ second, the light intensity in the photographing scenario is between a second light intensity threshold (for example, 100 lux) and the first light intensity threshold (for example, 1000 lux). When a photographing time period of the mobile terminal is from the $25^{th}$ second to the $40^{th}$ second, the light intensity in the photographing scenario is less than the second light intensity threshold (for example, 100 lux). When a photographing time period of the mobile terminal is from the $40^{th}$ second to the $55^{th}$ second, the light intensity in the photographing scenario is between the second light intensity threshold (for example, 100 lux) and the first light intensity threshold (for example, 1000 lux). When a photographing time period of the mobile terminal is from the $55^{th}$ second to the $65^{th}$ second, the light intensity in the photographing scenario is greater than the first light intensity threshold (for example, 1000 lux). The first light intensity threshold is greater than the second light intensity threshold.

As shown in FIG. 4b, when the mobile terminal starts to record a video (for example, in a photographing time period from the $0^{th}$ second to the $2^{nd}$ second), the mobile terminal may collect a video frame at the first frame rate (for example, 30 fps) by default. When a photographing time period of the mobile terminal is from the $2^{nd}$ second to the $10^{th}$ second, because the light intensity in the photographing scenario is greater than the first light intensity threshold (for example, 1000 lux) and the photographing scenario is a high brightness environment, the mobile terminal shoots the video at the second frame rate (for example, 60 fps), to ensure smoothness of the video. When a photographing time period of the mobile terminal is from the $10^{th}$ second to the $25^{th}$ second, because the light intensity in the photographing scenario is between the second light intensity threshold (for example, 100 lux) and the first light intensity threshold (for example, 1000 lux) and the photographing scenario is a medium-brightness environment, the mobile terminal may decrease the recording frame rate, and collect a video frame at the first frame rate (for example, 30 fps). In this way, an exposure time period of each frame of image of the video is prolonged, and image brightness of a video shot by the mobile terminal is improved while ensuring video smoothness. When a photographing time period of the mobile terminal is from the $25^{th}$ second to the $40^{th}$ second, because the light intensity in the photographing scenario is less than the second light intensity threshold (for example, 100 lux) and the light intensity in the photographing scenario is a low-brightness photographing scenario, the mobile terminal may further decrease the recording frame rate, and collect a video frame at the third frame rate (for example, 24 fps). In this way, the exposure time period of each frame of image of the video is further prolonged, and the image brightness of the video shot by the mobile terminal is improved in the low-brightness photographing scenario. The second frame rate (for example, 60 fps) is greater than the first frame rate (for example, 30 fps) and the first frame rate is greater than the third frame rate (for example, 24 fps). The second frame rate is not limited to 60 fps shown in FIG. 4b, and may be another value. The first frame rate is not limited to 30 fps shown in FIG. 4b either, and may be another value. The third frame rate is not limited to 24 fps shown in FIG. 4b, and may be another value.

In some possible implementations, when the mobile terminal decreases the recording frame rate, the mobile terminal may further adjust brightness of a video image in a stepped manner. For example, when the light intensity in the photographing scenario of the mobile terminal is 100 lux, if the recording frame rate of the mobile terminal is 30 fps, a value of the image brightness of the video shot by the mobile terminal is 40, and if the recording frame rate of the mobile terminal is decreased to 24 fps, the value of the image brightness of the video shot by the mobile terminal is 80. When the recording frame rate of the mobile terminal changes from 30 fps to 24 fps, the mobile terminal adjusts the value of the image brightness of the shot video from 40 to 80 in a stepped manner in a period of time (for example, within is). In this way, when the image brightness of the video changes, there may be a transition period, to improve image quality of the video shot by the mobile terminal and improve user experience.

In some possible implementations, when the mobile terminal is recording a video, the mobile terminal may first collect a video frame at the first frame rate (for example, 30 fps). If the mobile terminal detects that the light intensity in the photographing scenario is greater than the first light intensity threshold (for example, 1000 lux), the mobile terminal may collect a video frame at the second frame rate (for example, 60 fps). When the mobile terminal collects a video frame at the second frame rate, if the mobile terminal detects that the light intensity in the photographing scenario is between a fourth light intensity threshold (for example, 150 lux) and a third light intensity threshold (950 lux), the mobile terminal may collect a video frame at the first frame rate (for example, 30 fps). When the mobile terminal is recording a video, the mobile terminal may first collect a video frame at the first frame rate (for example, 30 fps). If the mobile terminal detects that the light intensity in the photographing scenario is less than the second light intensity threshold (for example, 100 lux), the mobile terminal may collect a video frame at the third frame rate (for example, 24 fps). If the mobile terminal first collects a video frame at the third frame rate (for example, 24 fps), when the mobile terminal detects that the light intensity in the photographing scenario is between the fourth light intensity threshold (for example, 150 lux) and the third light intensity threshold (for example, 950 lux), the mobile terminal may collect a video frame at the first frame rate (for example, 30 fps). The first light intensity threshold (for example, 1000 lux) is greater than the third light intensity threshold (for example, 950 lux), the third light intensity threshold is greater than the fourth light intensity threshold (for example, 150 lux), and the fourth light intensity threshold is greater than the second light intensity threshold (for example, 100 lux). In addition, a difference between the third light intensity threshold and the first light intensity threshold is a specified brightness difference (for example, 50 lux), and a difference between the fourth light intensity threshold and the second light intensity threshold is a specified brightness difference (for example, 50 lux). In this way, a frequent change of the recording frame rate caused when the light intensity in the photographing scenario changes around the first light intensity threshold or the second light intensity threshold can be prevented.

Figure 5:
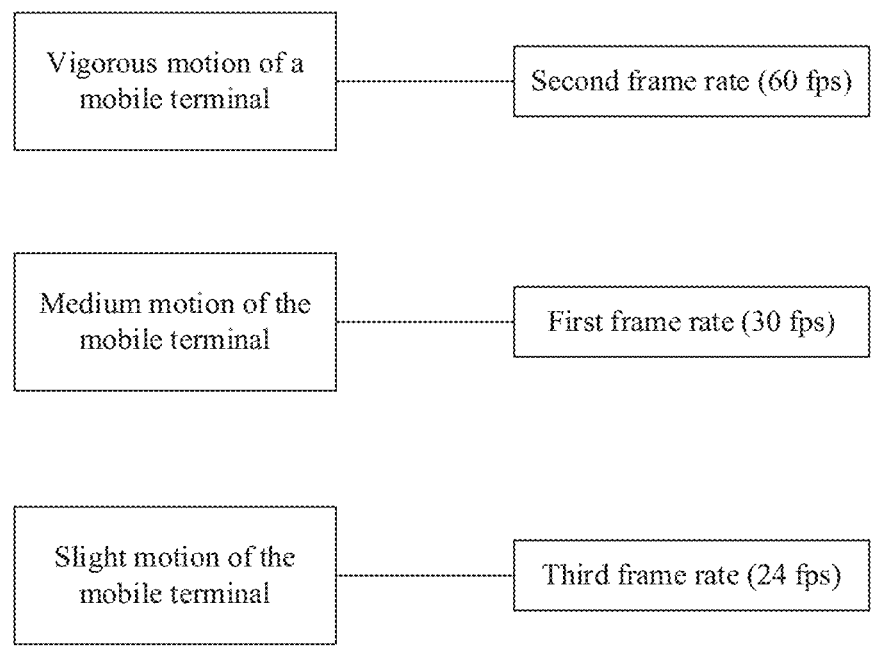
FIG. 5 is a schematic logical diagram of another recording frame rate control method according to an embodiment of this application.

In some motion scenarios of a mobile terminal, for example, when a user uses a mobile terminal to record a video on a moving vehicle, or when a user quickly rotates a mobile terminal to shoot some moving objects, because a motion status of the mobile terminal changes, when the mobile terminal shoots a video, an exposure time period of each frame of image in the shot video is excessively long due to a relatively low recording frame rate. An object in a frame of image may appear at different locations in the frame of image due to motion of the mobile terminal, causing a blur of the image. Therefore, in an embodiment of this application, a recording frame rate control method shown in FIG. 5 is provided. A mobile terminal may automatically control a recording frame rate based on a motion status of the mobile terminal. When starting to record a video, the mobile terminal may collect a video frame at a first frame rate (for example, 30 fps) by default. Then, when the mobile terminal is in a vigorous motion state, the mobile terminal may collect a video frame at a second frame rate (for example, 60 fps). When the mobile terminal is in a slight motion state, the mobile terminal may shoot the video at a third frame rate (for example, 24 fps). The second frame rate is greater than the first frame rate and the first frame rate is greater than the third frame rate. When the mobile terminal is in a medium motion state, the mobile terminal may collect a video frame at the second frame rate (for example, 30 fps). When the mobile terminal moves vigorously, the recording frame rate is increased, an exposure time period of each frame of image shot by the mobile terminal is reduced, and a blur of a video image caused by motion of the mobile terminal is reduced. In this way, a motion blur of a video shot by the mobile terminal in a vigorous motion state can be reduced, to improve video smoothness and quality of a video image.

Figure 6:
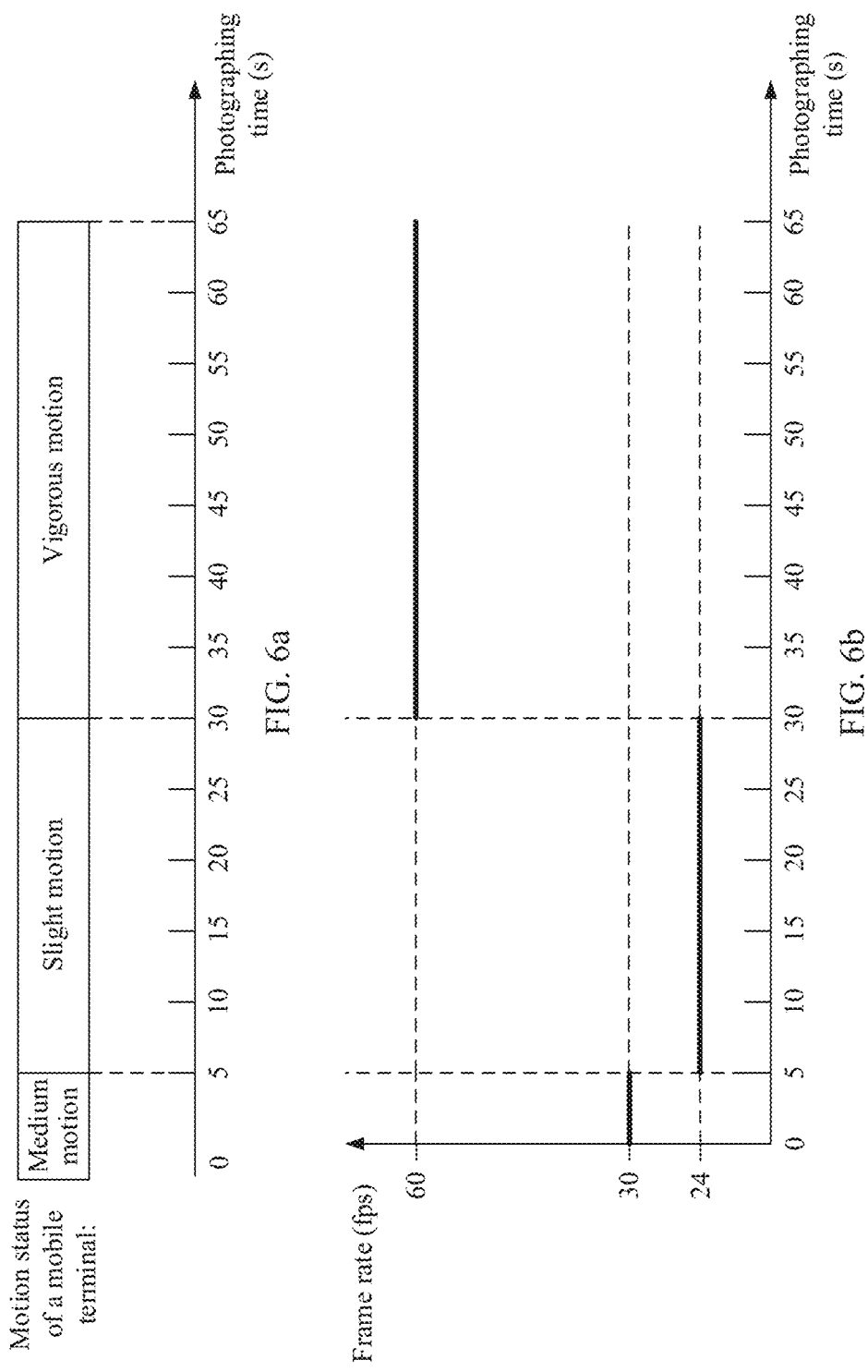
FIG. 6a and FIG. 6b show schematic line graphs of a group of recording frame rates changing with a motion status of a mobile terminal according to an embodiment of this application.

FIG. 6a is an example diagram showing a motion status of a mobile terminal according to an embodiment of this application, and FIG. 6b is a diagram showing a frame rate change during video shooting performed by a mobile terminal according to an embodiment of this application.

As shown in FIG. 6a, when a photographing time period of the mobile terminal is from the $0^{th}$ second to the $5^{th}$ second, the mobile terminal detects that the motion status of the mobile terminal is a medium motion state. When a photographing time period of the mobile terminal is from the $5^{th}$ second to the $30^{th}$ second, the mobile terminal detects that the motion status of the mobile terminal is a slight motion state. When a photographing time period of the mobile terminal is from the $30^{th}$ second to the $65^{th}$ second, the mobile terminal detects that the motion status of the mobile terminal is a vigorous motion state.

As shown in FIG. 6b, when the mobile terminal starts to record a video (for example, in a photographing time period from the $0^{th}$ second to the $2^{nd}$ second), the mobile terminal may collect a video frame at the first frame rate (for example, 30 fps) by default. When a photographing time period of the mobile terminal is from the $2^{nd}$ second to the $5^{th}$ Second, because the motion status of the mobile terminal is a medium motion state, the mobile terminal continues collecting a video frame at the first frame rate (for example, 30 fps), to ensure smoothness of the video. When a photographing time period of the mobile terminal is from the $5^{th}$ second to the $30^{th}$ second, because the motion status of the mobile terminal is a slight motion state, the mobile terminal may decrease the recording frame rate, and collect a video frame at the third frame rate (for example, 24 fps). In this way, an exposure time period of each frame of image is prolonged, and brightness of each frame of image is improved. When a photographing time period of the mobile terminal is from the $30^{th}$ second to the $65^{th}$ second, because the motion status of the mobile terminal is a vigorous motion state, the mobile terminal may increase the recording frame rate, and collect a video frame at the second frame rate (for example, 60 fps). In this way, an exposure time period of each frame of image is shortened, a motion blur caused by motion of the mobile terminal is reduced, and image smoothness of the video shot by the mobile terminal is improved. The second frame rate (for example, 60 fps) is greater than the first frame rate (for example, 30 fps) and the first frame rate is greater than the third frame rate (for example, 24 fps). The second frame rate is not limited to 60 fps shown in FIG. 6b, and may be another value. The first frame rate is not limited to 30 fps shown in FIG. 6b either, and may be another value. The third frame rate is not limited to 24 fps shown in FIG. 6b, and may be another value.

Figure 7:
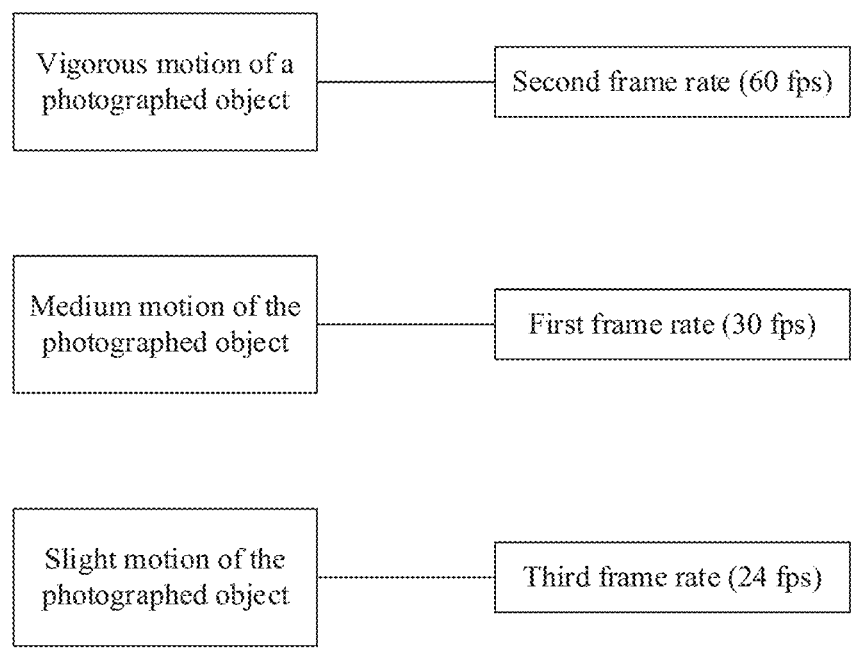
FIG. 7 is a schematic logical diagram of another recording frame rate control method according to an embodiment of this application.

In some motion scenarios of a photographed object, for example, when a user uses a mobile terminal to photograph a moving vehicle, because a motion status of the photographed object changes, when the mobile terminal shoots a video, an exposure time period of each frame of image in the shot video is excessively long due to a relatively low recording frame rate. An object moving at a high speed in a frame of image may appear at different locations in the frame of image, causing a blur of the image. Therefore, in an embodiment of this application, a recording frame rate control method shown in FIG. 7 is provided. A mobile terminal may automatically control a recording frame rate based on a motion status of a photographed object. When starting to record a video, the mobile terminal may collect a video frame at a first frame rate (for example, 30 fps) by default. Then, when the mobile terminal detects that the motion status of the photographed object is a vigorous motion state, the mobile terminal may shoot the video at a second frame rate (for example, 60 fps). When the mobile terminal detects that the motion status of the photographed object is a slight motion state, the mobile terminal may shoot a video at the third frame rate (for example, 24 fps). When the mobile terminal detects that the motion status of the photographed object is a medium motion state, the mobile terminal may shoot the video at the first frame rate (for example, 30 fps). The second frame rate is greater than the first frame rate and the first frame rate is greater than the third frame rate. Because a recording frame rate is increased when the photographed object moves vigorously, an exposure time period of each frame of image photographed by the mobile terminal is shortened, and a blur of a video image caused by motion of the photographed object is reduced. Because the recording frame rate is decreased when the photographed object moves slightly, a quantity of frames of images shot per second is reduced, and an exposure time period of each frame of image is prolonged. Therefore, image brightness of the shot video can be ensured, and power consumption caused when the mobile terminal processes the shot images is reduced. In this way, a motion blur of a video shot when the photographed object is in a vigorous motion state can be reduced, to improve video smoothness and quality of a video image.

Figure 8:
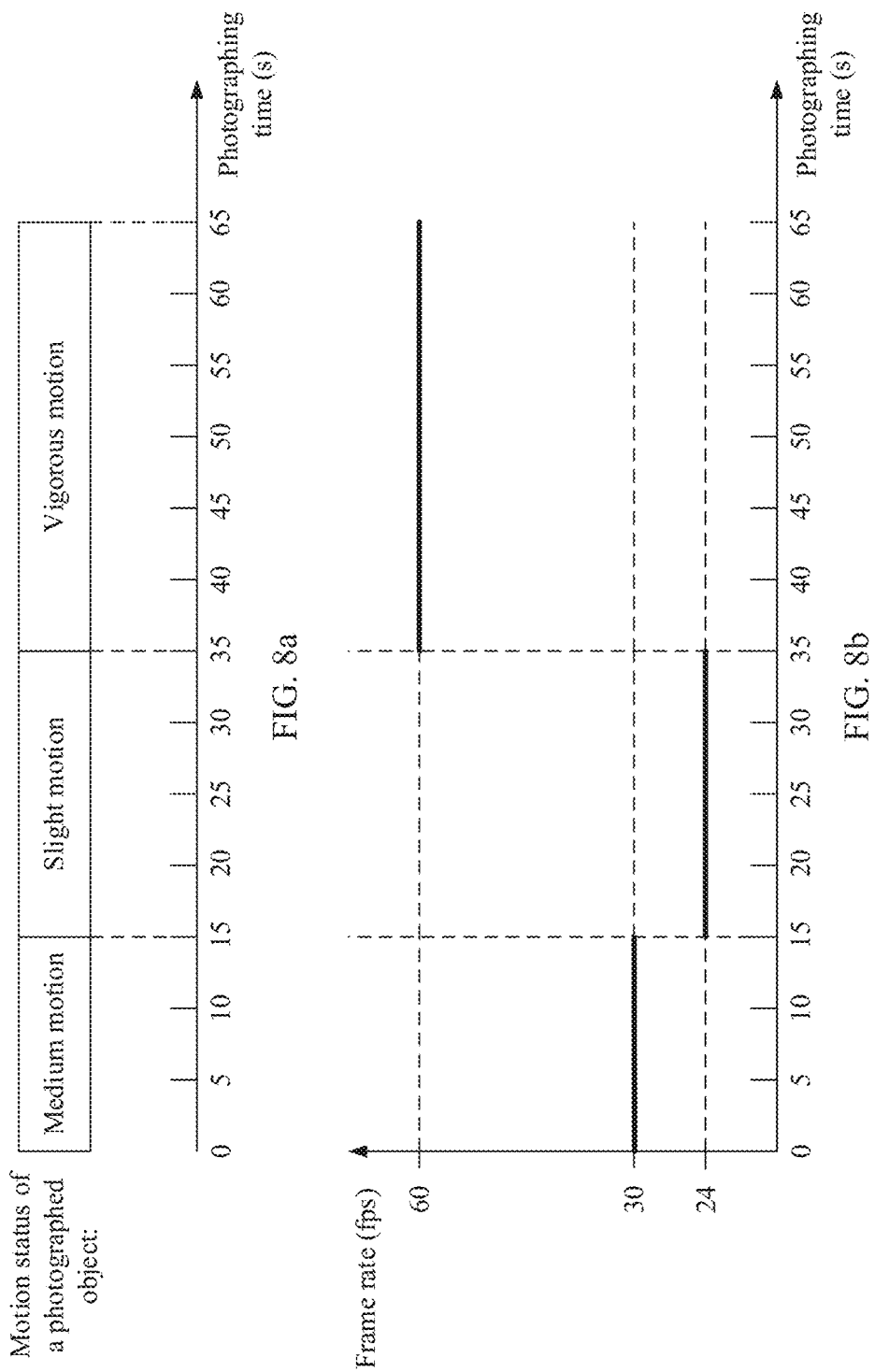
FIG. 8a and FIG. 8b show schematic line graphs of a group of recording frame rates changing with a motion status of a photographed object according to an embodiment of this application.

FIG. 8a is an example diagram showing a motion status of an object photographed by a mobile terminal according to an embodiment of this application, and FIG. 8b is a diagram showing a frame rate change during video shooting performed by a mobile terminal according to an embodiment of this application.

As shown in FIG. 8a, when a photographing time period of the mobile terminal is from the $0^{th}$ second to the $15^{th}$ second, the mobile terminal detects that the motion status of the photographed object is a medium motion state. When a photographing time period of the mobile terminal is from the $15^{th}$ second to the $35^{th}$ second, the mobile terminal detects that the motion status of the photographed object is a slight motion state. When a photographing time period of the mobile terminal is from the $35^{th}$ second to the $65^{th}$ second, the mobile terminal detects that the motion status of the photographed object is a vigorous motion state.

As shown in FIG. 8b, when the mobile terminal starts to record a video (for example, in a photographing time period from the $0^{th}$ second to the $2^{nd}$ second), the mobile terminal may collect a video frame at the first frame rate (for example, 30 fps) by default. When a photographing time period of the mobile terminal is from the $2^{nd}$ second to the $15^{th}$ second, because the mobile terminal detects that the motion status of the photographed object is a medium motion state, the mobile terminal continues shooting the video at the first frame rate (for example, 30 fps), to ensure smoothness of the video. When a photographing time period of the mobile terminal is from the $15^{th}$ second to the $35^{th}$ second, because the motion status of the photographed object is a slight motion state, the mobile terminal may decrease the frame rate, and shoot the video at the third frame rate (for example, 24 fps). In this way, an exposure time period of each frame of image is prolonged, and brightness of each frame of image is improved. When a photographing time period of the mobile terminal is from the $35^{th}$ second to the $65^{th}$ second, because the motion status of the mobile terminal is a vigorous motion state, the mobile terminal may increase the recording frame rate, and shoot the video at the second frame rate (for example, 60 fps). In this way, an exposure time period of each frame of image is shortened, a motion blur caused by motion of the photographed object is reduced, and image smoothness of the video shot by the mobile terminal is improved. The second frame rate (for example, 60 fps) is greater than the first frame rate (for example, 30 fps) and the first frame rate is greater than the third frame rate (for example, 24 fps). The second frame rate is not limited to 60 fps shown in FIG. 8b, and may be another value. The first frame rate is not limited to 30 fps shown in FIG. 8b either, and may be another value. The third frame rate is not limited to 24 fps shown in FIG. 8b, and may be another value.

Figure 9:
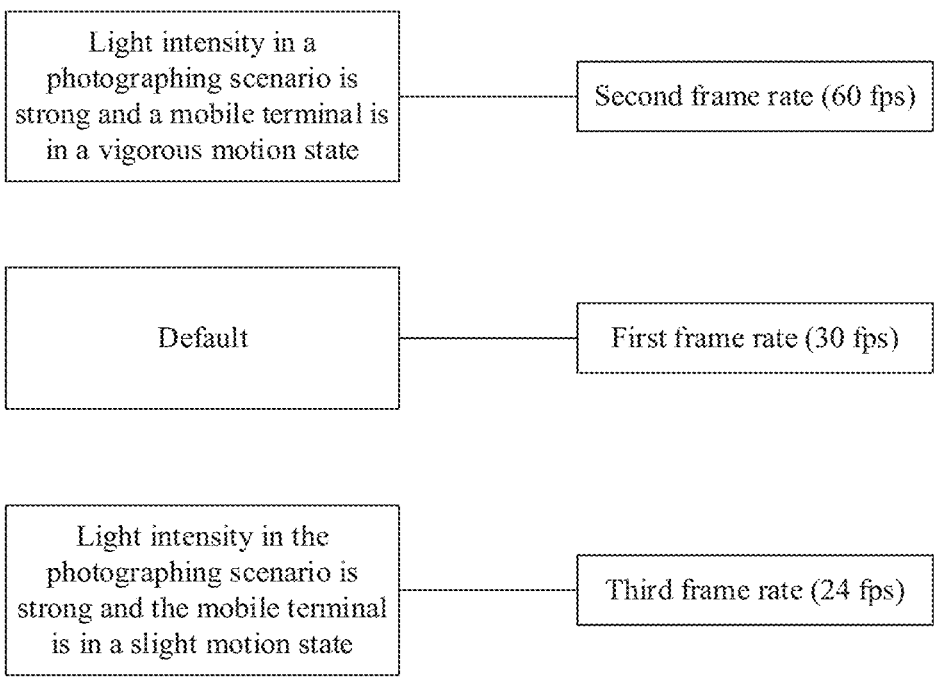
FIG. 9 is a schematic logical diagram of another recording frame rate control method according to an embodiment of this application.

In some application scenarios, light intensity in a photographing scenario of a mobile terminal is weak and strong at times, and the mobile terminal records a video during motion. For example, at night, a user holds a mobile terminal and moves from an indoor high brightness scenario to an outdoor low-brightness photographing scenario, to shoot a segment of video. Because light intensity in the photographing scenario of the mobile terminal is weak and strong at times, when the light intensity in the photographing scenario is relatively weak, and a recording frame rate is excessively high, an exposure time period of each frame of image is inadequate, and image brightness of the video recorded by the mobile terminal is also relatively low. Because the mobile terminal records a video during motion, when the mobile terminal is in a vigorous motion state, a motion blur may occur in an image of the shot video due to an excessively low frame rate. Therefore, in an embodiment of this application, a recording frame rate control method shown in FIG. 9 is provided. A mobile terminal may automatically control a recording frame rate based on light intensity in a photographing scenario and a motion status of the mobile terminal. When starting to record a video, the mobile terminal may collect a video frame at a first frame rate (for example, 30 fps) by default. Then, when the light intensity in the photographing scenario is strong and the mobile terminal is in a vigorous motion state, the mobile terminal may collect a video frame at a second frame rate (for example, 60 fps). When the light intensity in the photographing scenario is weak and the motion status of the mobile terminal is a slight motion state, the mobile terminal may collect a video frame at a third frame rate (for example, 24 fps). In another case, the mobile terminal collects a video frame at the first frame rate (for example, 30 fps). The second frame rate is greater than the first frame rate and the first frame rate is greater than the third frame rate. Because the recording frame rate is high when the light intensity in the photographing scenario is strong and the mobile terminal is in a vigorous motion state, a quantity of frames of images shot by the mobile terminal per second increases, and an exposure time period of each frame of image is shortened. In this way, a motion blur of a video image caused by the vigorous motion of the mobile terminal can be reduced, to improve video smoothness. In addition, because the light intensity in the photographing scenario is strong, even if the recording frame rate is high, each frame of image is relatively bright. Because the recording frame rate is low when the light intensity in the photographing scenario is weak and the mobile terminal is in a slight motion state, a quantity of frames of images shot by the mobile terminal per second decreases, and an exposure time period of each frame of image is prolonged. In this way, image brightness of the video in a low brightness environment is improved. In this way, with reference to the ambient light intensity and a motion status of the mobile terminal, image brightness of a video and smoothness of the video in a high brightness scenario are improved through control on several levels of frame rates.

Figure 10A:
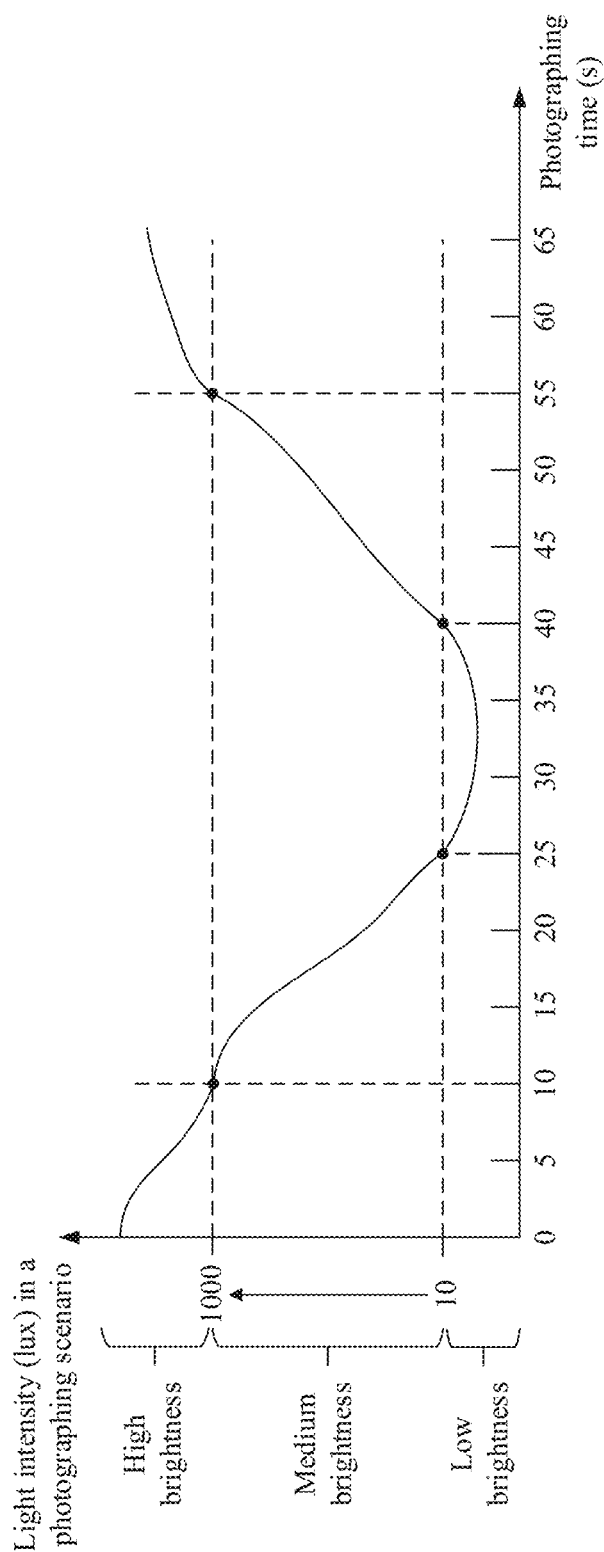
FIG. 10a to FIG. 10c show schematic line graphs of a group of recording frame rates changing with light intensity in a photographing scenario and a motion status of a mobile terminal according to an embodiment of this application.
Figure 10B:
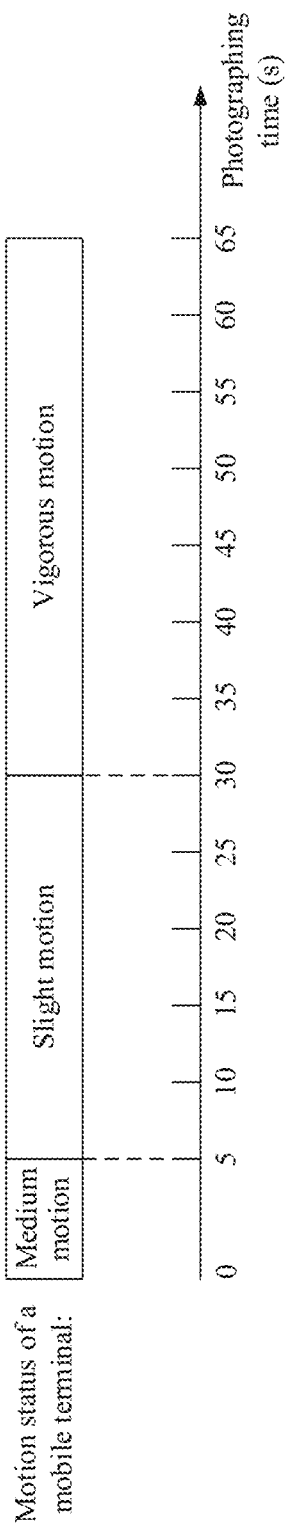
Figure 10C:
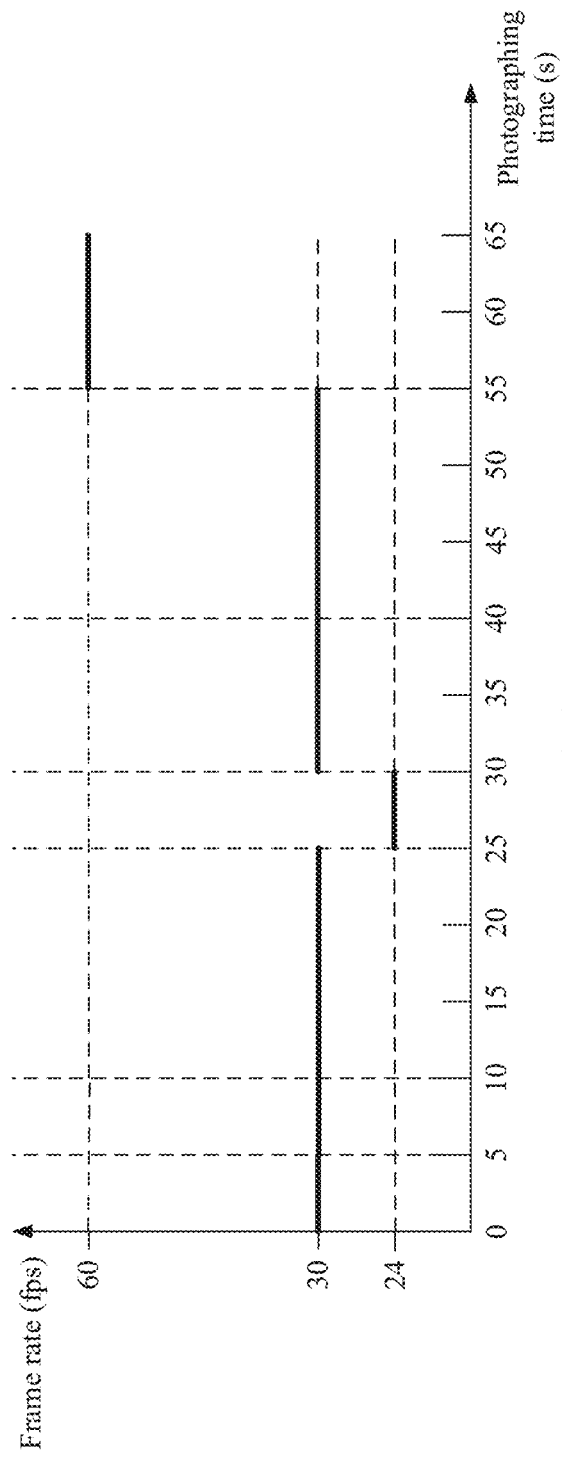

FIG. 10a is an example diagram showing a light intensity change of a photographing scenario of a mobile terminal according to an embodiment of this application, FIG. 10b is a diagram showing a motion status change of a mobile terminal according to an embodiment of this application, and FIG. 10c is a diagram showing a frame rate change during video shooting performed by a mobile terminal according to an embodiment of this application.

As shown in FIG. 10a, when a photographing time period of the mobile terminal is from the $0^{th}$ second to $10^{th}$ second, the mobile terminal detects that the light intensity in the photographing scenario is greater than a first light intensity threshold (for example, 1000 lux). When a photographing time period of the mobile terminal is from the $10^{th}$ second to the $25^{th}$ second, the mobile terminal detects that the light intensity in the photographing scenario is between a second light intensity threshold (for example, 100 lux) and the first light intensity threshold (for example, 1000 lux). When a photographing time period of the mobile terminal is from the $25^{th}$ second to the $40^{th}$ second, the mobile terminal detects that the light intensity in the photographing scenario is less than the second light intensity threshold (for example, 100 lux). When a photographing time period of the mobile terminal is from the $40^{th}$ second to the $55^{th}$ second, the mobile terminal detects that the light intensity in the photographing scenario is between a second light intensity threshold (for example, 100 lux) and the first light intensity threshold (for example, 1000 lux). When a photographing time period of the mobile terminal is from the $55^{th}$ second to the $65^{th}$ second, the mobile terminal detects that the light intensity in the photographing scenario is greater than the first light intensity threshold (for example, 1000 lux). The first light intensity threshold is greater than the second light intensity threshold.

As shown in FIG. 10b, when a photographing time period of the mobile terminal is from the $0^{th}$ second to the $5^{th}$ second, the mobile terminal detects that the motion status of the mobile terminal is a medium motion state. When a photographing time period of the mobile terminal is from the $5^{th}$ second to the $30^{th}$ second, the mobile terminal detects that the motion status of the mobile terminal is a slight motion state. When a photographing time period of the mobile terminal is from the $30^{th}$ second to the $65^{th}$ second, the mobile terminal detects that the motion status of the mobile terminal is a vigorous motion state.

As shown in FIG. 10c, when the mobile terminal starts to record a video (for example, in a photographing time period from the $0^{th}$ second to the $2^{nd}$ second), the mobile terminal may collect a video frame at the first frame rate (for example, 30 fps) by default. When a photographing time period of the mobile terminal is from the $2^{nd}$ second to the $5^{th}$ second, because the light intensity in the photographing scenario of the mobile terminal is greater than the first light intensity threshold (for example, 1000 lux), the photographing scenario is a high brightness environment, and the motion status of the mobile terminal is a medium motion state, the mobile terminal continues collecting a video frame at the first frame rate (for example, 30 fps). When a photographing time period of the mobile terminal is from the $5^{th}$ second to the $10^{th}$ second, because the light intensity in the photographing scenario of the mobile terminal is greater than the first light intensity threshold, the photographing scenario is a high brightness scenario, and the motion status of the mobile terminal is a slight motion state, the mobile terminal continues shooting the video at the first frame rate. When a photographing time period of the mobile terminal is from the $10^{th}$ second to the $25^{th}$ second, because the light intensity in the photographing scenario of the mobile terminal is between the second light intensity threshold (for example, 100 lux) and the first light intensity threshold, the photographing scenario is a medium brightness scenario, and the motion status of the mobile terminal is a slight motion state, the mobile terminal continues collecting a video frame at the first frame rate. When a photographing time period of the mobile terminal is from the $25^{th}$ second to the $30^{th}$ second, because the light intensity in the photographing scenario of the mobile terminal is less than the second light intensity threshold, the photographing scenario is a low brightness scenario, and the motion status of the mobile terminal is a slight motion state, the mobile terminal collects a video frame at the third frame rate (for example, 24 fps). When a photographing time period of the mobile terminal is from the $30^{th}$ second to the $40^{th}$ second, because the light intensity in the photographing scenario of the mobile terminal is less than the second light intensity threshold, the photographing scenario is a low brightness scenario, and the motion status of the mobile terminal is a vigorous motion state, the mobile terminal shoots the video at the first frame rate. When a photographing time period of the mobile terminal is from the $40^{th}$ second to the $55^{th}$ second, because the light intensity in the photographing scenario of the mobile terminal is between the second light intensity threshold and the first light intensity threshold, the photographing scenario is a medium-brightness environment, and the motion status of the mobile terminal is a vigorous motion state, the mobile terminal shoots the video at the first frame rate. When a photographing time period of the mobile terminal is from the $55^{th}$ second to the $65^{th}$ second, the light intensity in the photographing scenario of the mobile terminal is greater than the first light intensity threshold, the photographing scenario is a high brightness scenario, and the motion status of the mobile terminal is a vigorous motion state, the mobile terminal shoots the video at the second frame rate (for example, 60 fps). The second frame rate (for example, 60 fps) is greater than the first frame rate (for example, 30 fps) and the first frame rate is greater than the third frame rate (for example, 24 fps).

Figure 11:
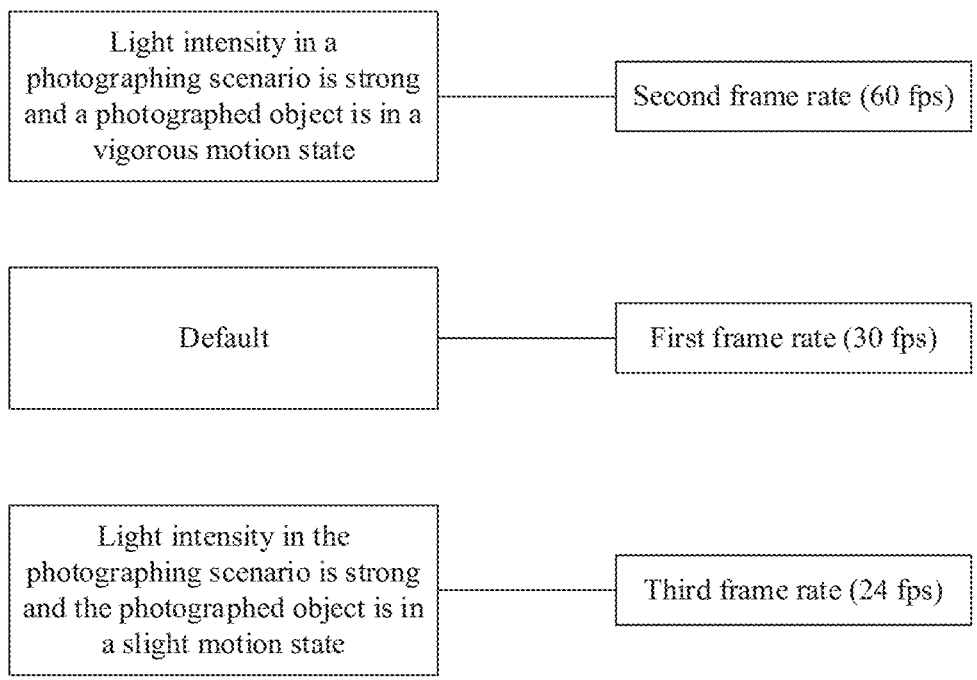
FIG. 11 is a schematic logical diagram of another recording frame rate control method according to an embodiment of this application.

In some application scenarios, a photographing scenario in which a mobile terminal records a video is switched between a high brightness scenario and a low brightness scenario, and an object photographed by the mobile terminal is moving. When light intensity in the photographing scenario is relatively weak, if a recording frame rate is excessively high, an exposure time period of each frame of image is inadequate, and image brightness of the video shot by the mobile terminal is also relatively low. When the mobile terminal is in a vigorous motion state, a motion blur may occur in an image of the shot video due to an excessively low recording frame rate. Therefore, in an embodiment of this application, a recording frame rate control method shown in FIG. 11 is provided. A mobile terminal may automatically control a recording frame rate based on light intensity in a photographing scenario and a motion status of a photographed object. When starting to record a video, the mobile terminal may collect a video frame at a first frame rate (for example, 30 fps) by default. Then, when the light intensity in the photographing scenario is strong and the photographed object is in a vigorous motion state, the mobile terminal may collect a video frame at a second frame rate (for example, 60 fps). When the light intensity in the photographing scenario is weak and the motion status of the photographed object is a slight motion state, the mobile terminal may collect the video frame at the third frame rate (for example, 24 fps). In another case, the mobile terminal collects a video frame at the first frame rate (for example, 30 fps). The second frame rate is greater than the first frame rate and the first frame rate is greater than the third frame rate. Because the recording frame rate is high when the light intensity in the photographing scenario is strong and the mobile terminal is in a vigorous motion state, a quantity of frames of images shot by the mobile terminal per second increases, and an exposure time period of each frame of image is shortened. In this way, a motion blur of a video image caused by the vigorous motion of the photographed object can be reduced, to improve video smoothness. In addition, because the light intensity in the photographing scenario is strong, even if the recording frame rate is high, each frame of image is relatively bright. Because the recording frame rate is low when the light intensity in the photographing scenario is weak and the photographed object is in a slight motion state, a quantity of frames of images shot by the mobile terminal per second decreases, and an exposure time period of each frame of image is prolonged. In this way, image brightness of the video in a low-brightness photographing scenario is improved. In other conditions, the mobile terminal may shoot a video at a common frame rate (less than a high frame rate and greater than a low frame rate). In this way, with reference to the light intensity in the photographing scenario and the motion status of the photographed object, image brightness of a video and smoothness of the video in a high brightness scenario are improved through control on several levels of frame rates.

Figure 12A:
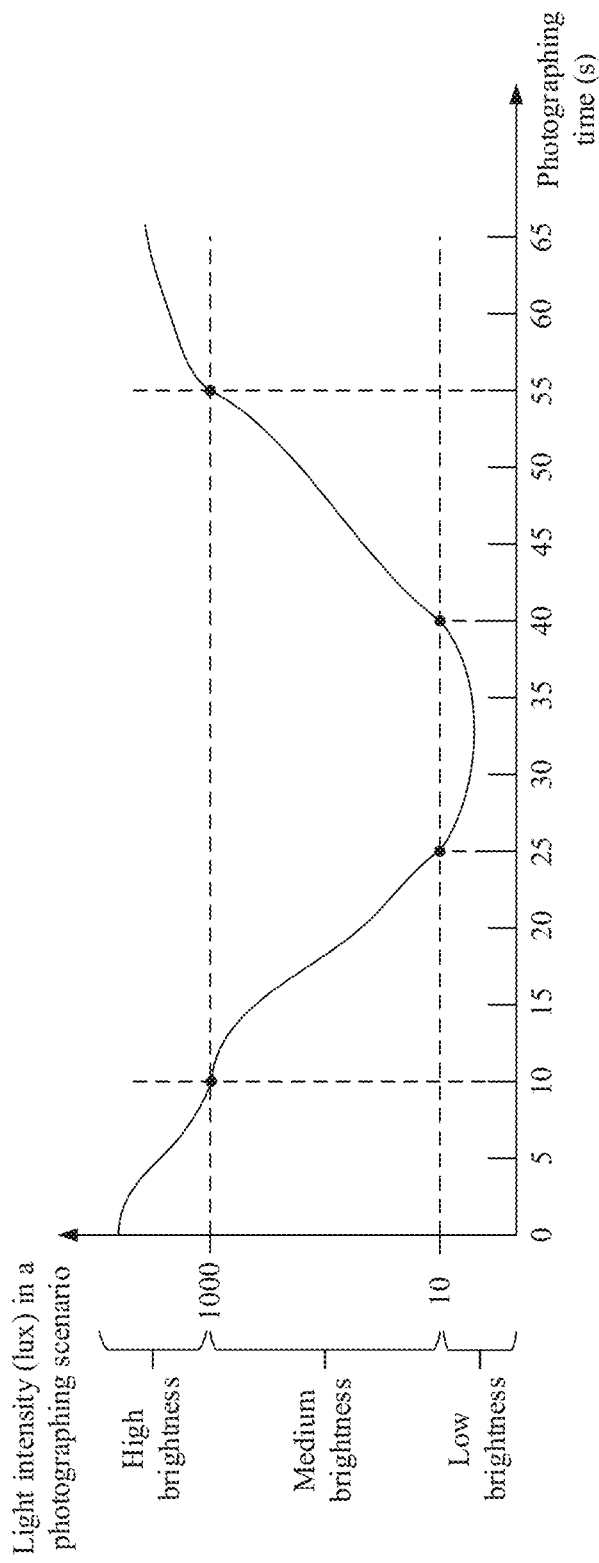
FIG. 12a to FIG. 12c show schematic line graphs of a group of recording frame rates changing with light intensity in a photographing scenario and a motion status of a photographed object according to an embodiment of this application.
Figure 12B:
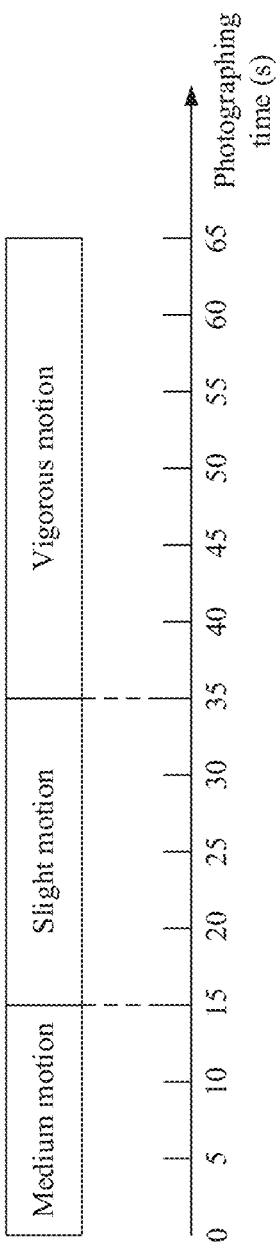
Figure 12C:
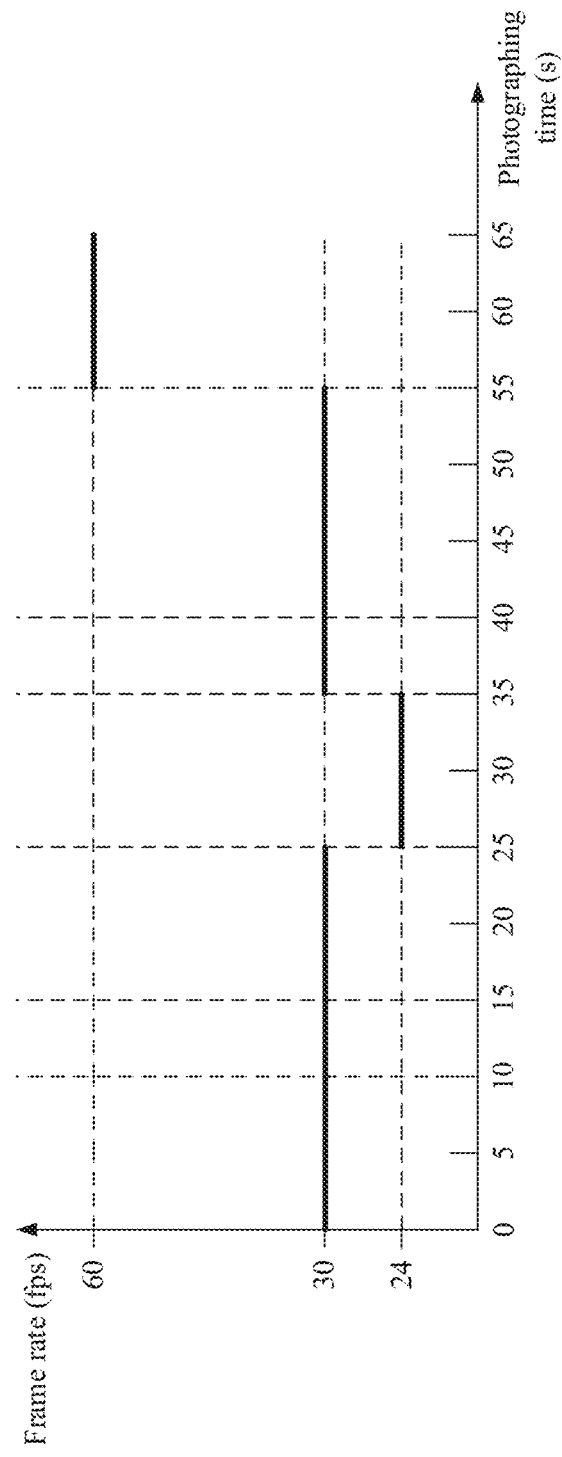

FIG. 12a is an example diagram showing a light intensity change of a photographing scenario of a mobile terminal according to an embodiment of this application, FIG. 12b is a diagram showing a motion status change of a photographed object according to an embodiment of this application, and FIG. 12c is a diagram showing a frame rate change during video shooting performed by a mobile terminal according to an embodiment of this application.

As shown in FIG. 12a, when a photographing time period of the mobile terminal is from the $0^{th}$ second to $10^{th}$ second, the mobile terminal detects that the light intensity in the photographing scenario is greater than a first light intensity threshold (for example, 1000 lux). When a photographing time period of the mobile terminal is from the $10^{th}$ second to the $25^{th}$ second, the mobile terminal detects that the light intensity in the photographing scenario is between a second light intensity threshold (for example, 100 lux) and the first light intensity threshold (for example, 1000 lux), and the photographing scenario is a medium brightness scenario. When a photographing time period of the mobile terminal is from the $25^{th}$ second to the $40^{th}$ second, the mobile terminal detects that the light intensity in the photographing scenario is less than the second light intensity threshold (for example, 100 lux). When a photographing time period of the mobile terminal is from the $40^{th}$ second to the $55^{th}$ second, the mobile terminal detects that the light intensity in the photographing scenario is between a second light intensity threshold (for example, 100 lux) and the first light intensity threshold (for example, 1000 lux). When a photographing time period of the mobile terminal is from the 55th second to the $65^{th}$ second, the mobile terminal detects that the light intensity in the photographing scenario is greater than the first light intensity threshold (for example, 1000 lux). The first light intensity threshold is greater than the second light intensity threshold.

As shown in FIG. 12b, when a photographing time period of the mobile terminal is from the $0^{th}$ second to the $15^{th}$ second, the mobile terminal detects that the motion status of the photographed object is a medium motion state. When a photographing time period of the mobile terminal is from the $15^{th}$ second to the $35^{th}$ second, the mobile terminal detects that the motion status of the photographed object is a slight motion state. When a photographing time period of the mobile terminal is from the $35^{th}$ second to the $65^{th}$ second, the mobile terminal detects that the motion status of the photographed object is a vigorous motion state.

As shown in FIG. 12c, when the mobile terminal starts to record a video (for example, in a photographing time period from the $0^{th}$ second to the $2^{nd}$ second), the mobile terminal may collect a video frame at the first frame rate (for example, 30 fps) by default. When a photographing time period of the mobile terminal is from the $2^{nd}$ second to the $10^{th}$ second, because the light intensity in the photographing scenario is greater than the first light intensity threshold (for example, 1000 lux), the photographing scenario is a high brightness scenario, and the motion status of the photographed object is a medium motion state, the mobile terminal may continue collecting a video frame at the first frame rate (for example, 30 fps). When a photographing time period of the mobile terminal is from the $10^{th}$ second to the 15$^{th}$ second, because the light intensity in the photographing scenario of the mobile terminal is between the second light intensity threshold (for example, 100 lux) and the first light intensity threshold, the photographing scenario is a medium brightness scenario, and the motion status of the photographed object is a medium motion state, the mobile terminal continues collecting a video frame at the first frame rate. When a photographing time period of the mobile terminal is from the 15$^{th}$ second to the 25$^{th}$ second, because the light intensity in the photographing scenario is between the second light intensity threshold (for example, 100 lux) and the first light intensity threshold, the photographing scenario is a medium brightness scenario, and the motion status of the photographed object is a slight motion state, the mobile terminal continues collecting a video frame at the first frame rate. When a photographing time period of the mobile terminal is from the 25$^{th}$ second to the 35$^{th}$ second, because the light intensity in the photographing scenario of the mobile terminal is less than the second light intensity threshold, the photographing scenario is a low brightness scenario, and the motion status of the photographed object is a slight motion state, the mobile terminal collects a video frame at the third frame rate (for example, 24 fps). When a photographing time period of the mobile terminal is from the 35$^{th}$ second to the 40$^{th}$ second, because the light intensity in the photographing scenario of the mobile terminal is less than the second light intensity threshold, the photographing scenario is a low brightness scenario, and the motion status of the photographed object is a vigorous motion state, the mobile terminal collects a video frame at the first frame rate (for example, 30 fps). When a photographing time period of the mobile terminal is from the 40$^{th}$ second to the 55$^{th}$ second, because the light intensity in the photographing scenario of the mobile terminal is between the second light intensity threshold and the first light intensity threshold, the photographing scenario is a medium-brightness environment, and the motion status of the photographed object is a vigorous motion state, the mobile terminal collects a video frame at the first frame rate (for example, 30 fps). When a photographing time period of the mobile terminal is from the 55$^{th}$ second to the 65$^{th}$ second, because the light intensity in the photographing scenario of the mobile terminal is greater than the first light intensity threshold, the photographing scenario is a high brightness environment, and the motion status of the photographed object is a vigorous motion state, the mobile terminal collects a video frame at the second frame rate (for example, 60 fps). The second frame rate (for example, 60 fps) is greater than the first frame rate (for example, 30 fps) and the first frame rate is greater than the third frame rate (for example, 24 fps).

Figure 13:
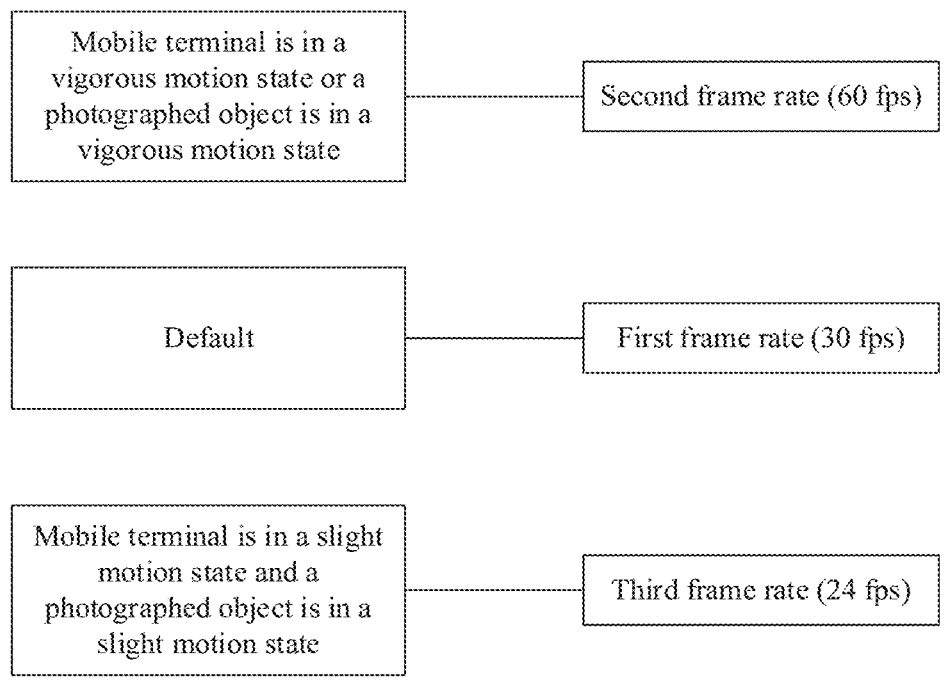
FIG. 13 is a schematic logical diagram of another recording frame rate control method according to an embodiment of this application.

In some application scenarios, a mobile terminal records a video when moving, and an object photographed by the mobile terminal is also moving. When the mobile terminal is in a vigorous motion state or the photographed object is in a vigorous motion state, a motion blur may occur in an image of the shot video due to a relatively low recording frame rate. Therefore, in an embodiment of this application, a recording frame rate control method shown in FIG. 13 is provided. A mobile terminal may automatically control a recording frame rate based on a motion status of the mobile terminal and a motion status of a photographed object. When starting to record a video, the mobile terminal may collect a video frame at a first frame rate (for example, 30 fps) by default. Then, when the mobile terminal is in a vigorous motion state or the photographed object is in a vigorous motion state, the mobile terminal may shoot the video at a second frame rate (for example, 60 fps). When the mobile terminal is in a slight motion state and a motion status of the mobile terminal is a slight motion state, the mobile terminal may shoot the video at a third frame rate (for example, 24 fps). In another case, the mobile terminal shoots the video at the first frame rate (for example, 30 fps). The second frame rate is greater than the first frame rate and the first frame rate is greater than the third frame rate. Because the recording frame rate is high when the mobile terminal is in a vigorous motion state or the photographed object is in a vigorous motion state, a quantity of frames of images shot by the mobile terminal per second increases, and an exposure time period of each frame of image is shortened. In this way, a motion blur of a video image caused by the vigorous motion of the photographed object can be reduced, to improve video smoothness. Because the video is shot at a low frame rate when the mobile terminal is in the slight motion state and the photographed object is in the slight motion state, power consumption of shooting the video by the mobile terminal can be reduced. In this way, with reference to the motion status of the mobile terminal and the motion status of the photographed object, smoothness of the video is improved through control on several levels of frame rates.

Figure 14A:
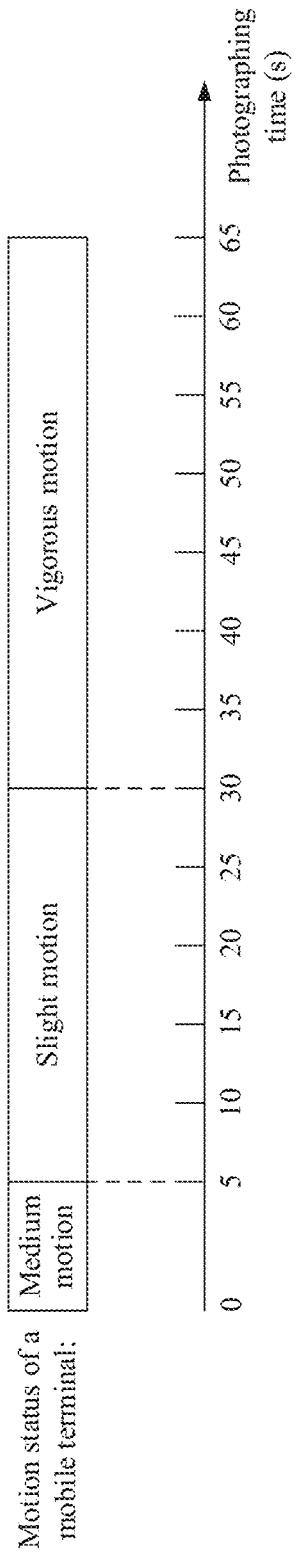
FIG. 14a to FIG. 14c show schematic line graphs of a group of recording frame rates changing with a motion status of a mobile terminal and a motion status of a photographed object according to an embodiment of this application.
Figure 14B:
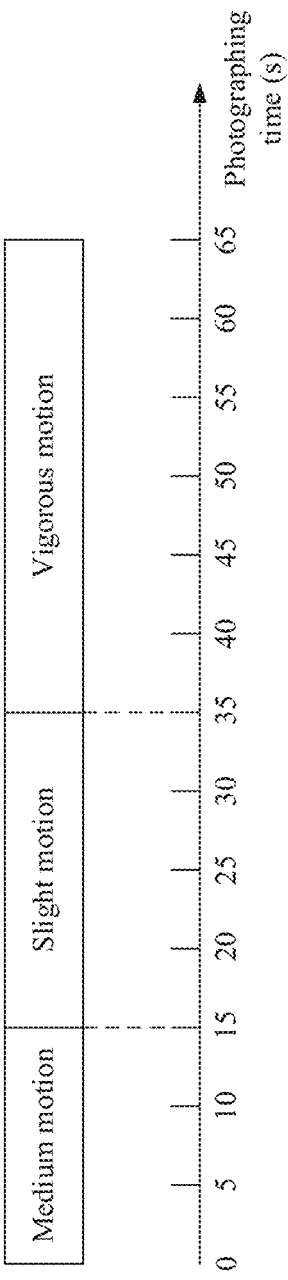
Figure 14C:
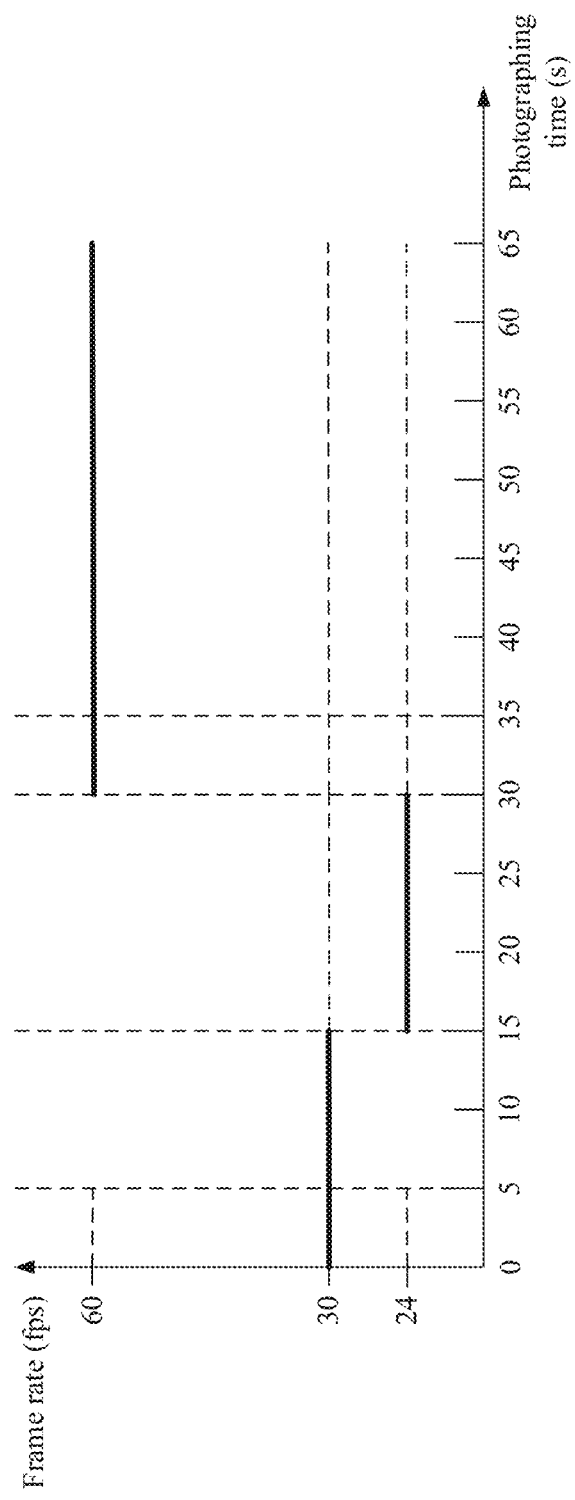

FIG. 14a is an example diagram showing a motion status change of a mobile terminal according to an embodiment of this application, FIG. 14b is a diagram showing a motion status change of a photographed object according to an embodiment of this application, and FIG. 14c is a diagram showing a frame rate change during video shooting performed by a mobile terminal according to an embodiment of this application.

As shown in FIG. 14a, when a photographing time period of the mobile terminal is from the 0$^{th}$ second to the 5$^{th}$ second, a motion status of the mobile terminal is a medium motion state. When a photographing time period of the mobile terminal is from the 5$^{th}$ second to the 30$^{th}$ second, a motion status of the mobile terminal is a slight motion state. When a photographing time period of the mobile terminal is from the 30$^{th}$ second to the 65$^{th}$ second, a motion status of the mobile terminal is a vigorous motion state.

As shown in FIG. 14b, when a photographing time period of the mobile terminal is from the 0$^{th}$ second to the 15$^{th}$ second, the mobile terminal detects that the motion status of the photographed object is a medium motion state. When a photographing time period of the mobile terminal is from the 15$^{th}$ second to the 35$^{th}$ second, the mobile terminal detects that the motion status of the photographed object is a slight motion state. When a photographing time period of the mobile terminal is from the 35$^{th}$ second to the 65$^{th}$ second, the mobile terminal detects that the motion status of the photographed object is a vigorous motion state.

As shown in FIG. 14c, when the mobile terminal starts to record a video (for example, in a photographing time period from the 0$^{th}$ second to the 2$^{nd}$ second), the mobile terminal may collect a video frame at the first frame rate (for example, 30 fps) by default. When a photographing time period of the mobile terminal is from the 2$^{nd}$ second to the 5$^{th}$ second, because the motion status of the mobile terminal is the medium motion state and the motion status of the photographed object is the medium motion state, the mobile terminal may continue collecting a video frame at the first frame rate (for example, 30 fps). When a photographing time period of the mobile terminal is from the 5$^{th}$ second to the 15$^{th}$ second, because the motion status of the mobile terminal is the slight motion state and the motion status of the photographed object is the medium motion state, the mobile terminal may continue collecting a video frame at the first frame rate (for example, 30 fps). When a photographing time period of the mobile terminal is from the 15$^{th}$ second to the 30$^{th}$ second, because the motion status of the mobile terminal is the slight motion state and the motion status of the photographed object is the slight motion state, the mobile terminal may collect a video frame at the third frame rate (for example, 24 fps). When a photographing time period of the mobile terminal is from the 30$^{th}$ second to the 35$^{th}$ second, because the motion status of the mobile terminal is the vigorous motion state and the motion status of the photographed object is the vigorous motion state, the mobile terminal may collect a video frame at the second frame rate (for example, 60 fps). When a photographing time period of the mobile terminal is from the 35$^{th}$ second to the 65$^{th}$ second, because the motion status of the mobile terminal is the vigorous motion state and the motion status of the photographed object is the vigorous motion state, the mobile terminal may shoot the video at the second frame rate (for example, 60 fps). The second frame rate (for example, 60 fps) is greater than the first frame rate (for example, 30 fps) and the first frame rate is greater than the third frame rate (for example, 24 fps).

Figure 15:
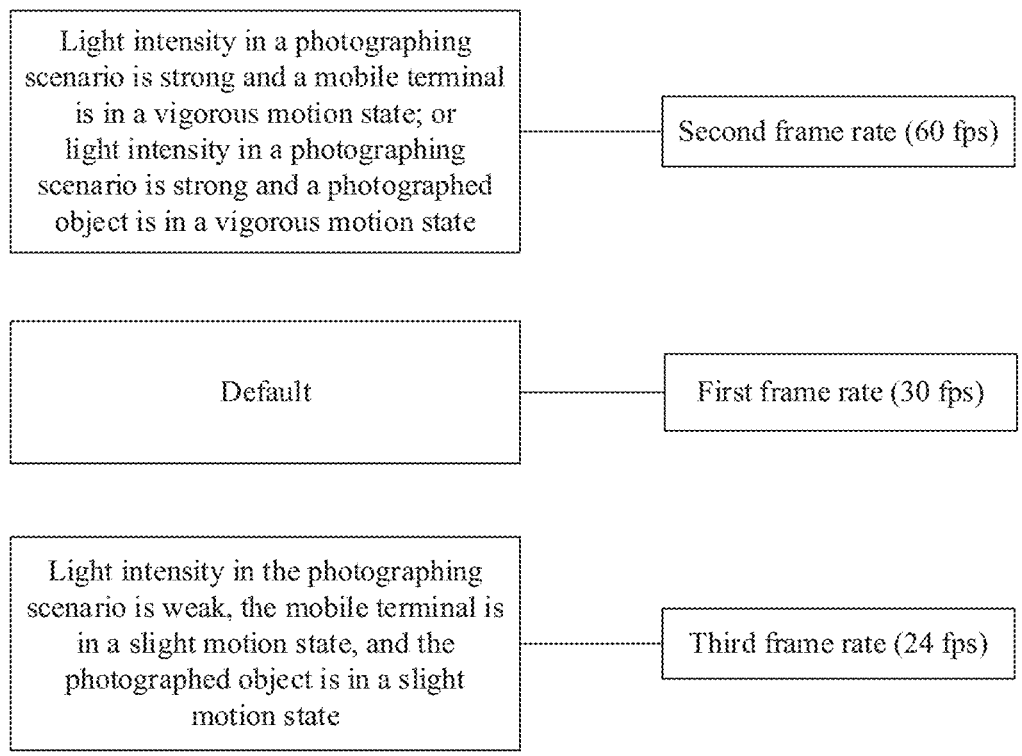
FIG. 15 is a schematic logical diagram of another recording frame rate control method according to an embodiment of this application.

In an application scenario, a photographing scenario in which a mobile terminal records a video is switched between a high brightness scenario and a low brightness scenario, and the mobile terminal photographs a moving object when moving. When light intensity in the photographing scenario is relatively weak, if a recording frame rate is excessively high, an exposure time period of each frame of image is inadequate, and image brightness of the video shot by the mobile terminal is also relatively low. When the mobile terminal is in a vigorous motion state or the photographed object is in a vigorous motion state, a motion blur may occur in an image of the shot video due to an excessively low recording frame rate. Therefore, in an embodiment of this application, a recording frame rate control method shown in FIG. 15 is provided. A mobile terminal may automatically control a recording frame rate based on light intensity in a photographing scenario, a motion status of the mobile terminal, and a motion status of a photographed object. When starting to record a video, the mobile terminal may collect a video frame at a first frame rate (for example, 30 fps) by default. Then, when the light intensity in the photographing scenario of the mobile terminal is strong and the mobile terminal is in a vigorous motion state; or when the light intensity in the photographing scenario of the mobile terminal is strong and the photographed object is in a vigorous motion state, the mobile terminal may collect a video frame at a second frame rate (for example, 60 fps). When the light intensity in the photographing scenario is weak and the motion status of the photographed object is a slight motion state, the mobile terminal may collect the video frame at the third frame rate (for example, 24 fps). In another case, the mobile terminal collects a video frame at the first frame rate (for example, 30 fps). The second frame rate is greater than the first frame rate and the first frame rate is greater than the third frame rate. When the light intensity in the photographing scenario of the mobile terminal is strong and the mobile terminal is in the vigorous motion state, or when the light intensity in the photographing scenario of the mobile terminal is strong and the photographed object is in the vigorous motion state, the recording frame rate is high. Therefore, a quantity of frames of images shot by the mobile terminal per second increases, and an exposure time period of each frame of image is shortened. In this way, a motion blur of a video image caused by the vigorous motion of the photographed object can be reduced, to improve video smoothness. Because the recording frame rate is low when the light intensity in the photographing scenario is weak, the mobile terminal is in a slight motion state, and the photographed object is in a slight motion state, a quantity of frames of images shot by the mobile terminal per second decreases, and an exposure time period of each frame of image is prolonged. In this way, image brightness of the video in a low brightness scenario is improved. In this way, with reference to the ambient light intensity, the motion status of the mobile terminal, and the motion status of the photographed object, image brightness of a video and smoothness of the video in a high brightness scenario are improved through control on several levels of frame rates.

Figure 16A:
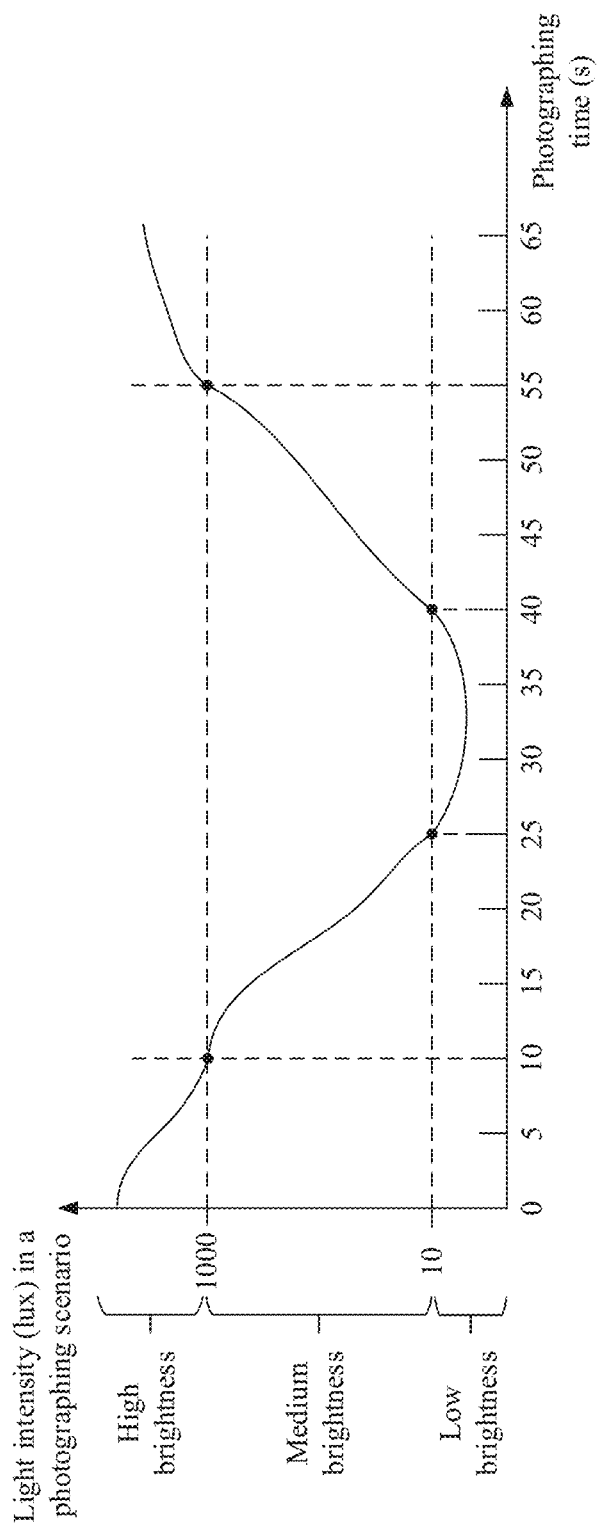
FIG. 16a to FIG. 16d are schematic line graphs of a group of recording frame rates changing with light intensity in a photographing scenario, a motion status of a mobile terminal, and a motion status of a photographed object according to an embodiment of this application.
Figure 16B:
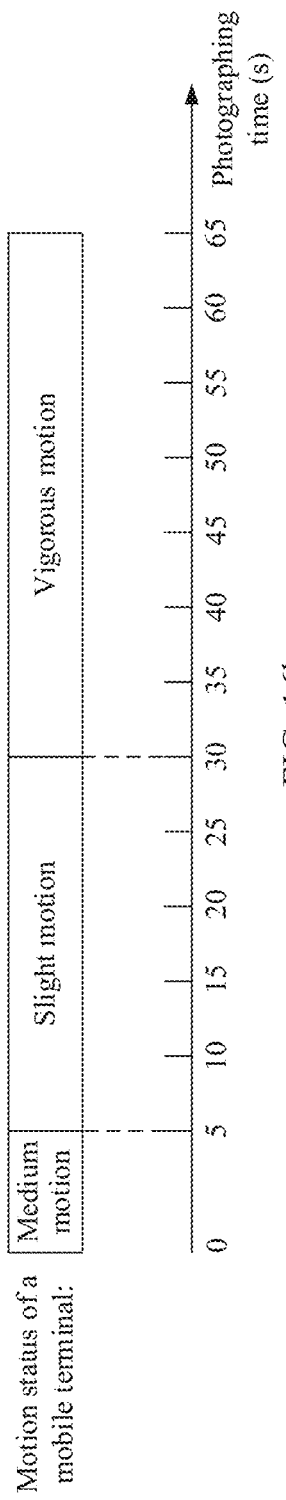
Figure 16C:
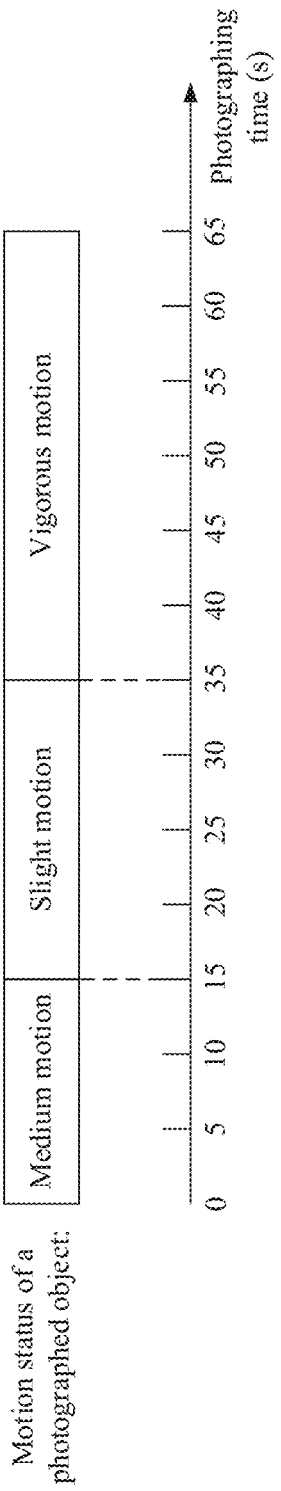
Figure 16D:
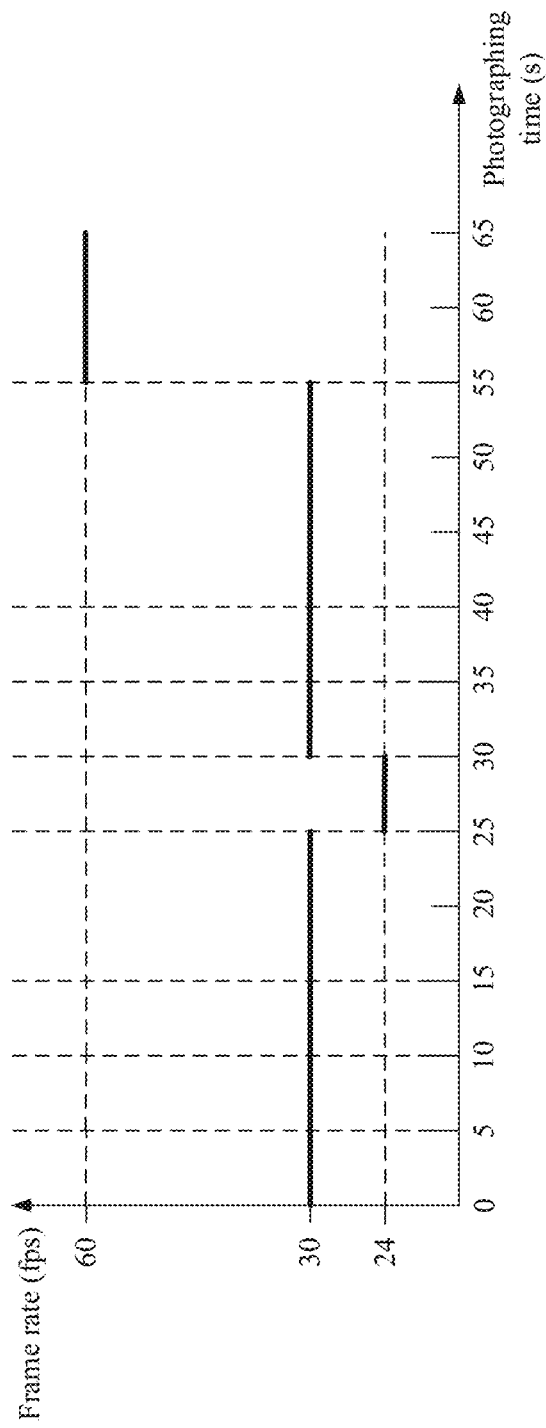

FIG. 16a is an example diagram showing a light intensity change of a photographing scenario of a mobile terminal according to an embodiment of this application, FIG. 16b is an example diagram showing a motion status change of a mobile terminal according to an embodiment of this application, FIG. 16c is an example diagram showing a motion status change of a photographed object according to an embodiment of this application, and FIG. 16d is a diagram showing a frame rate change during video shooting performed by a mobile terminal according to an embodiment of this application.

As shown in FIG. 16a, when a photographing time period of the mobile terminal is from the 0$^{th}$ second to 5$^{th}$ second, the mobile terminal detects that the light intensity in the photographing scenario is greater than a first light intensity threshold (for example, 1000 lux). When a photographing time period of the mobile terminal is from the 10$^{th}$ second to the 25$^{th}$ second, the mobile terminal detects that the light intensity in the photographing scenario is between a second light intensity threshold (for example, 100 lux) and the first light intensity threshold (for example, 1000 lux). When a photographing time period of the mobile terminal is from the 25$^{th}$ second to the 40$^{th}$ second, the mobile terminal detects that the light intensity in the photographing scenario is less than the second light intensity threshold (for example, 100 lux). When a photographing time period of the mobile terminal is from the 40$^{th}$ second to the 55$^{th}$ second, the mobile terminal detects that the light intensity in the photographing scenario is between a second light intensity threshold (for example, 100 lux) and the first light intensity threshold (for example, 1000 lux). When a photographing time period of the mobile terminal is from the 55$^{th}$ second to the 65$^{th}$ second, the mobile terminal detects that the light intensity in the photographing scenario is greater than the first light intensity threshold (for example, 1000 lux). The first light intensity threshold is greater than the second light intensity threshold.

As shown in FIG. 16b, when a photographing time period of the mobile terminal is from the 0$^{th}$ second to the 5$^{th}$ second, the mobile terminal detects that the motion status of the mobile terminal is a medium motion state. When a photographing time period of the mobile terminal is from the 5$^{th}$ second to the 30$^{th}$ second, the mobile terminal detects that the motion status of the mobile terminal is a slight motion state. When a photographing time period of the mobile terminal is from the 30$^{th}$ second to the 65$^{th}$ second, the mobile terminal detects that the motion status of the mobile terminal is a vigorous motion state.

As shown in FIG. 16c, when a photographing time period of the mobile terminal is from the 0$^{th}$ second to the 15$^{th}$ second, the mobile terminal detects that the motion status of the photographed object is a medium motion state. When a photographing time period of the mobile terminal is from the 15$^{th}$ second to the 35$^{th}$ second, the mobile terminal detects that the motion status of the photographed object is a slight motion state. When a photographing time period of the mobile terminal is from the 35$^{th}$ second to the 65$^{th}$ second, the mobile terminal detects that the motion status of the photographed object is a vigorous motion state.

As shown in FIG. 16d, when the mobile terminal starts to record a video (for example, in a photographing time period from the 0$^{th}$ second to the 2$^{nd}$ second), the mobile terminal may collect a video frame at the first frame rate (for example, 30 fps) by default. When a photographing time period of the mobile terminal is from the 2$^{nd}$ second to the 5$^{th}$ second, because the light intensity in the photographing scenario of the mobile terminal is greater than the first light intensity threshold (for example, 1000 lux), the photographing scenario is a high brightness scenario, the motion status of the mobile terminal is a medium motion state, and the motion status of the photographed object is a medium motion state, the mobile terminal may continue collecting a video frame at the first frame rate (for example, 30 fps). When a photographing time period of the mobile terminal is from the 5$^{th}$ second to the 10$^{th}$ second, because the light intensity in the photographing scenario of the mobile terminal is greater than the first light intensity threshold, the photographing scenario is a high brightness scenario, the motion status of the mobile terminal is a slight motion state, and the motion status of the photographed object is a medium motion state, mobile terminal may collect a video frame at the first frame rate (for example, 30 fps). When a photographing time period of the mobile terminal is from the 10$^{th}$ second to the 15$^{th}$ second, because the light intensity in the photographing scenario of the mobile terminal is between the second light intensity threshold (for example, 100 lux) and the first light intensity threshold, the photographing scenario is a medium-brightness photographing scenario, the motion status of the mobile terminal is a slight motion state, and the motion status of the photographed object is a medium motion state, the mobile terminal may continue collecting a video frame at the first frame rate (for example, 30 fps). When a photographing time period of the mobile terminal is from the 15$^{th}$ second to the 25$^{th}$ second, because the light intensity in the photographing scenario of the mobile terminal is between the second light intensity threshold (for example, 100 lux) and the first light intensity threshold, the photographing scenario is a medium-brightness photographing scenario, the motion status of the mobile terminal is a slight motion state, and the motion status of the photographed object is a slight motion state, the mobile terminal may continue collecting a video frame at the first frame rate (for example, 30 fps). When a photographing time period of the mobile terminal is from the 25$^{th}$ second to the 30$^{th}$ second, because the light intensity in the photographing scenario of the mobile terminal is less than the second light intensity threshold (for example, 100 lux), the photographing scenario is a low-brightness photographing scenario, the motion status of the mobile terminal is a slight motion state, and the motion status of the photographed object is a slight motion state, the mobile terminal may collect a video frame at the third frame rate (for example, 24 fps). When a photographing time period of the mobile terminal is from the 30$^{th}$ second to the 35$^{th}$ second, because light intensity in an environment in which the mobile terminal is located is less than the second light intensity threshold (for example, 100 lux), the photographing scenario is a low-brightness photographing scenario, the motion status of the mobile terminal is a vigorous motion state, and the motion status of the photographed object is a slight motion state, the mobile terminal may collect a video frame at the first frame rate (for example, 30 fps). When a photographing time period of the mobile terminal is from the 35$^{th}$ second to the 40$^{th}$ second, because the light intensity in the photographing scenario of the mobile terminal is less than the second light intensity threshold (for example, 100 lux), the photographing scenario is a low-brightness photographing scenario, the motion status of the mobile terminal is a vigorous motion state, and the motion status of the photographed object is a slight motion state, the mobile terminal may shoot the video at the first frame rate (for example, 30 fps). When a photographing time period of the mobile terminal is from the 40$^{th}$ second to the 55$^{th}$ second, because the light intensity in the photographing scenario of the mobile terminal is between the second light intensity threshold and the first light intensity threshold, the photographing scenario is a low-brightness photographing scenario, the motion status of the mobile terminal is a vigorous motion state, and the motion status of the photographed object is a vigorous motion state, the mobile terminal may shoot the video at the first frame rate (for example, 30 fps). When a photographing time period of the mobile terminal is from the 55$^{th}$ second to the 65$^{th}$ second, because the light intensity in the photographing scenario of the mobile terminal is greater than the first light intensity threshold, the photographing scenario is a high-brightness photographing scenario, the motion status of the mobile terminal is a vigorous motion state, and the motion status of the photographed object is a slight motion state, the mobile terminal may shoot the video at the second frame rate (for example, 60 fps). The second frame rate (for example, 60 fps) is greater than the first frame rate (for example, 30 fps) and the first frame rate is greater than the third frame rate (for example, 24 fps).

In some implementations, when a mobile terminal shoots a video, the mobile terminal may display a current recording frame rate on a touchscreen, and when the recording frame rate changes, may prompt a user that the recording frame rate changes.

Figure 17A:
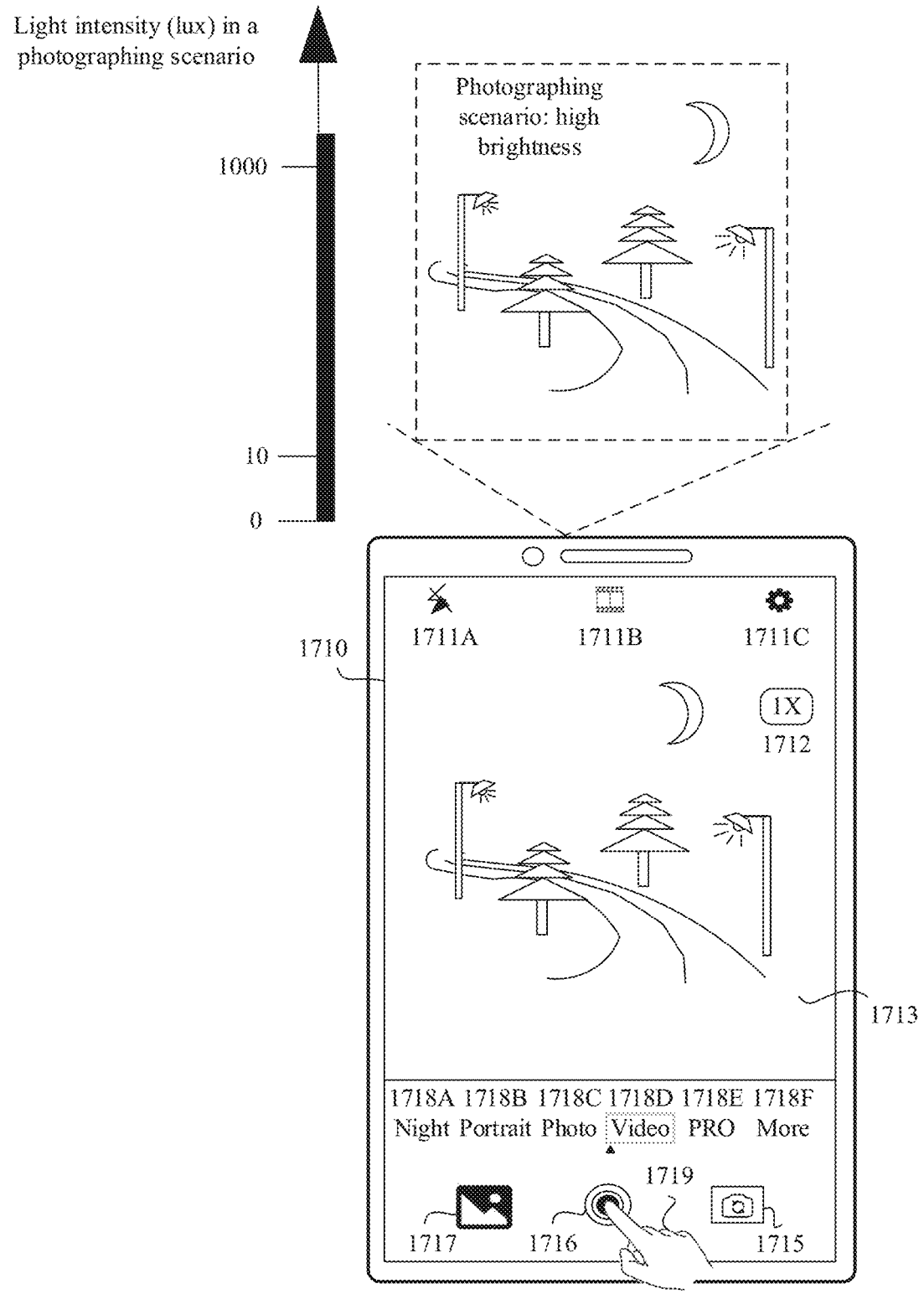
FIG. 17A to FIG. 17F are schematic diagrams of a group of interfaces according to an embodiment of this application.

For example, FIG. 17A shows an example of a user interface 1710 used to shoot an image. The user interface 1710 may be a user interface accessed by a user by tapping a camera icon, and is not limited thereto. The user may alternatively display, in another application program, the user interface 1710 used to shoot an image. For example, the user taps a photographing control in a WeChat application to display the user interface 1710 used to shoot an image. As shown in FIG. 17A, the user interface 1710 used to shoot an image may include: a control 1711A used to turn on/off a flashlight, a control 1711B used to set a photographing color mode, a control 1711C used to set various parameters during photographing, a control 1712 used to adjust a focal length displayed in a viewfinder frame 1713, a control 1715 used for camera switching, a photographing control 1716, a shot image playback control 1717, and a photographing mode control (for example, a night mode control 1718A, a portrait mode control 1718B, a common photographing mode control 1718C, a video mode control 1718D, a professional mode control 1718E, or a more mode control 1718F).

Figure 17B:
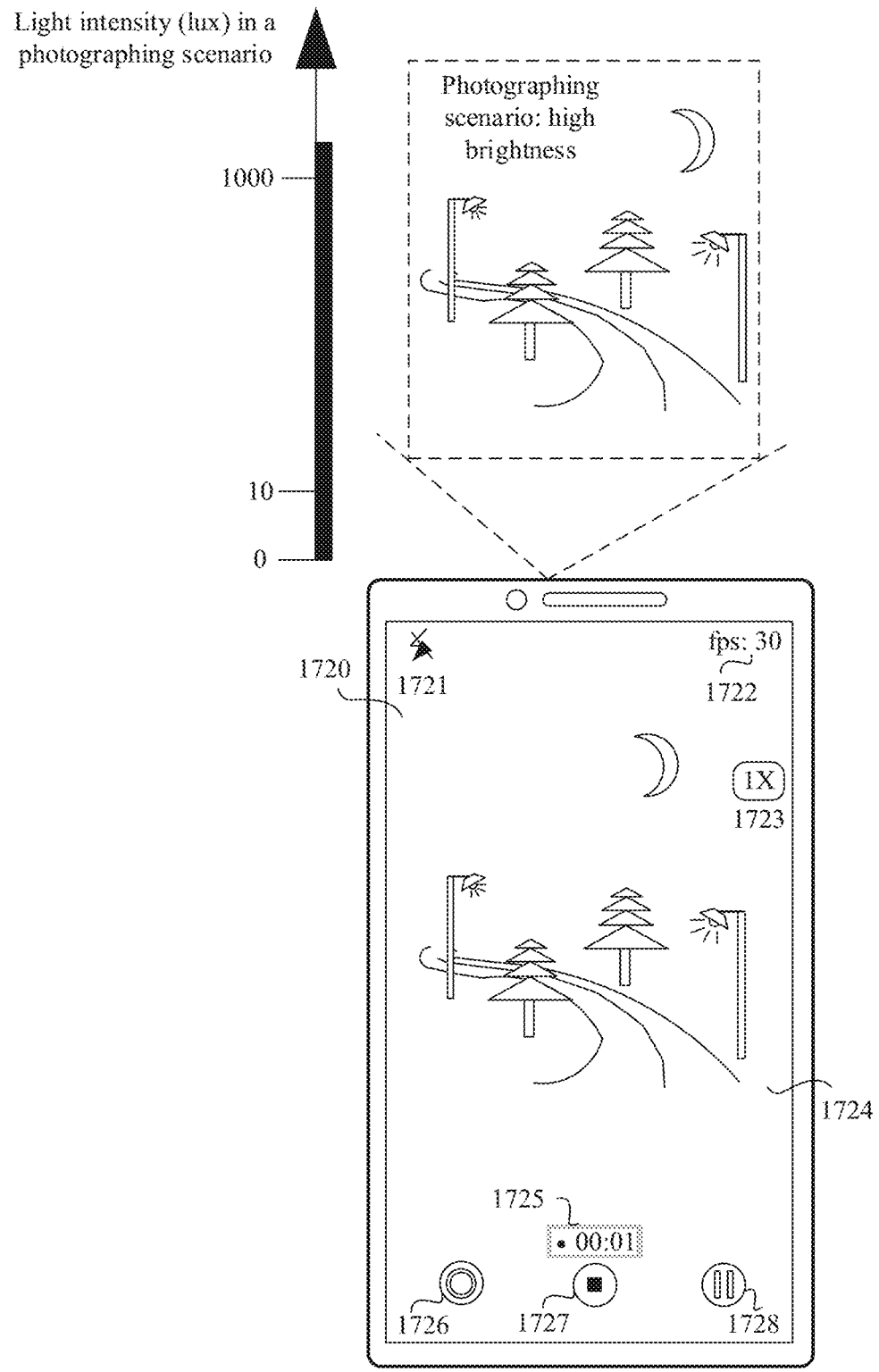

When a photographing mode is switched to a video mode and the mobile terminal receives an input operation 1719 (for example, a tap) performed by the user on the photographing control 1716, in response to the input operation 1719, the mobile terminal may start to record a video, and display a recording interface 1720 shown in FIG. 17B. As shown in FIG. 17B, the recording interface 1720 of the mobile terminal includes a control 1721 used to turn on/off a flashlight, a frame rate display area 1722, a control 1723 used to adjust a focal length displayed in a viewfinder frame 1724, a recording time display area 1725, a picture shooting control 1726, a recording stop control 1727, and a recording pause control 1728.

Figure 17C:
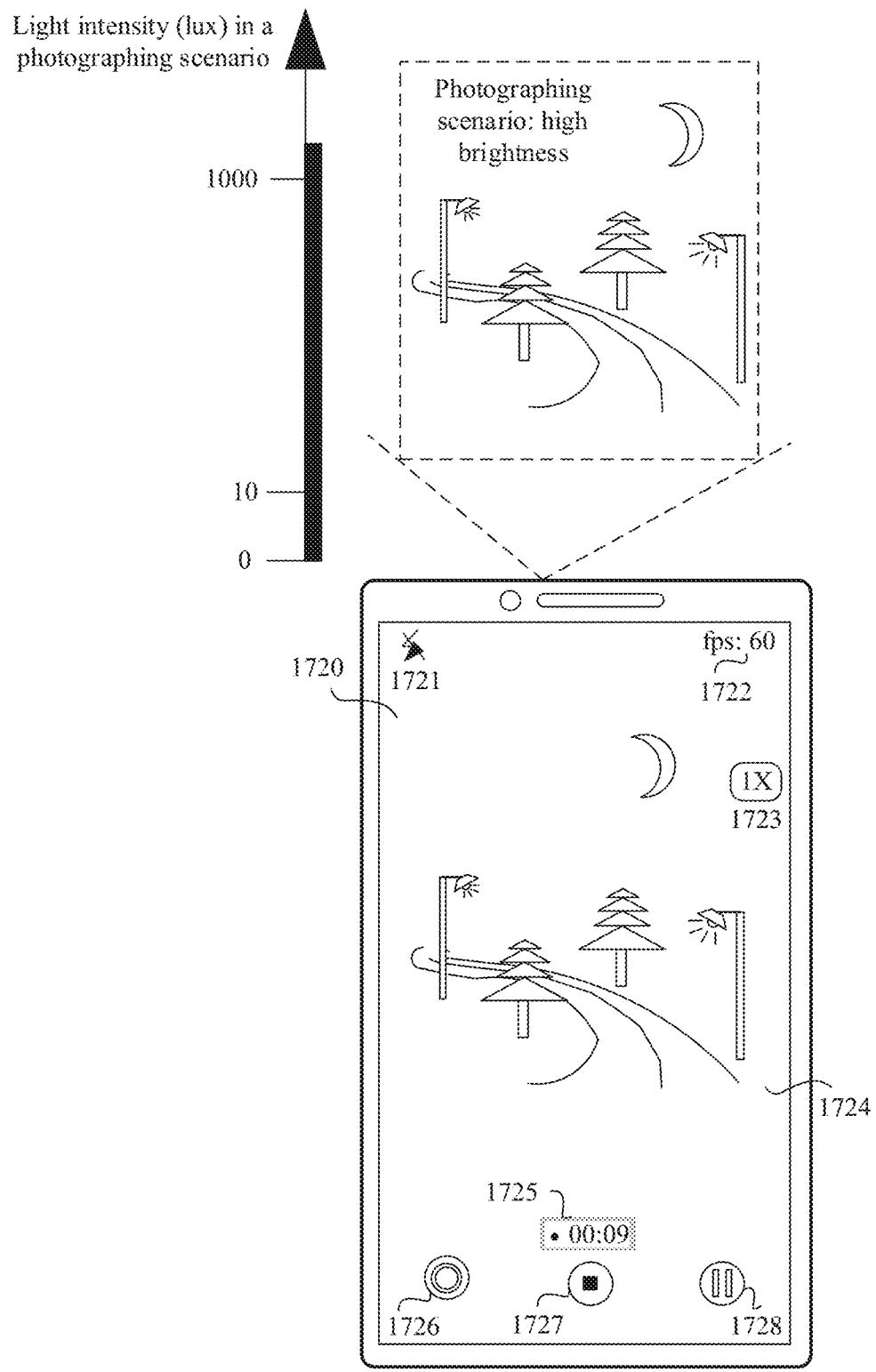
Figure 17D:
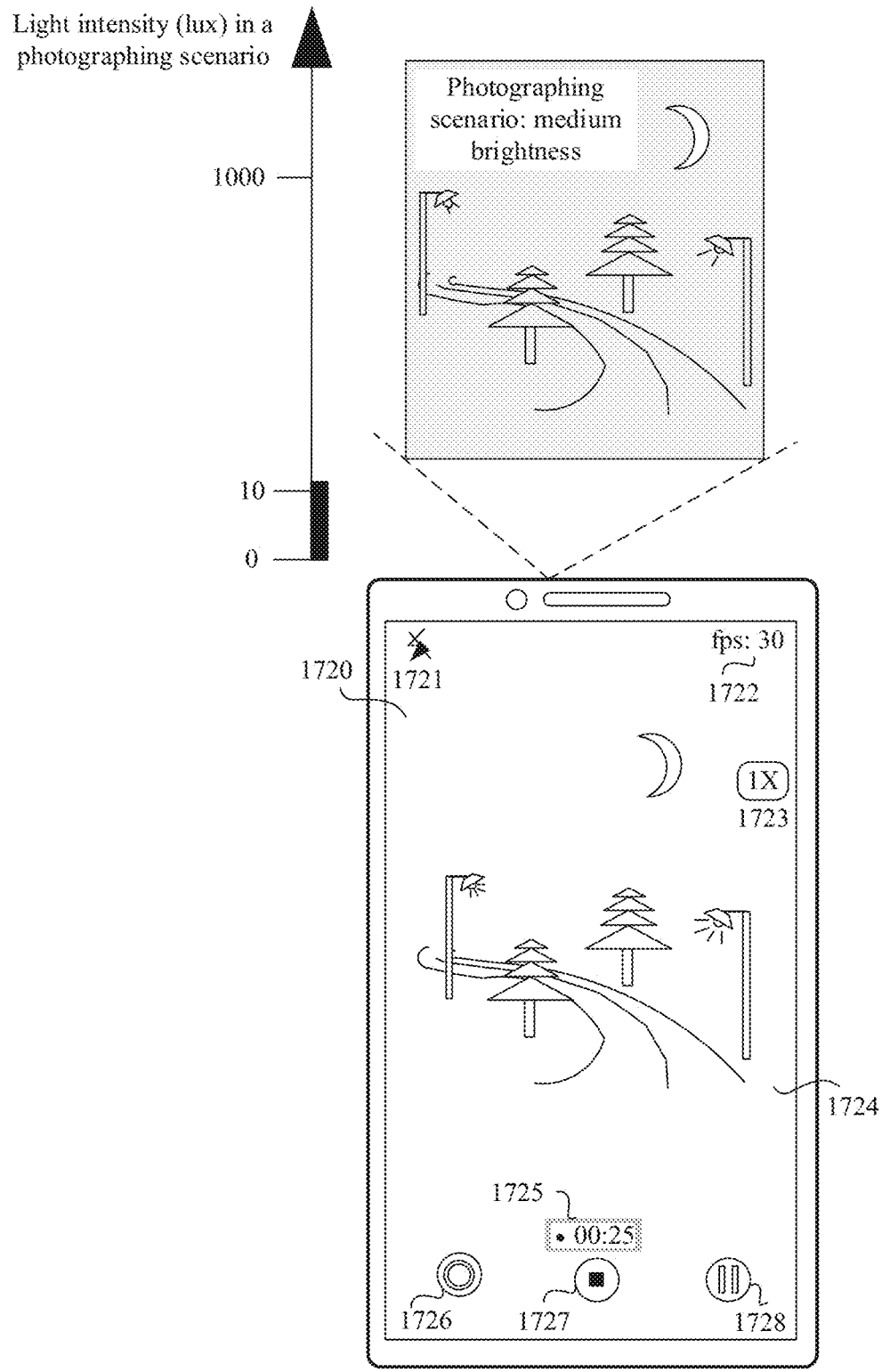
Figure 17E:
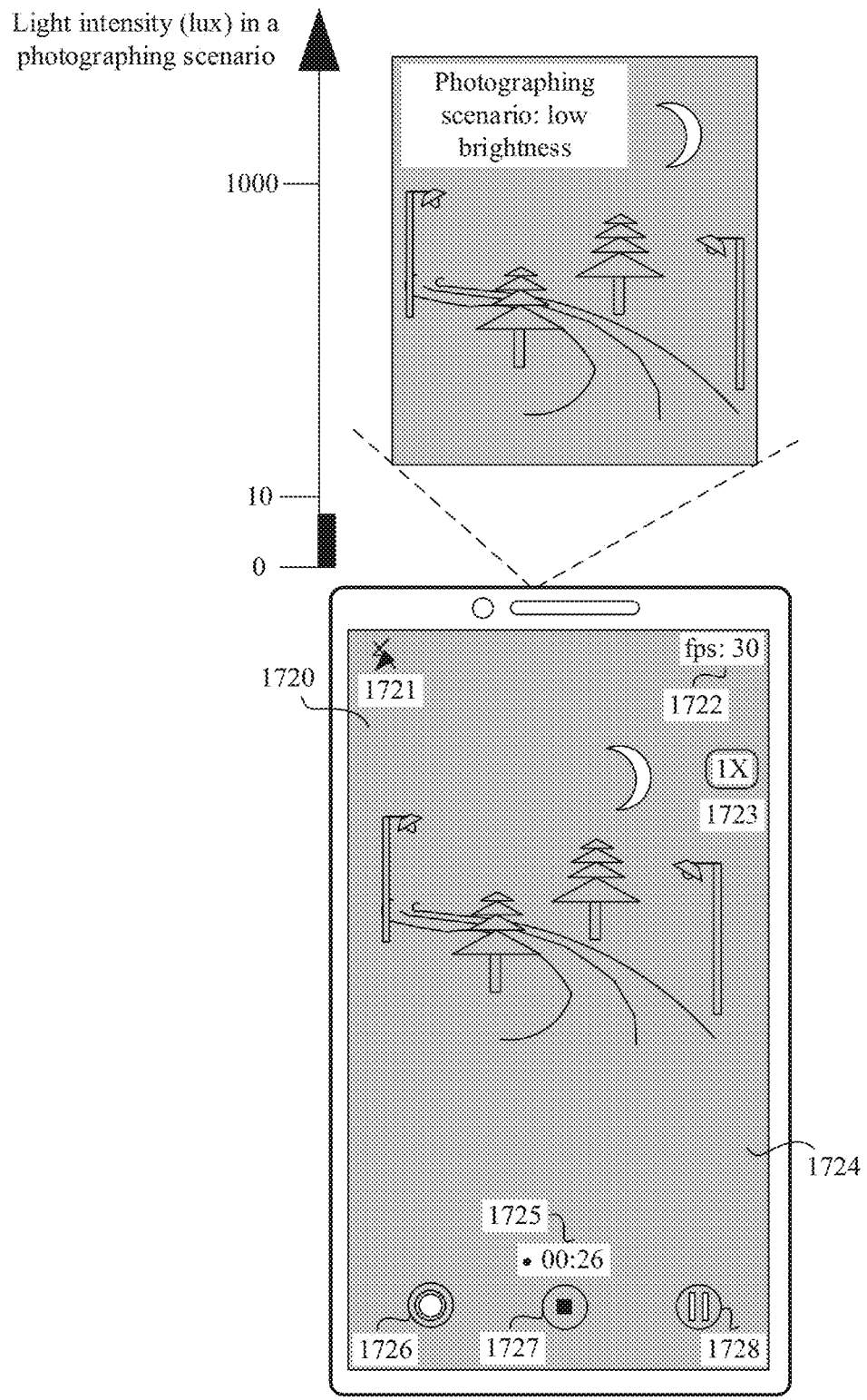
Figure 17F:
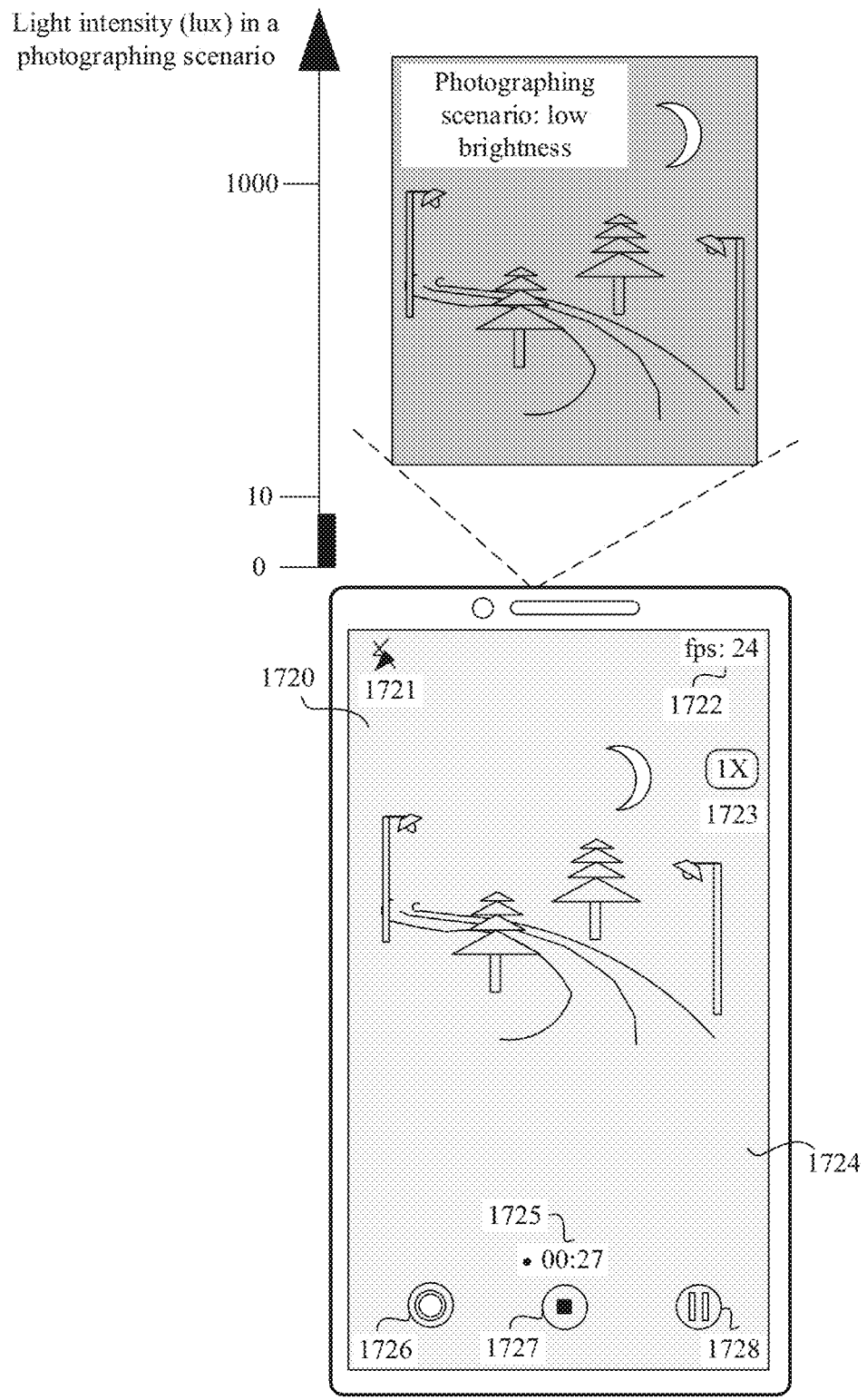

With reference to the foregoing embodiment of controlling the recording frame rate based on the light intensity in the photographing scenario shown in FIG. 3, when starting to record a video, the mobile terminal may collect a video frame at a first frame rate (for example, 30 fps) by default. As shown in FIG. 17B, when a photographing time point is at the first second, the mobile terminal collects a video frame at 30 fps by default, and displays a current photographing frame rate value (for example, "fps: 30") in the frame rate display area 1722 shown in FIG. 17B. As shown in FIG. 17C, when a photographing time point of the mobile terminal is the $9^{th}$ second, light intensity in a photographing scenario is greater than a first light intensity threshold (for example, 1000 lux), and the mobile terminal is in a high-brightness photographing scenario. The mobile terminal may collect a video frame at a second frame rate (for example, 60 fps), and display a current photographing frame rate value (for example, "fps: 60") in a frame rate display area 1722 shown in FIG. 17C. As shown in FIG. 17D, when a photographing time point of the mobile terminal is the $25^{th}$ second, the light intensity in the photographing scenario is between a second light intensity threshold (for example, 100 lux) and the first light intensity threshold (for example, 1000 lux), and the photographing scenario is a medium-brightness photographing scenario. The mobile terminal may collect a video frame at the first frame rate (for example, 30 fps), and display a current photographing frame rate value (for example. "fps: 30") in a frame rate display area 1722 shown in FIG. 17D. As shown in FIG. 17E, when a photographing time point of the mobile terminal is the $26^{th}$ second, the light intensity in the photographing scenario is less than the second light intensity threshold (for example, 100 lux), and the photographing scenario is a low-brightness photographing scenario. If the mobile terminal still collects a video frame at the first frame rate (for example, 30 fps), brightness of a video image is relatively low. As shown in FIG. 17F, when a photographing time point of the mobile terminal is the $27^{th}$ second, the light intensity in the photographing scenario is less than the second light intensity threshold (for example, 100 lux), and the photographing scenario is a low-brightness photographing scenario. The mobile terminal collects a video frame at a third frame rate (for example, 24 fps) to improve brightness of a video image, and displays a current recording frame rate value (for example, "fps: 24") in a frame rate display area 1722 shown in FIG. 17F. In a low-brightness photographing scenario, because a recording frame rate is decreased, a video image shot by the mobile terminal becomes brighter.

In the embodiments of this application, in any time interval of the video, a recording frame rate during photographing by the mobile terminal is the same as a playback frame rate used when the video is played back after the photographing is completed. For example, the mobile terminal collects a video frame at a frame rate of 30 fps during the $0^{th}$ second to the $2^{nd}$ second of the video, collects a video frame at a frame rate of 60 fps during the $2^{nd}$ second to the $10^{th}$ second of the video, collects a video frame at a frame rate of 30 fps during the $10^{th}$ second to the $55^{th}$ second of the video, collects a video frame at the frame rate of 24 fps during the $25^{th}$ second to the $40^{th}$ second of the video, collects a video frame at the frame rate of 30 fps during the $40^{th}$ second to the $55^{th}$ second of the video, and collects a video frame at the frame rate of 60 fps during the $55^{th}$ second to the $65^{th}$ second of the video. In this case, after the video is shot and a video file is generated, the mobile terminal plays back the video file at the frame rate of 30 fps during the $0^{th}$ second to the $2^{nd}$ second of the video, at the frame rate of 60 fps during the $2^{nd}$ second to the $10^{th}$ second of the video, at the frame rate of 30 fps during the $10^{th}$ second to the $25^{th}$ second of the video, at the frame rate of 24 fps during the $25^{th}$ second to the $40^{th}$ second of the video, at the frame rate of 30 fps during the $40^{th}$ second to the $55^{th}$ second of the video, and at the frame rate of 60 fps during the $55^{th}$ second to the $65^{th}$ second of the video.

The following describes a recording frame rate control system 1800 provided in an embodiment of this application.

Figure 18:
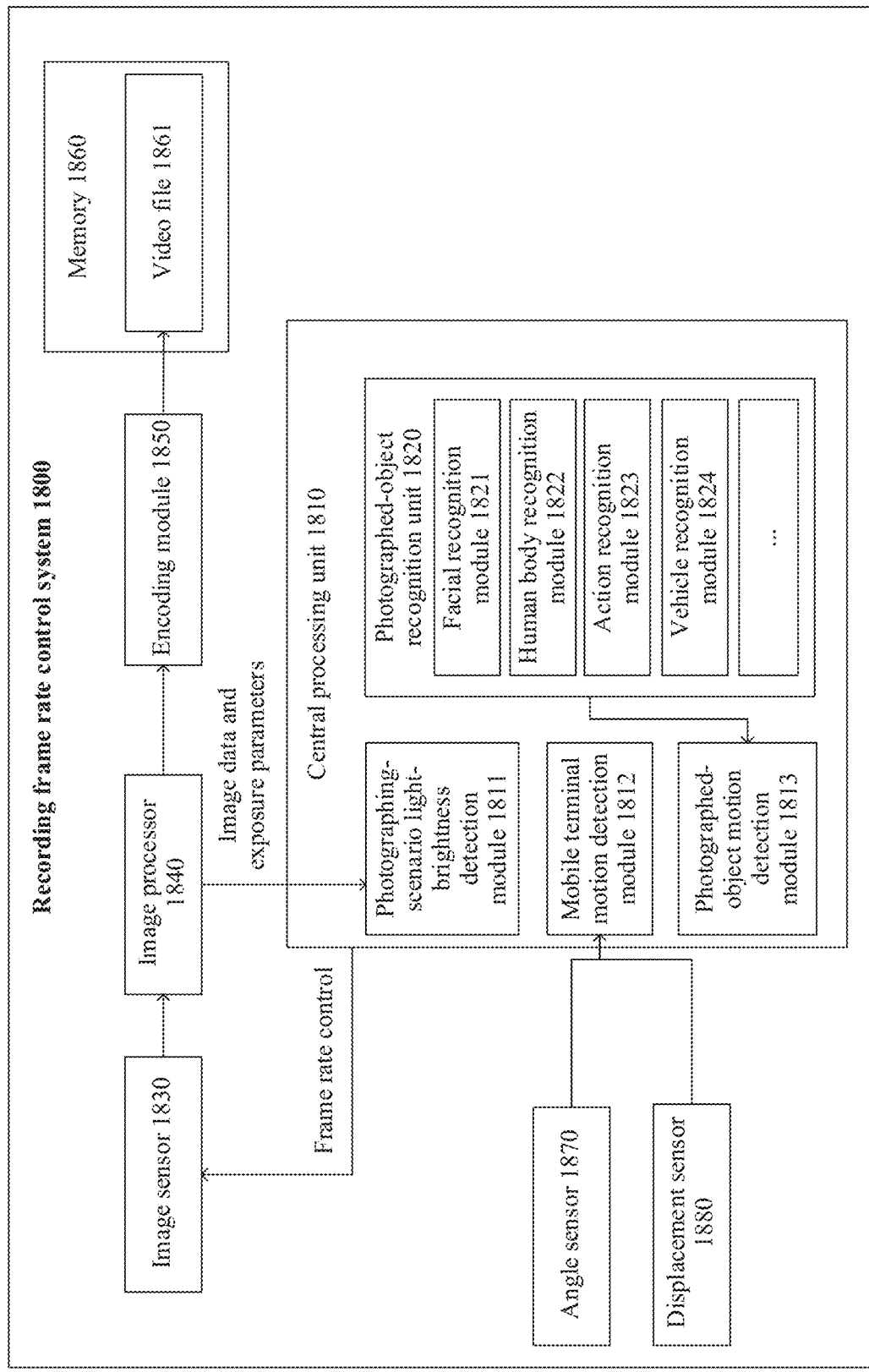
FIG. 18 is a schematic architecture diagram of a recording frame rate control system according to an embodiment of this application.

FIG. 18 is a schematic block diagram of a recording frame rate control system according to an embodiment of this application. As shown in FIG. 18, the recording frame rate control system 1800 may include a central processing unit 1810, an image sensor 1830, an image processor 1840, an encoding module 1850, a memory 1860, an angular velocity sensor 1870, and a displacement sensor 1880.

The central processing unit 1810 may include an ambient brightness detection module 1811, a mobile terminal motion detection module 1812, a photographed-object motion detection module 1813, and a photographed-object recognition unit 1820. The photographed-object recognition unit 1820 may include a facial recognition module 1821, a human body recognition module 1822, an action recognition module 1823, and a vehicle recognition module 1824. The central processing unit 1810 may be configured to control, during video shooting, a recording frame rate of the image sensor 1830 based on one or more of three factors, brightness of a photographing scenario, a motion status of a mobile terminal, and a motion status of a photographed object.

The mobile terminal motion detection module 1812 may detect the motion status of the mobile terminal based on angular velocity data sent by the angle sensor 1870 and/or displacement data sent by the displacement sensor 1880. The photographed-object motion detection module 1813 may be configured to detect the motion status of the photographed object (for example, a face, a human body, an action, or a vehicle) based on the photographed object recognized by the photographed-object recognition unit 1820. The facial recognition module 1821 is configured to recognize a face from an image captured by a camera, the human body recognition module 1822 is configured to recognize a human body from the image captured by the camera, the action recognition module 1823 is configured to recognize an action from the image captured by the camera, and the vehicle recognition module 1824 is configured to recognize a vehicle from the image captured by the camera.

The image sensor 1830 may be configured to sense light and generate an image. The image sensor 1830 may be a complementary metal oxide semiconductor (complementary metal oxide semiconductor, CMOS) sensor, or may be an optical image sensor such as a charge-coupled device (charge-coupled device, CCD) sensor. The image processor 1840 may be configured to process the image generated by the image sensor 1830 to obtain data such as image data and an exposure parameter, and send the data to the central processing unit 1810. The image sensor 1830 is further configured to: perform data processing on the image generated by the image sensor 1830 through light sensing, to obtain image data, and send the image data to the encoding module 1850. The encoding module 1850 may be configured to encode the image data to obtain a video file 1861, and store the video file 1861 in the memory 1860.

The angle sensor 1870 may be configured to detect a rotation motion of a device in an X direction, a Y direction, and a Z direction in a three-dimensional coordinate system. The angle sensor 1870 may be a gyroscope or another motion sensor. The angle sensor 1870 may be installed on a device body or in a camera module. If the angle sensor 1870 is a gyroscope, a signal output by the gyroscope is an angular motion velocity of the mobile terminal. An angle rotated by the mobile terminal may be obtained by performing integration on the gyroscope signal once. The gyroscope may be a micro-mechanical (micro electro mechanical systems, MEMS) gyroscope.

The displacement sensor 1880 may be configured to detect translational motion of the device in the X, Y. and Z directions in the three-dimensional coordinate system. The displacement sensor 1880 may be an accelerometer or another motion sensor. The displacement sensor 1880 may be installed on the body of the mobile terminal, or may be installed in the camera module. If the displacement sensor 1880 is an acceleration sensor, a signal output by the acceleration sensor is motion acceleration of the device. A linear velocity during motion of the device may be obtained by performing integration on the signal of the acceleration sensor once, and a distance by which the device moves may be obtained by performing integration on the linear velocity. The acceleration sensor may be a piezoelectric MEMS accelerometer or a capacitive MEMS accelerometer. The piezoelectric MEMS accelerometer uses a piezoelectric effect. In the piezoelectric MEMS accelerometer, there is a mass block supported by a rigid body. When the device moves, the mass block generates pressure, and the rigid body generates strain, to convert acceleration into an electrical signal for output. There is also a mass block inside the capacitive MEMS accelerometer, and the mass block is a standard plate capacitor. A change in the acceleration drives motion of the moving mass block, to change a spacing between two poles of the plate capacitor and an area of overlap, and the acceleration is calculated by measuring a capacitance change amount. In an implementation, the gyroscope and the accelerometer may be designed in a same electronic component, or may be separately designed as two independent electronic components.

The following describes how the mobile terminal determines that light intensity in the photographing scenario in which the mobile terminal records a video is strong, medium, or weak in this embodiment of this application.

The mobile terminal may determine the light intensity in the photographing scenario by using an image exposure parameter obtained by the image processor 1840 by performing image processing.

When the image exposure parameter ISO value is less than a first exposure parameter threshold (for example, 800), it may indicate that the light intensity in the photographing scenario is greater than a first light intensity threshold (for example, 1000 lux), and the mobile terminal may determine that the light intensity in the photographing scenario is strong.

When the ISO value is greater than a second exposure parameter threshold (for example, 2000), it may indicate that the light intensity in the photographing scenario is less than a second light intensity threshold (for example, 100 lux), and the mobile terminal may determine that the brightness in the photographing scenario is low.

When the ISO value is between the first exposure parameter threshold (for example, 800) and the second exposure parameter threshold (for example, 2000), it may indicate that the light intensity in the photographing scenario is between the second light intensity threshold (for example, 100 lux) and the first light intensity threshold (for example, 1000 lux), and the mobile terminal may determine that the light intensity in the photographing scenario is medium.

The first light intensity threshold is greater than the second light intensity threshold. The first exposure parameter threshold is less than the second exposure parameter threshold. The first exposure parameter threshold may be another standard value, and is not limited to 800. The second exposure parameter threshold may be another standard value, and is not limited to 2000. A parameter for determining the light intensity in the photographing scenario may alternatively be another exposure parameter or image information different from the ISO, such as an automatic exposure time or image pixel information. This is not limited herein.

Figure 19:
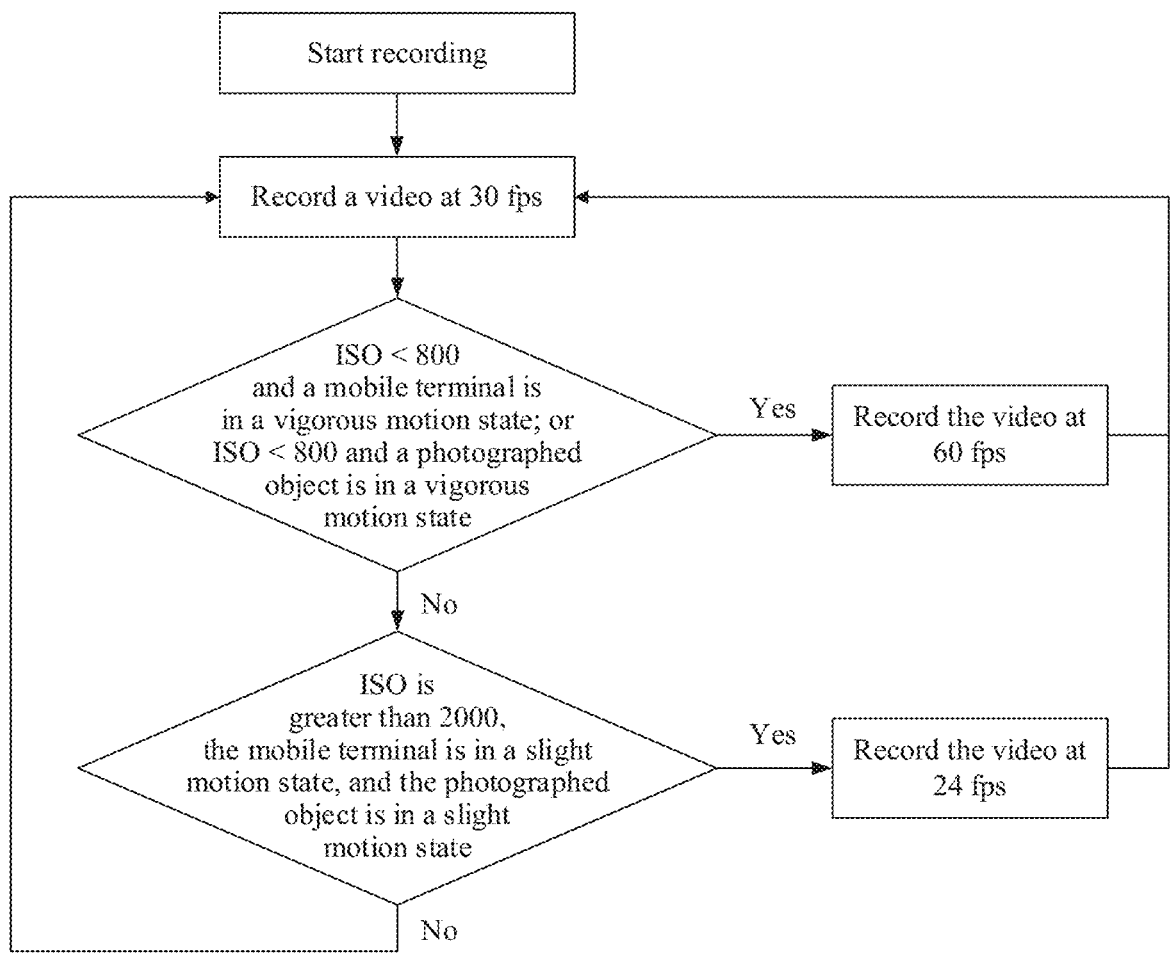
FIG. 19 is a schematic flowchart of a recording frame rate control method according to an embodiment of this application.

For example, FIG. 19 is a schematic flowchart of a recording frame rate control method according to an embodiment of this application. In FIG. 19, a mobile terminal uses an image exposure parameter ISO value as a basis for determining light intensity in a photographing scenario, and controls a recording frame rate during video recording, based on the light intensity in the photographing scenario, a motion status of the mobile terminal, and a motion status of a photographed object.

As shown in FIG. 19, the mobile terminal may first record a video at a second frame rate (for example, 30 fps) by default, and dynamically switch to a first frame rate (for example, 60 fps) or a third frame rate (for example, 24 fps) based on the light intensity in the photographing scenario, the motion status of the mobile terminal, and the motion status of the photographed object. When the image exposure parameter ISO value is less than 800 and the mobile terminal is in a vigorous motion state, or when the image exposure parameter ISO value is less than 800 and the photographed object is in a vigorous motion state, the mobile terminal may record the video at the first frame rate (namely, 60 fps). When the image exposure parameter ISO value is greater than 2000, the mobile terminal is in a slight motion state, and the photographed object is in a slight motion state, the mobile terminal may record the video at the third frame rate (for example, 24 fps). In other conditions, the mobile terminal may record the video at the second frame rate (for example, 30 fps).

Alternatively, the mobile terminal may first record a video at a first frame rate (for example, 60 fps) or a third frame rate (for example, 24 fps), and then dynamically switch the recording frame rate to 60 fps, 30 fps, or 24 fps based on brightness in the photographing scenario, the motion status of the mobile terminal, and the motion status of the photographed object. This is not limited herein.

In this way, when the mobile terminal is in a high-brightness photographing scenario, and the mobile terminal is in a vigorous motion scenario or the photographed object is in a vigorous motion scenario, images of the shot video are smoother, and the images are clearer. In a low-brightness photographing scenario, when the mobile terminal is in a slight motion scenario, and the photographed object is in a slight motion scenario, brightness of images of the shot video is higher, and noise is lower.

In an implementation, when the mobile terminal is recording a video, the mobile terminal may first collect a video frame at the first frame rate (for example, 30 fps). If the mobile terminal detects that an image exposure parameter ISO value of the collected video frame is less than a first exposure parameter threshold (for example, 800), the mobile terminal may adjust the first frame rate to a second frame rate (for example, 60 fps) to collect a video frame. When the mobile terminal collects a video frame at the second frame rate (for example, 60 fps), if the mobile terminal detects that the image exposure parameter ISO value of the collected video frame is between a third exposure parameter threshold (for example, 800) and a fourth exposure parameter threshold (for example, 1900), the mobile terminal may adjust the second frame rate to the first frame rate (for example, 30 fps) to collect a video frame. When the mobile terminal is recording a video, the mobile terminal may first collect a video frame at the first frame rate (for example, 30 fps). If the mobile terminal detects that an image exposure parameter ISO value of the collected video frame is greater than a second exposure parameter threshold (for example, 2000), the mobile terminal may adjust the first frame rate to the third frame rate (for example, 24 fps) to collect a video frame. If the mobile terminal first collects a video frame at the third frame rate (for example, 24 fps), when the mobile terminal detects that an image exposure parameter ISO value of the collected video frame is between a third exposure parameter threshold (for example, 900) and a fourth exposure parameter threshold (for example, 1900), the mobile terminal may adjust the third frame rate to the first frame rate (for example, 30 fps) to collect a video frame. The first exposure parameter threshold is less than the third exposure parameter threshold, the third exposure parameter threshold is less than the fourth exposure parameter threshold, and the fourth exposure parameter threshold is less than the second exposure parameter threshold. A difference between the first exposure parameter threshold and the third exposure parameter threshold is a specified difference (for example, 100), and a difference between the third exposure parameter threshold and the fourth exposure parameter threshold is a specified difference (for example, 100). In this way, frequent changes of the recording frame rate caused when the exposure parameter ISO value of the video frame changes around the first exposure parameter threshold or the second exposure parameter threshold can be avoided.

The following describes how the mobile terminal determines that the motion status of the mobile terminal is a vigorous motion state, a medium motion state, or a slight motion state in this embodiment of this application.

(1) The mobile terminal may determine the motion status of the mobile terminal by using data measured by a gyroscope.

The mobile terminal may calculate, by using data measured by an X-Y-Z triaxial gyroscope, root mean squares Rx, Ry, and Rz of the measured data in the X, Y, and Z directions in the three-dimensional coordinate system. Rx is a root mean square of the data measured by the gyroscope in the X-axis direction, Ry is a root mean square of the data measured by the gyroscope in the Y-axis direction, and Rz is a root mean square of the data measured by the gyroscope in the Z-axis direction. Rx may be calculated according to the following formula (1), where N is a quantity of data groups measured by the gyroscope, and $x_i$ is an $i^{th}$ group of data measured by the gyroscope on the X axis. Ry may be calculated according to the following formula (2), and $y_i$ is an $i^{th}$ group of data measured by the gyroscope on the Y axis. Rz may be calculated according to the following formula (3), and $z_i$ is an $i^{th}$ group of data measured by the gyroscope on the Z axis.

$$R_x = \sqrt{\frac{1}{N}\sum_{i=1}^{N} x_i^2} \quad \text{Formula (1)}$$

$$R_y = \sqrt{\frac{1}{N}\sum_{i=1}^{N} y_i^2} \quad \text{Formula (2)}$$

$$R_z = \sqrt{\frac{1}{N}\sum_{i=1}^{N} z_i^2} \quad \text{Formula (3)}$$

When Rx, Ry, or Rz is greater than a first value, the mobile terminal may determine that the motion status of the mobile terminal is a vigorous motion state.

When Rx, Ry, and Rz are all less than a second value, the mobile terminal may determine that the motion status of the mobile terminal is a slight motion state, where the first value is greater than the second value.

When Rx, Ry, and Rz are in another condition, the mobile terminal may determine that the motion status of the mobile terminal is a medium motion state.

In an implementation, when the terminal rotates at a constant speed, the terminal may be considered as in a vigorous motion state. When the mobile terminal rotates at a constant speed, gyroscope data on one axis (for example, the X axis, the Y axis, or the Z axis) is definitely greater than gyroscope data on the other two axes, and the gyroscope data on this direction axis is stable and has no reverse polar flapping. Therefore, the mobile terminal may detect a rotation status by using a signal standard deviation and a signal amplitude. Sx may be calculated according to the following formula (4), where N is a quantity of data groups measured by the gyroscope, $x_i$ is an $i^{th}$ group of data measured by the gyroscope on the X axis, and r is an average value of the N groups of gyroscope data on the X axis. Sy may be calculated according to the following formula (5), where $y_i$ is an $i^{th}$ group of data measured by the gyroscope on the Y axis, and s is an average value of the N groups of gyroscope data on the Y axis. Sz may be calculated according to the following formula (6), where $z_i$ is an $i^{th}$ group of data measured by the gyroscope on the Z axis, and t is an average value of the N groups of gyroscope data on the Z axis.

$$S_x = \sqrt{\frac{1}{N}\sum_{i=1}^{N}(x_i - r)^2} \quad \text{Formula (4)}$$

$$S_y = \sqrt{\frac{1}{N}\sum_{i=1}^{N}(y_i - s)^2} \quad \text{Formula (5)}$$

$$S_z = \sqrt{\frac{1}{N}\sum_{i=1}^{N}(z_i - t)^2} \quad \text{Formula (6)}$$

When Sx, Sy, and Sz are all less than a value, and any one of Rx, Ry, or Rz is greater than the first value, the mobile terminal may determine that the motion status of the mobile terminal is a vigorous motion state.

When Rx, Ry, and Rz are all less than the second value, the mobile terminal may determine that the motion status of the mobile terminal is a slight motion state.

When Rx, Ry, and Rz are in another condition, the mobile terminal may determine that the motion status of the mobile terminal is a medium motion state.

(2) The mobile terminal may determine the motion status of the mobile terminal by using data measured by an accelerometer.

The mobile terminal may calculate, by using data measured by an X-Y-Z triaxial accelerometer, root mean squares Ax, Ay, and Az of the measured data in the X, Y. and Z directions in the three-dimensional coordinate system. Ax is a root mean square of the data measured by the accelerometer in the X-axis direction. Ay is a root mean square of the data measured by the accelerometer in the Y-axis direction. Az is a root mean square of the data measured by the accelerometer in the Z-axis direction. Rx may be calculated according to the following formula (7), where M is a quantity of data groups measured by the accelerometer, and $a_i$ is an $i^{th}$ group of data measured by the accelerometer on the X axis. Ry may be calculated according to the following formula (8), and $b_i$ is an $i^{th}$ group of data measured by the accelerometer on the Y axis. Rz may be calculated according to the following formula (9), and $c_i$ is an $i^{th}$ group of data measured by the accelerometer on the Z axis.

$$A_x = \sqrt{\frac{1}{M}\sum_{i=1}^{M} a_i^2} \qquad \text{Formula (7)}$$

$$A_y = \sqrt{\frac{1}{M}\sum_{i=1}^{M} b_i^2} \qquad \text{Formula (8)}$$

$$A_z = \sqrt{\frac{1}{M}\sum_{i=1}^{M} c_i^2} \qquad \text{Formula (9)}$$

When Ax, Ay, or Az is greater than a third value, the mobile terminal may determine that the motion status of the mobile terminal is a vigorous motion state.

When Ax, Ay, and Az are all less than a fourth value, the mobile terminal may determine that the motion status of the mobile terminal is a slight motion state, where the third value is greater than the fourth value.

When Ax, Ay, and Az are in another condition, the mobile terminal may determine that the motion status of the mobile terminal is a medium motion state.

The following describes how the mobile terminal determines the motion status of the photographed object in image of the shot video in this embodiment of this application.

The mobile terminal may detect, by using the facial recognition module 1821, the human body recognition module 1822, the action recognition module 1823, the vehicle recognition module 1824, and the like, a photographed object such as a face, a human body, or a vehicle in an image of a video. The mobile terminal may determine a motion status of a photographed object by comparing locations of the same photographed object in two or more successive frames of images.

When a motion distance of the same photographed object between the two or more frames of images is greater than a first distance threshold, the mobile terminal may determine that the motion status of the photographed object is a vigorous motion state.

When the motion distance of the same photographed object between the two or more frames of images is between the first distance threshold and a second distance threshold, the mobile terminal may determine that the motion status of the photographed object is a medium motion state.

When a motion distance of the same photographed object between the two or more frames of images is less than the second distance threshold, the mobile terminal may determine that the motion status of the photographed object is a slight motion state.

Figure 20:
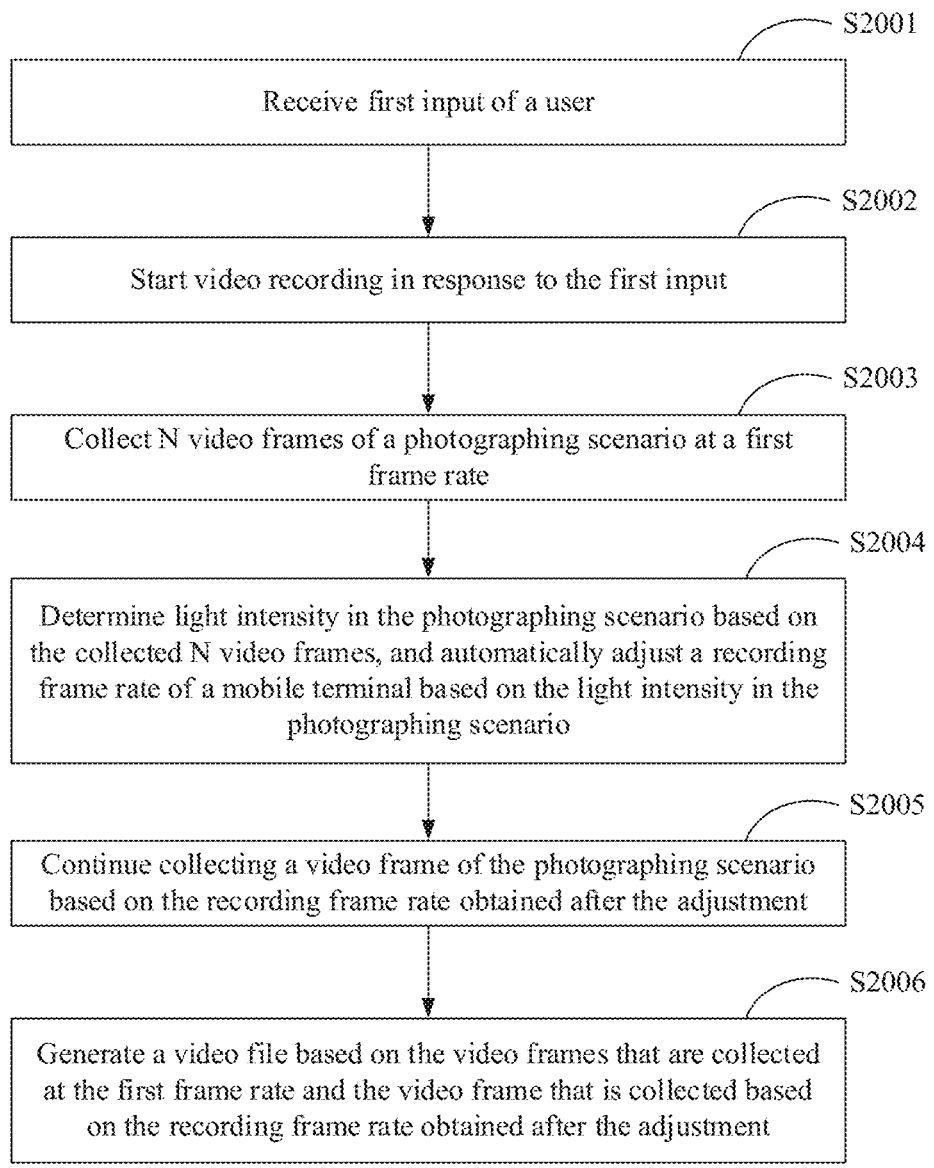
FIG. 20 is a schematic flowchart of another recording frame rate control method according to an embodiment of this application.

FIG. 20 is a schematic flowchart of a recording frame rate control method according to an embodiment of this application. As shown in FIG. 20, the recording frame rate control method may include the following steps.

S2001: A mobile terminal receives first input of a user.

The first input may be the input operation 1719 shown in FIG. 17A. For specific content, refer to the foregoing embodiment shown in FIG. 17A. Details are not described herein again.

S2002: In response to the first input, the mobile terminal starts video recording.

For details, refer to the foregoing embodiment shown in FIG. 17B. Details are not described herein again.

S2003: The mobile terminal collects N video frames of a photographing scenario at a first frame rate.

The first frame rate may be 30 fps, but is not limited to 30 fps. This is not limited herein. The photographing scenario may be the photographing scenario in FIG. 17A to FIG. 17F. For example, when a user uses the mobile terminal to record a video at night, the user first photographs a family member under room light, that is, a photographing scenario of the mobile terminal at first is in a building. Then, the lens is turned to an outdoor environment without light, and continues photographing an outdoor night scene. In this case, the photographing scenario of the mobile terminal is switched to an outdoor scenario.

S2004: The mobile terminal determines light intensity in the photographing scenario based on the collected N video frames, and automatically adjusts a recording frame rate of the mobile terminal based on the light intensity in the photographing scenario.

The mobile terminal may determine whether exposure parameters of the N video frames are less than a first exposure parameter threshold; and if yes, the mobile terminal determines that the light intensity in the photographing scenario is greater than a first light intensity threshold. The mobile terminal may determine whether the exposure parameters of the N video frames are greater than a second exposure parameter threshold; and if yes, the mobile terminal determines that the light intensity in the photographing scenario is less than a second light intensity threshold. For example, the exposure parameter may be ISO, and the first exposure parameter threshold (for example, 800) is less than the second exposure parameter threshold (for example, 2000). The first light intensity threshold (for example, 1000 lux) is greater than the second light intensity threshold (for example, 100 lux). The foregoing examples are merely used to explain this application, and shall not constitute a limitation herein.

In an implementation, the mobile terminal adjusts the recording frame rate of the mobile terminal to a second frame rate when the light intensity in the photographing scenario is greater than the first light intensity threshold (for example, 2000 lux), where the second frame rate (for example, 60 fps) is greater than the first frame rate (for example, 30 fps). In this way, when the light intensity in the photographing scenario is relatively strong, exposure of a video shot by the mobile terminal is adequate, and the mobile terminal can increase a frame rate of the shot video. Because of the increase in the frame rate, a quantity of frames of images shot by the mobile terminal per second increases, and the video is smoother. Dynamically adjusting the frame rate based on the light intensity in the photographing scenario can improve image brightness of a video shot by the mobile terminal in a relatively dark photographing scenario and improve image smoothness of a video shot by the mobile terminal in a relatively bright photographing scenario, to improve quality of a video image.

In an implementation, the mobile terminal adjusts the recording frame rate of the mobile terminal to a third frame rate when the light intensity in the photographing scenario is less than the second light intensity threshold (for example, 100 lux), where the third frame rate (for example, 24 fps) is greater than the first frame rate (for example, 30 fps). In this way, when the light intensity in the photographing scenario is relatively weak, exposure of a video shot by the mobile terminal is inadequate, and the mobile terminal may decrease a frame rate of the shot video. Because of the decrease in the frame rate, an exposure time period of each video frame on the mobile terminal is prolonged, and brightness of a video image may be improved.

In an implementation, when the mobile terminal collects a video frame of the photographing scenario at the second frame rate (for example, 60 fps), the mobile terminal may determine whether an exposure parameter (for example, an ISO value) of a currently collected video frame is greater than a third exposure parameter threshold (for example, 900) and less than the second exposure parameter threshold (for example, 2000). If yes, the mobile terminal adjusts the recording frame rate of the mobile terminal to the first frame rate (for example, 30 fps). The first exposure parameter threshold (for example, 800) is less than the third exposure parameter threshold (for example, 900), and the third exposure parameter threshold is less than the second exposure parameter threshold (for example, 2000). In this way, frequent switching of the recording frame rate between the first frame rate and the second frame rate can be avoided when the exposure parameter of the video frame changes around the first exposure parameter threshold.

In an implementation, when the mobile terminal collects a video frame of the photographing scenario at the third frame rate (for example, 24 fps), the mobile terminal may determine whether an exposure parameter (for example, an ISO value) of a currently collected video frame is less than a fourth exposure parameter threshold (for example, 1900) and greater than the first exposure parameter threshold (for example, 800). If yes, the mobile terminal adjusts the recording frame rate of the mobile terminal to the first frame rate (for example, 30 fps). The first exposure parameter threshold (for example, 800) is less than the fourth second exposure parameter threshold (for example, 1900), and the fourth exposure parameter threshold is less than the second exposure parameter threshold (for example, 2000). In this way, frequent switching of the recording frame rate between the first frame rate and the third frame rate can be avoided when the exposure parameter of the video frame changes around the second exposure parameter threshold.

In an implementation, the mobile terminal may determine whether the light intensity in the photographing scenario is greater than the first light intensity threshold (for example, 1000 lux) and motion displacement of the mobile terminal is greater than a first distance threshold (for example, 1 meter), or determine whether the light intensity in the photographing scenario is greater than the first light intensity threshold and a motion speed of the mobile terminal is greater than a first speed threshold (for example, 1 meter per second); and if yes, the mobile terminal adjusts the recording frame rate of the mobile terminal to a second frame rate (for example, 60 fps), where the second frame rate (for example, 60 fps) is greater than the first frame rate (for example, 30 fps).

The mobile terminal may determine whether the light intensity in the photographing scenario is less than the second light intensity threshold (for example, 100 lux), the motion displacement of the mobile terminal is less than a second distance threshold (for example, 0.5 meter), and the motion speed is less than a second speed threshold (for example, 0.5 meter per second). If yes, the mobile terminal adjusts the recording frame rate of the mobile terminal to a third frame rate (for example, 24 fps), where the third frame rate (for example, 24 fps) is less than the first frame rate (for example, 30 fps). The second distance threshold (for example, 0.5 meter) is less than the first distance threshold (for example, 1 meter per second), and the second speed threshold (for example, 0.5 meter per second) is less than the first speed threshold (for example, 1 meter per second). For a specific implementation of measuring the motion displacement and the motion speed by the mobile terminal, refer to the foregoing content of determining the motion status by the mobile terminal. Details are not described herein again.

In this way, when the mobile terminal moves vigorously, the recording frame rate is increased, an exposure time period of each frame of image shot by the mobile terminal is reduced, and a blur of a video image caused by motion of the mobile terminal is reduced. In this way, a motion blur of a video shot by the mobile terminal in a vigorous motion state can be reduced, to improve video smoothness and quality of a video image.

In an implementation, the mobile terminal may determine whether the light intensity in the photographing scenario is greater than the first light intensity threshold (for example, 1000 lux) and displacement of a same photographed object in any two of the N video frames is greater than a third distance threshold (for example, 1 centimeter). If yes, the mobile terminal adjusts the recording frame rate of the mobile terminal to a second frame rate (for example, 60 fps), where the second frame rate (for example, 60 fps) is greater than the first frame rate (for example, 30 fps).

The mobile terminal may determine whether the light intensity in the photographing scenario is less than the second light intensity threshold (for example, 100 lux), and the displacement of the same photographed object in any two of the N video frames is less than a fourth distance threshold (for example, 1 centimeter). If yes, the mobile terminal adjusts the recording frame rate of the mobile terminal to a third frame rate (for example, 24 fps), where the third frame rate (for example, 24 fps) is less than the first frame rate (for example, 30 fps). For a specific implementation of measuring the displacement of the photographed object by the mobile terminal refer to the foregoing content of determining the motion status of the photographed object in the shot image by the mobile terminal. Details are not described herein again.

In this way, because a recording frame rate is increased when the photographed object moves vigorously, an exposure time period of each frame of image photographed by the mobile terminal is shortened, and a blur of a video image caused by motion of the photographed object is reduced. Because the recording frame rate is decreased when the photographed object moves slightly, a quantity of frames of images shot per second is reduced, and an exposure time period of each frame of image is prolonged. Therefore, image brightness of the shot video can be ensured, and power consumption caused when the mobile terminal processes the shot images is reduced. In this way, a motion blur of a video shot when the photographed object is in a vigorous motion state can be reduced, to improve video smoothness and quality of a video image.

In an implementation, the mobile terminal may determine whether the following condition is met: the light intensity in the photographing scenario is greater than the first light intensity threshold (for example, 1000 lux), and motion displacement of the mobile terminal is greater than a first distance threshold (for example, 1 meter) or a motion speed of the mobile terminal is greater than a first speed threshold (for example, 1 meter per second); or the light intensity in the photographing scenario is greater than the first light intensity threshold (for example, 1000 lux), and displacement of a same photographed object in any two of the N video frames is less than a third distance threshold (for example, 2 centimeters). If yes, the mobile terminal adjusts the recording frame rate of the mobile terminal to a second frame rate (for example, 60 fps), where the second frame rate (for example, 60 fps) is greater than the first frame rate (for example, 30 fps).

The mobile terminal may determine whether the following condition is met: the light intensity in the photographing scenario is less than the second light intensity threshold (for example, 100 lux), and the motion displacement of the mobile terminal is less than a second distance threshold (for example, 0.5 meter), and displacement of a same photographed object in any two of the N video frames is less than a fourth distance threshold (for example, 1 centimeter); or the light intensity in the photographing scenario is less than the second light intensity threshold (for example, 100 lux), the motion speed of the mobile terminal is less than a second speed threshold (for example, 0.5 meter per second), and displacement of a same photographed object in any two of the N video frames is less than the fourth distance threshold (for example, 1 centimeter). If yes, the mobile terminal adjusts the recording frame rate of the mobile terminal to a third frame rate (for example, 24 fps).

In this way, because the recording frame rate is high when the light intensity in the photographing scenario is strong and the mobile terminal is in a vigorous motion state, a quantity of frames of images shot by the mobile terminal per second increases, and an exposure time period of each frame of image is shortened. In this way, a motion blur of a video image caused by the vigorous motion of the mobile terminal can be reduced, to improve video smoothness. In addition, because the light intensity in the photographing scenario is strong, even if the recording frame rate is high, each frame of image is relatively bright. Because the recording frame rate is low when the light intensity in the photographing scenario is weak and the mobile terminal is in a slight motion state, a quantity of frames of images shot by the mobile terminal per second decreases, and an exposure time period of each frame of image is prolonged. In this way, image brightness of the video in a low brightness environment is improved. In this way, with reference to the ambient light intensity and a motion status of the mobile terminal, image brightness of a video and smoothness of the video in a high brightness scenario are improved through control on several levels of frame rates.

S2005: The mobile terminal continues collecting a video frame of the photographing scenario based on the recording frame rate obtained after the adjustment.

S2006: The mobile terminal generates a video file based on the video frames that are collected at the first frame rate and the video frame that is collected based on the recording frame rate obtained after the adjustment.

For a process in which the mobile terminal generates the video file, refer to the foregoing embodiment shown in FIG. 18. Details are not described herein again.

In this embodiment of this application, the recording frame rate of the mobile terminal may be controlled based on one or more of the following three factors: the light intensity in the photographing scenario during video recording performed by the mobile terminal, the motion status of the mobile terminal, and the motion status of the photographed object. The mobile terminal automatically adjusts the recording frame rate based on the light intensity in the photographing scenario, to improve brightness of a video image in a low brightness scenario and video smoothness in a high brightness scenario. The mobile terminal controls the frame rate based on the motion status of the mobile terminal, to improve smoothness of a video shot by the mobile terminal during motion. The mobile terminal controls the frame rate based on the motion status of the photographed object, to improve image smoothness when there is a moving object in a video image, and reduce a motion blur caused by motion of the photographed object in the shot image. In this way, the recording frame rate of the mobile terminal is automatically adjusted, and quality of a video image is improved.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. These modifications or replacements do not make the essence of the corresponding technical solutions fall outside the scope of the technical solutions of the embodiments of this application.

What is claimed is:

1. A recording frame rate control method implemented by a mobile terminal, comprising:
   receiving a first input of a user;
   starting video recording in response to the first input;
   collecting N first video frames of a photographing scenario at a first frame rate, wherein N is a positive integer greater than 2;
   determining, based on the N first video frames, light intensity in the photographing scenario;
   determining, based on motion of the mobile terminal or a photographed object, a motion state parameter;
   adjusting, based on the light intensity and the motion state parameter, the first frame rate of the mobile terminal to obtain an adjusted recording frame rate, wherein the adjusted recording frame rate is different from the first frame rate;
   continuing to collect, based on the adjusted recording frame rate, a second video frame of the photographing scenario; and
   generating a video file based on the N first video frames and the second video frame.

2. The recording frame rate control method of claim 1, further comprising:
   determining whether first exposure parameters of the N first video frames are less than a first exposure parameter threshold; and
   determining that the light intensity is greater than a first light intensity threshold when the first exposure parameters are less than the first exposure parameter threshold.

3. The recording frame rate control method of claim 1 further comprising:
   determining whether first exposure parameters of the N first video frames are greater than a second exposure parameter threshold; and
   determining that the light intensity is less than a second light intensity threshold when the first exposure parameters are greater than the second exposure parameter threshold.

4. The recording frame rate control method of claim 1, further comprising further adjusting the first frame rate to a second frame rate when the light intensity is greater than a first light intensity threshold, wherein the second frame rate is greater than the first frame rate.

5. The recording frame rate control method of claim 1, further comprising further adjusting the first frame rate to a second frame rate when the light intensity is less than a second light intensity threshold, and wherein the second frame rate is less than the first frame rate.

6. The recording frame rate control method of claim 4, further comprising:
collecting a third video frame of the photographing scenario at the second frame rate;
determining whether a second exposure parameter of the third video frame is greater than a third exposure parameter threshold and less than a second exposure parameter threshold; and
further adjusting the first frame rate to the second frame rate when the second exposure parameter is greater than the third exposure parameter threshold and less than the second exposure parameter threshold, wherein a first exposure parameter threshold is less than the third exposure parameter threshold, and wherein the third exposure parameter threshold is less than the second exposure parameter threshold.

7. The recording frame rate control method of claim 5, further comprising:
collecting a fourth video frame of the photographing scenario at the second frame rate;
determining whether a third exposure parameter of the fourth video frame is less than a fourth exposure parameter threshold and greater than a first exposure parameter threshold; and
further adjusting the first frame rate to the first frame rate when the third exposure parameter is less than the fourth exposure parameter threshold and greater than the first exposure parameter threshold, wherein the first exposure parameter threshold is less than the fourth exposure parameter threshold, and wherein the fourth exposure parameter threshold is less than a second exposure parameter threshold.

8. The recording frame rate control method of claim 1, further comprising:
determining whether the light intensity is greater than a first light intensity threshold and a motion displacement of the mobile terminal is greater than a first distance threshold or whether the light intensity is greater than the first light intensity threshold and a motion speed of the mobile terminal is greater than a first speed threshold; and
further adjusting the first frame rate to a second frame rate when the light intensity is greater than the first light intensity threshold and the motion displacement is greater than the first distance threshold or when the light intensity is greater than the first light intensity threshold and the motion speed is greater than the first speed threshold, wherein the second frame rate is greater than the first frame rate.

9. The recording frame rate control method of claim 1, further comprising:
determining whether the light intensity is less than a second light intensity threshold, whether a motion displacement of the mobile terminal is less than a second distance threshold, and whether a motion speed of the mobile terminal is less than a second speed threshold; and further adjusting the first frame rate to a second frame rate when the light intensity is less than the second light intensity threshold, the motion displacement is less than the second distance threshold, and the motion speed is less than the second speed threshold, wherein the second frame rate is less than the first frame rate.

10. The recording frame rate control method of claim 1 further comprising:
determining whether the light intensity is greater than a first light intensity threshold and a displacement of a same photographed object in two of the N first video frames is greater than a third distance threshold; and
further adjusting the first frame rate to a second frame rate when the light intensity is greater than the first light intensity threshold and the displacement is greater than the third distance threshold, wherein the second frame rate is greater than the first frame rate.

11. The recording frame rate control method of claim 1, further comprising:
determining whether the light intensity is less than a second light intensity threshold and a displacement of a same photographed object in two of the N first video frames is less than a fourth distance threshold; and
further adjusting the first frame rate to a second frame rate when the light intensity is less than the second light intensity threshold and the displacement is less than the fourth distance threshold, wherein the second frame rate is less than the first frame rate.

12. The recording frame rate control method of claim 1, further comprising:
determining, whether the light intensity is greater than a first light intensity threshold and either a motion displacement of the mobile terminal is greater than a first distance threshold or a motion speed of the mobile terminal is greater than a first speed threshold or whether the light intensity is greater than the first light intensity threshold and a displacement of a same photographed object in two of the N first video frames is greater than a third distance threshold; and
further adjusting the first frame rate to a second frame rate when the light intensity is greater than the first light intensity threshold and either the motion displacement is greater than the first distance threshold or the motion speed is greater than the first speed threshold or when the light intensity is greater than the first light intensity threshold and the displacement is greater than the third distance threshold, wherein the second frame rate is greater than the first frame rate.

13. The recording frame rate control method of claim 1, further comprising:
determining whether the light intensity is less than a second light intensity threshold, a motion displacement of the mobile terminal is less than a second distance threshold, and a displacement of a same photographed object in two of the N first video frames is less than a fourth distance threshold, or whether the light intensity is less than the second light intensity threshold, a motion speed of the mobile terminal is less than a second speed threshold, and the displacement is less than the fourth distance threshold; and
further adjusting the first frame rate to a second frame rate when the light intensity is less than the second light intensity threshold, the motion displacement is less than the second distance threshold, and the displacement is less than the fourth distance threshold or when the light intensity is less than the second light intensity threshold, the motion speed is less than the second speed threshold, and the displacement is less than the fourth distance threshold, wherein the second frame rate is less than the first frame rate, wherein a first light intensity threshold is greater than the second light intensity threshold, wherein a first distance threshold is less than the second distance threshold, wherein a first speed threshold is greater than the second speed threshold, and wherein the fourth distance threshold is less than a third distance threshold.

14. A mobile terminal, comprising:
a memory configured to store instructions; and
a processor coupled to the memory and configured to execute the instructions to cause the mobile terminal to be configured to:
   receive a first input of a user;
   start video recording in response to the first input;
   collect N first video frames of a photographing scenario at a first frame rate;
   determine a light intensity in the photographing scenario based on the N first video frames, wherein N is a positive integer greater than 2;
   determine, based on motion of the mobile terminal or a photographed object, a motion state parameter;
   adjust the first frame rate of the mobile terminal based on the light intensity and the motion state parameter to obtain an adjusted recording frame rate, wherein the adjusted recording frame rate is different from the first frame rate;
   continue to collect a second video frame of the photographing scenario based on the adjusted recording frame rate; and
   generate a video file based on the N first video frames and the second video frame.

15. The mobile terminal of claim 14, wherein the instructions further cause the mobile terminal to be configured to:
   determine whether first exposure parameters of the N first video frames are less than a first exposure parameter threshold; and
   determine that the light intensity is greater than a first light intensity threshold when the first exposure parameters are less than the first exposure parameter threshold.

16. The mobile terminal of claim 14, wherein the instructions further cause the mobile terminal to be configured to:
   determine whether first exposure parameters of the N first video frames are greater than a second exposure parameter threshold; and
   determine that the light intensity is less than a second light intensity threshold when the first exposure parameters are greater than the second exposure parameter threshold.

17. The mobile terminal of claim 14, wherein the instructions further cause the mobile terminal to be configured to further adjust the first frame rate to a second frame rate when the light intensity is greater than a first light intensity threshold, and wherein the second frame rate is greater than the first frame rate.

18. The mobile terminal of claim 17, wherein the instructions further cause the mobile terminal to be configured to:
   collect a third video frame of the photographing scenario at the second frame rate;
   determine whether a second exposure parameter of the third video frame is greater than a third exposure parameter threshold and less than a second exposure parameter threshold; and
   further adjust the first frame rate to the first frame rate when the second exposure parameter is greater than the third exposure parameter threshold and less than the second exposure parameter threshold, wherein a first exposure parameter threshold is less than the third exposure parameter threshold, and wherein the third exposure parameter threshold is less than the second exposure parameter threshold.

19. The mobile terminal of claim 14, wherein the instructions further cause the mobile terminal to be configured to further adjust the first frame rate to a second frame rate when the light intensity is less than a second light intensity threshold, wherein the second frame rate is less than the first frame rate, and wherein the second light intensity threshold is less than a first light intensity threshold.

20. A computer program product comprising computer-executable instructions stored on a non-transitory computer-readable medium that, when executed by a processor, cause a mobile terminal to:
   receive a first input of a user;
   start video recording in response to the first input;
   collect N first video frames of a photographing scenario at a first frame rate, wherein N is a positive integer greater than 2;
   determine, based on the N first video frames, light intensity in the photographing scenario;
   determine, based on motion of the mobile terminal or a photographed object, a motion state parameter;
   adjust, based on the light intensity and the motion state parameter, the first frame rate of the mobile terminal to obtain an adjusted recording frame rate, wherein the adjusted recording frame rate is different from the first frame rate;
   continue to collect, based on the adjusted recording frame rate, a second video frame of the photographing scenario; and
   generate a video file based on the N first video frames and the second video frame.

* * * * *

UNITED STATES PATENT AND TRADEMARK OFFICE
CERTIFICATE OF CORRECTION

| | | |
|---|---|---|
| PATENT NO. | : 11,818,497 B2 | Page 1 of 1 |
| APPLICATION NO. | : 17/434663 | |
| DATED | : November 14, 2023 | |
| INVENTOR(S) | : Yuanyou Li et al. | |

It is certified that error appears in the above-identified patent and that said Letters Patent is hereby corrected as shown below:

On the Title Page

Page 2, (56) References Cited, U.S. Patent Documents: "2016/0182853 A1 6/2016 Iang et al." should read "2016/0182853 A1 6/2016 Liang et al."

Signed and Sealed this
Sixteenth Day of January, 2024

Katherine Kelly Vidal
*Director of the United States Patent and Trademark Office*